United States Patent
Schubert

(10) Patent No.: US 10,472,256 B2
(45) Date of Patent: Nov. 12, 2019

(54) SYSTEMS AND METHODS FOR WATER RECLAMATION

(71) Applicant: Morningside Venture Investments Limited, Monaco (MC)

(72) Inventor: Frank Schubert, Tracy, CA (US)

(73) Assignee: Morningside Venture Investments Limited, Monaco (MC)

( * ) Notice: Subject to any disclaimer, the term of this patent is extended or adjusted under 35 U.S.C. 154(b) by 0 days.

(21) Appl. No.: 16/114,131

(22) Filed: Aug. 27, 2018

(65) Prior Publication Data

US 2018/0370815 A1 Dec. 27, 2018

Related U.S. Application Data

(63) Continuation-in-part of application No. 15/922,099, filed on Mar. 15, 2018, now Pat. No. 10,081,556.
(Continued)

(51) Int. Cl.
   *C02F 1/04* (2006.01)
   *C02F 9/00* (2006.01)
   (Continued)

(52) U.S. Cl.
   CPC ............... *C02F 1/048* (2013.01); *C02F 9/00* (2013.01); *F01K 3/18* (2013.01); *F01K 9/003* (2013.01);
   (Continued)

(58) Field of Classification Search
   CPC .. C02F 1/048; C02F 9/00; F01K 9/003; F01K 3/18; F01K 17/00
   See application file for complete search history.

(56) References Cited

U.S. PATENT DOCUMENTS 1,938,366 A 12/1933 Armacost
3,690,040 A 9/1972 Halfon
(Continued)

FOREIGN PATENT DOCUMENTS

CN 1830820 9/2006
CN 101256043 A 5/2011
(Continued)

OTHER PUBLICATIONS

Extended European Search Report received for European Application No. 12175670.4, dated May 13, 2014, 8 pages.
(Continued)

*Primary Examiner* — Mark A Laurenzi
*Assistant Examiner* — Shafiq Mian
(74) *Attorney, Agent, or Firm* — Foley & Lardner LLP

(57) ABSTRACT

A system for processing wastewater includes a wastewater source, a biomass burner, and a first heat exchanger. The biomass burner is configured to receive biomass from a biomass source, combust the biomass to produce heat and ash, receive a thermal transfer fluid, and heat the thermal transfer fluid using the heat produced from the combustion of the biomass. The first heat exchanger is configured to heat the wastewater to produce steam. The first heat exchanger includes a first inlet, a second inlet, a first outlet, a second outlet, and a third outlet. The first inlet is configured to receive the wastewater from the wastewater source. The second inlet is configured to receive the thermal transfer fluid from the biomass burner. The first outlet is configured to discharge the steam. The second outlet is configured to discharge the thermal transfer fluid.

21 Claims, 27 Drawing Sheets

Related U.S. Application Data which is a continuation of application No. 15/833,745, filed on Dec. 6, 2017, now Pat. No. 9,988,283, which is a continuation of application No. 14/294,939, filed on Jun. 3, 2014, now Pat. No. 9,862,620, which is a continuation of application No. 13/182,040, filed on Jul. 13, 2011, now Pat. No. 8,776,522, which is a continuation-in-part of application No. 12/937,173, filed as application No. PCT/US2009/040516 on Apr. 14, 2009, now Pat. No. 8,661,819.

(60) Provisional application No. 61/124,247, filed on Apr. 15, 2008, provisional application No. 61/192,061, filed on Sep. 12, 2008, provisional application No. 61/209,765, filed on Mar. 11, 2009.

(51) Int. Cl.

| *F01K 3/18* | (2006.01) |
|---|---|
| *F01K 9/00* | (2006.01) |
| *F01K 23/10* | (2006.01) |
| *F01K 17/00* | (2006.01) |
| *C02F 1/14* | (2006.01) |
| *C02F 103/20* | (2006.01) |

(52) U.S. Cl.
CPC ............. *F01K 17/00* (2013.01); *F01K 23/10* (2013.01); *C02F 1/14* (2013.01); *C02F 2103/20* (2013.01); *Y02W 10/37* (2015.05)

(56) References Cited

U.S. PATENT DOCUMENTS

| 3,937,023 | A |   | 2/1976  | Williamson |   |
|---|---|---|---|---|---|
| 3,987,784 | A |   | 10/1976 | Godrick |   |
| 4,094,747 | A |   | 6/1978  | Pfenninger |   |
| 4,165,289 | A | * | 8/1979  | Borst | B01D 33/04 |
|   |   |   |   |   | 210/669 |
| 4,209,364 | A |   | 6/1980  | Rothschild |   |
| 4,253,307 | A |   | 3/1981  | Smith |   |
| 4,321,151 | A |   | 3/1982  | McMullen |   |
| 4,414,813 | A |   | 11/1983 | Knapp |   |
| 4,512,851 | A | * | 4/1985  | Swearingen | B01D 1/0082 |
|   |   |   |   |   | 159/2.1 |
| 4,525,242 | A | * | 6/1985  | Iida | C02F 1/14 |
|   |   |   |   |   | 202/177 |
| 4,670,146 | A |   | 6/1987  | Inoue et al. |   |
| 4,854,249 | A |   | 8/1989  | Khinkis et al. |   |
| 5,018,367 | A |   | 5/1991  | Yamada et al. |   |
| 5,228,293 | A |   | 7/1993  | Vitale |   |
| 5,349,829 | A |   | 9/1994  | Tsimerman |   |
| 5,405,503 | A |   | 4/1995  | Simpson et al. |   |
| 5,484,524 | A |   | 1/1996  | MacLaren et al. |   |
| 5,661,017 | A |   | 8/1997  | Dunahay et al. |   |
| 5,724,828 | A |   | 3/1998  | Korenic |   |
| 5,913,588 | A |   | 6/1999  | Legros et al. |   |
| 6,398,707 | B1 |  | 6/2002  | Wu et al. |   |
| 6,642,399 | B2 |  | 11/2003 | Boocock |   |
| 6,651,443 | B1 |  | 11/2003 | Meckler |   |
| 6,712,867 | B1 |  | 3/2004  | Boocock |   |
| 6,740,205 | B2 |  | 5/2004  | Molintas |   |
| 6,768,015 | B1 |  | 7/2004  | Luxem et al. |   |
| 6,822,105 | B1 |  | 11/2004 | Luxem et al. |   |
| 6,855,838 | B2 |  | 2/2005  | Haas et al. |   |
| 7,108,784 | B1 |  | 9/2006  | Litz et al. |   |
| 7,135,308 | B1 |  | 11/2006 | Bush et al. |   |
| 7,191,736 | B2 | * | 3/2007  | Goldman | F02B 43/02 |
|   |   |   |   |   | 123/1 A |
| 7,228,682 | B2 |  | 6/2007  | Kashler |   |
| 7,228,806 | B2 |  | 6/2007  | Dueck et al. |   |
| 7,340,899 | B1 |  | 3/2008  | Rubak et al. |   |
| 8,604,088 | B2 |  | 12/2013 | Lucas et al. |   |
| 9,868,964 | B2 |  | 1/2018  | Josse et al. |   |
| 2002/0053196 | A1 | * | 5/2002 | Lerner | F17D 1/14 |
|   |   |   |   |   | 60/39.182 |
| 2003/0127400 | A1 |  | 7/2003  | Kresnyak et al. |   |
| 2004/0128975 | A1 |  | 7/2004  | Viteri |   |
| 2005/0050890 | A1 |  | 3/2005  | Shinohara et al. |   |
| 2005/0126170 | A1 |  | 6/2005  | Litwin |   |
| 2005/0198959 | A1 |  | 9/2005  | Schubert |   |
| 2005/0279095 | A1 |  | 12/2005 | Goldman |   |
| 2007/0017241 | A1 |  | 1/2007  | Hyland et al. |   |
| 2007/0017242 | A1 |  | 1/2007  | Johansson |   |
| 2007/0130952 | A1 |  | 6/2007  | Copen |   |
| 2007/0249029 | A1 | * | 10/2007 | Marshall | C12P 3/00 |
|   |   |   |   |   | 435/161 |
| 2007/0254089 | A1 |  | 11/2007 | Hickey et al. |   |
| 2007/0289303 | A1 |  | 12/2007 | Prueitt |   |
| 2010/0043435 | A1 |  | 2/2010  | Hinders et al. |   |
| 2011/0023485 | A1 |  | 2/2011  | Schubert |   |
| 2011/0048006 | A1 |  | 3/2011  | Cap et al. |   |
| 2011/0048921 | A1 |  | 3/2011  | Cap et al. |   |
| 2011/0165526 | A1 |  | 7/2011  | Schu |   |
| 2011/0209473 | A1 |  | 9/2011  | Fritz et al. |   |
| 2012/0112473 | A1 |  | 5/2012  | Glynn |   |
| 2014/0290247 | A1 |  | 10/2014 | Mishima et al. |   |

FOREIGN PATENT DOCUMENTS

| DE | 41 26 036 A1 | 2/1993 |
|---|---|---|
| DE | 19502953 A1 | 12/1995 |
| EP | 0 922 676 | 6/1999 |
| JP | 53-031575 | 3/1978 |
| JP | 09-103766 | 4/1997 |
| JP | 2001-029939 A | 2/2001 |
| WO | WO-02/32534 A1 | 4/2002 |
| WO | WO-2006/036836 | 4/2006 |
| WO | WO-2009/129233 | 10/2009 |

OTHER PUBLICATIONS

International Search Report and Written Opinion for PCT/US2009/040516, dated Oct. 15, 2009, 14 pages.

Kalogirou, Solar Thermal Collectors And Applications, Progress In Energy And Combustion Science, Elsevier Science Publishers, Amsterdam, NL, vol. 30, No. 3, Jan. 1, 2004, pp. 231-295.

Rheinlander, J. et al., Electricity and potable water from a solar tower power plant, Renewable Energy, Pergamon Press, Oxford, GB, vol. 14, No. 1-4, May 8, 1998, pp. 23-28, XP004126814, ISSN: 0960-1481, DOI: 10.1016/S0960-1481 (98)00042-1.

Sheehan et al, A Look Back at the US Department of Energy's Aquatic Species Program—Biodiesel from Algae—Close Out Report, NREL/TP-580-24190, Jul. 1998, 328 pages.

* cited by examiner

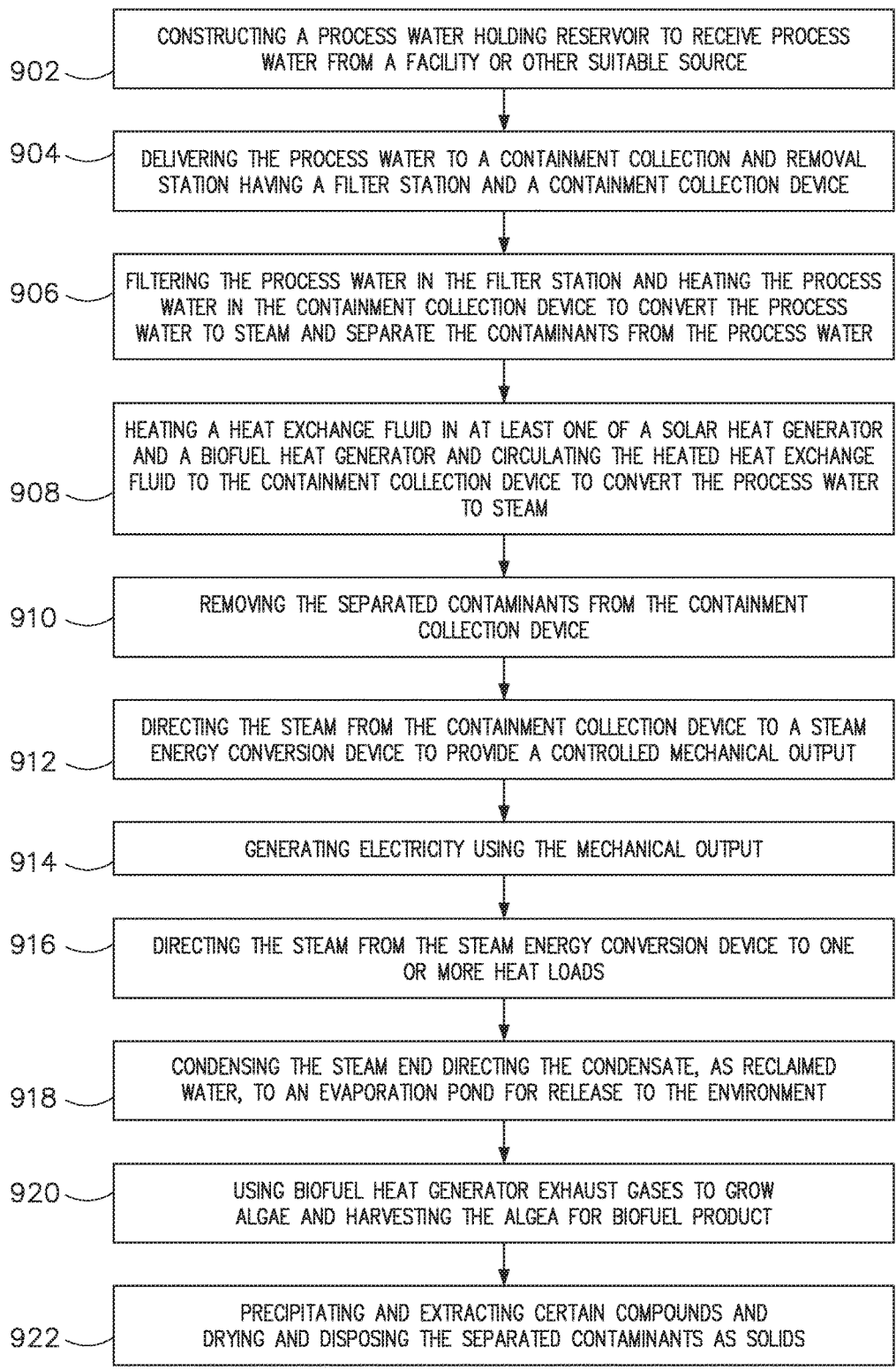

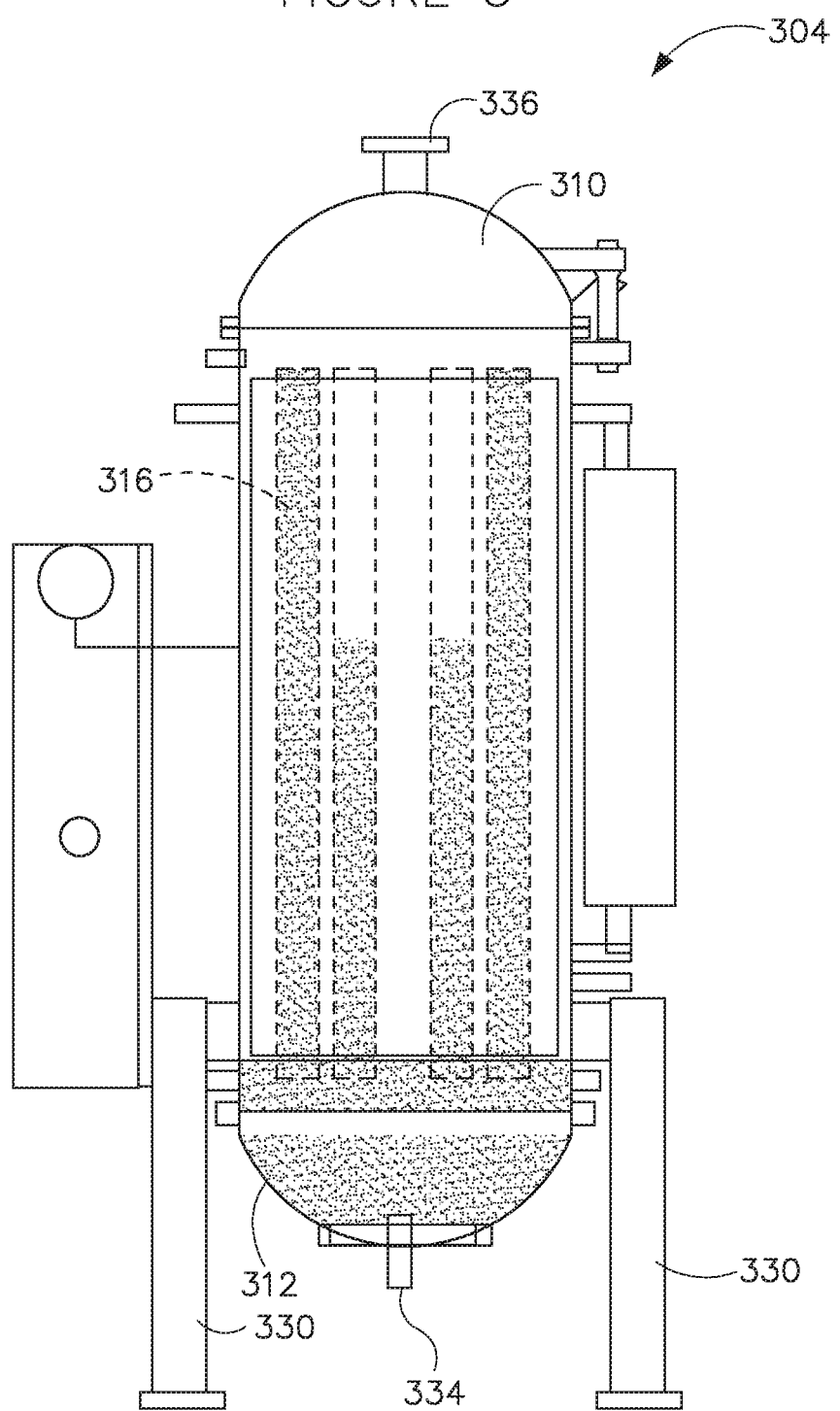

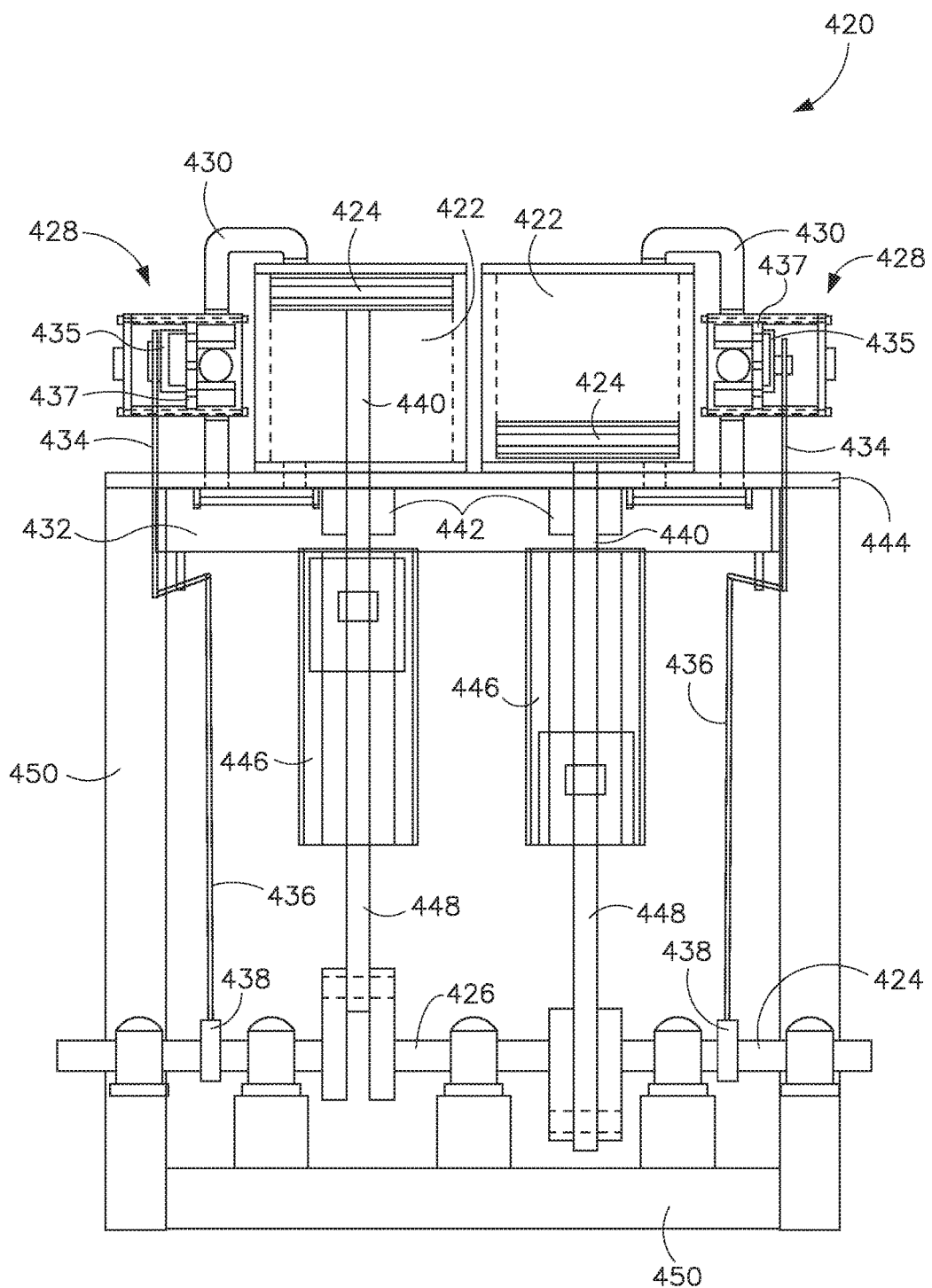

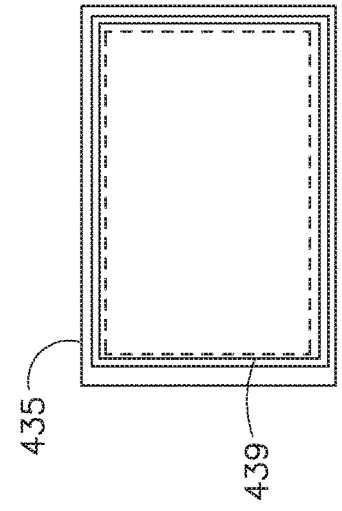
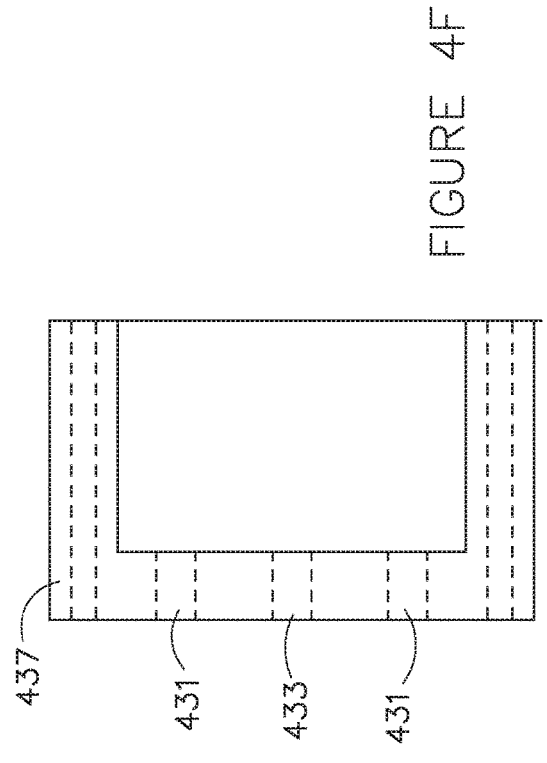
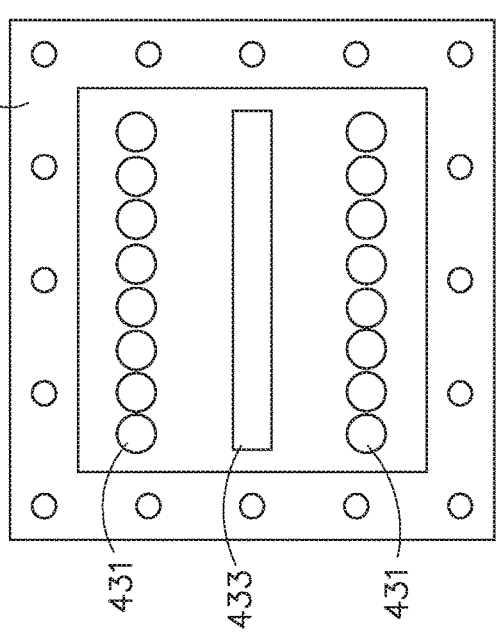
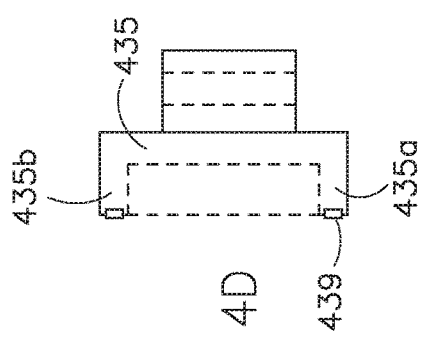

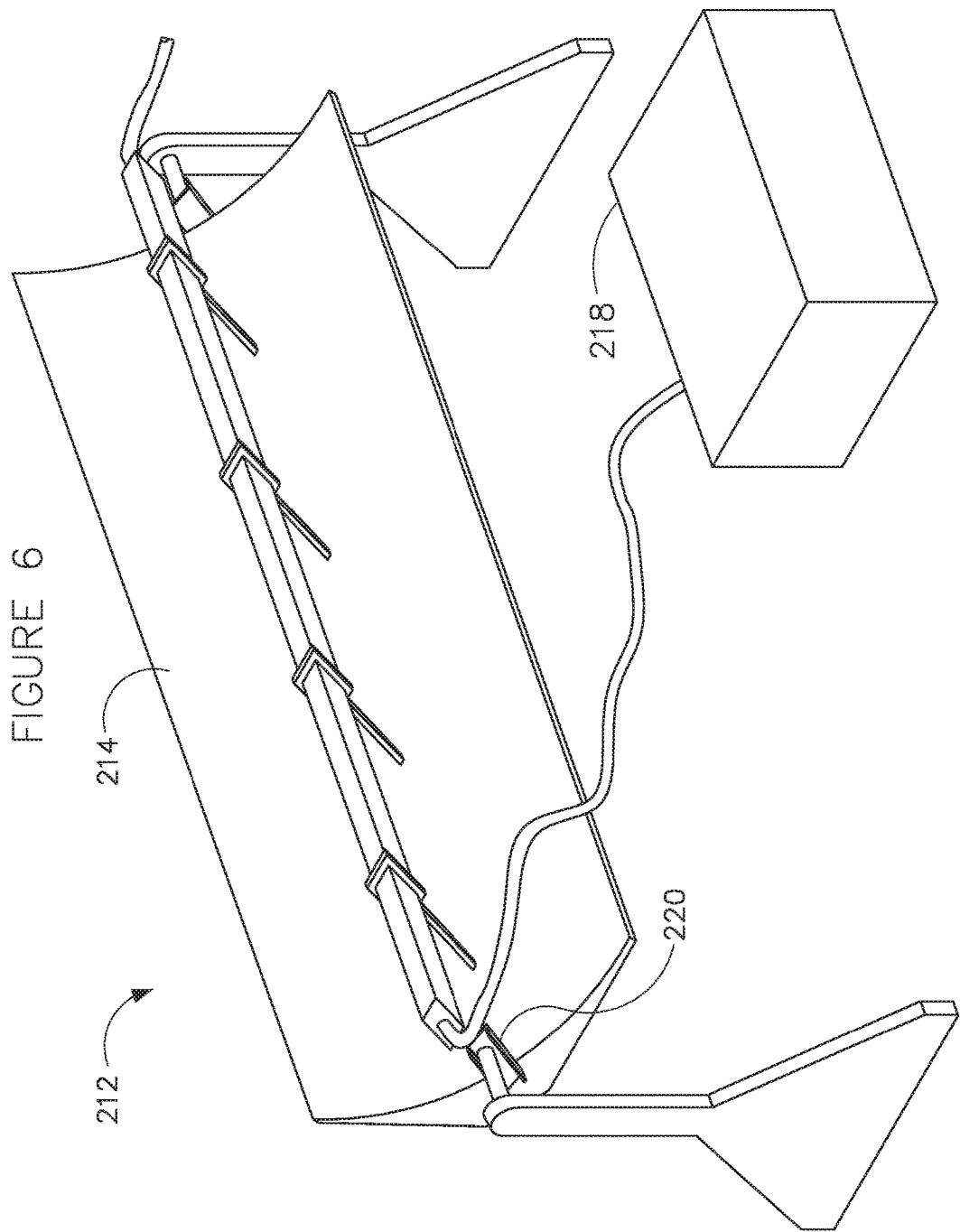

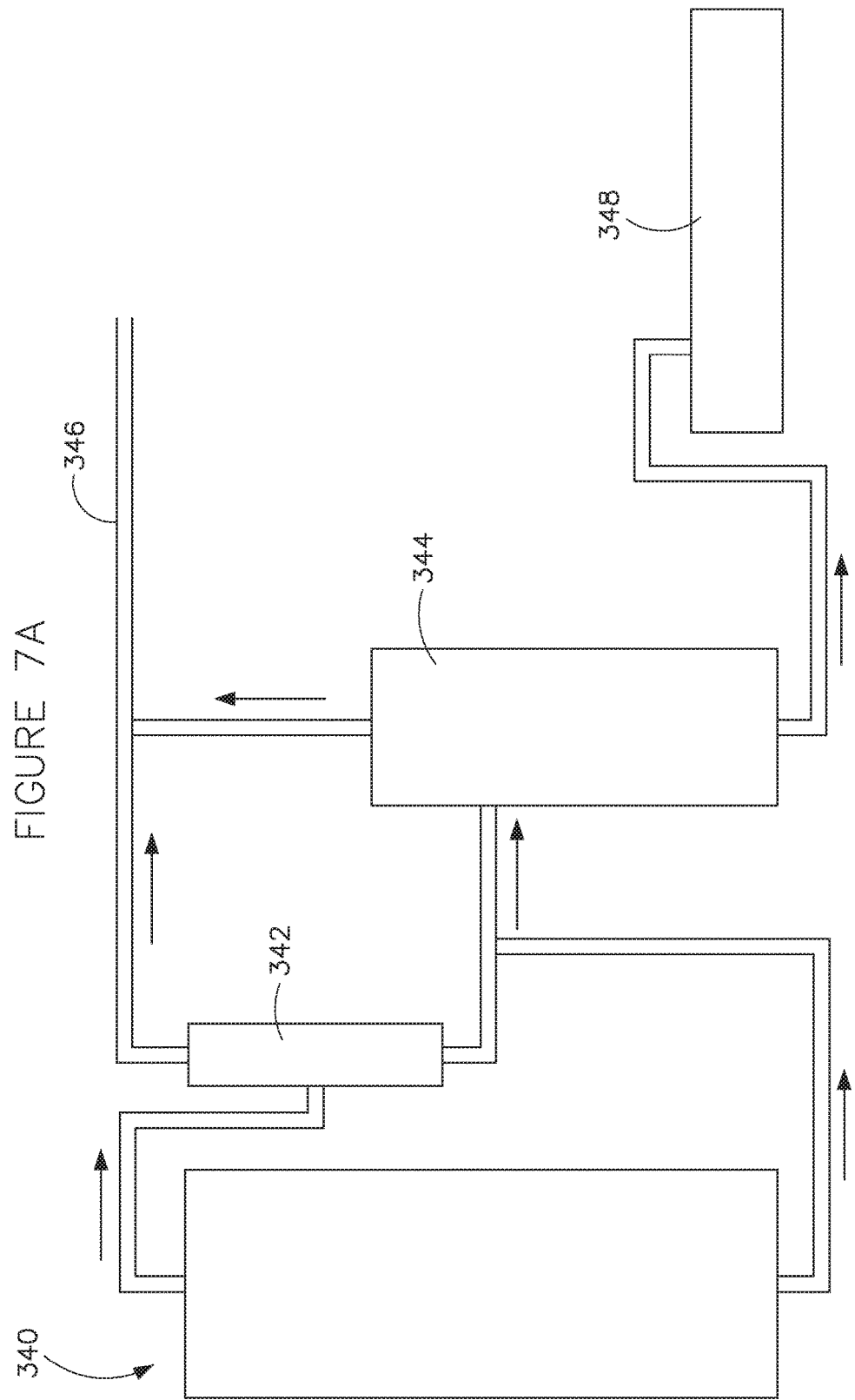

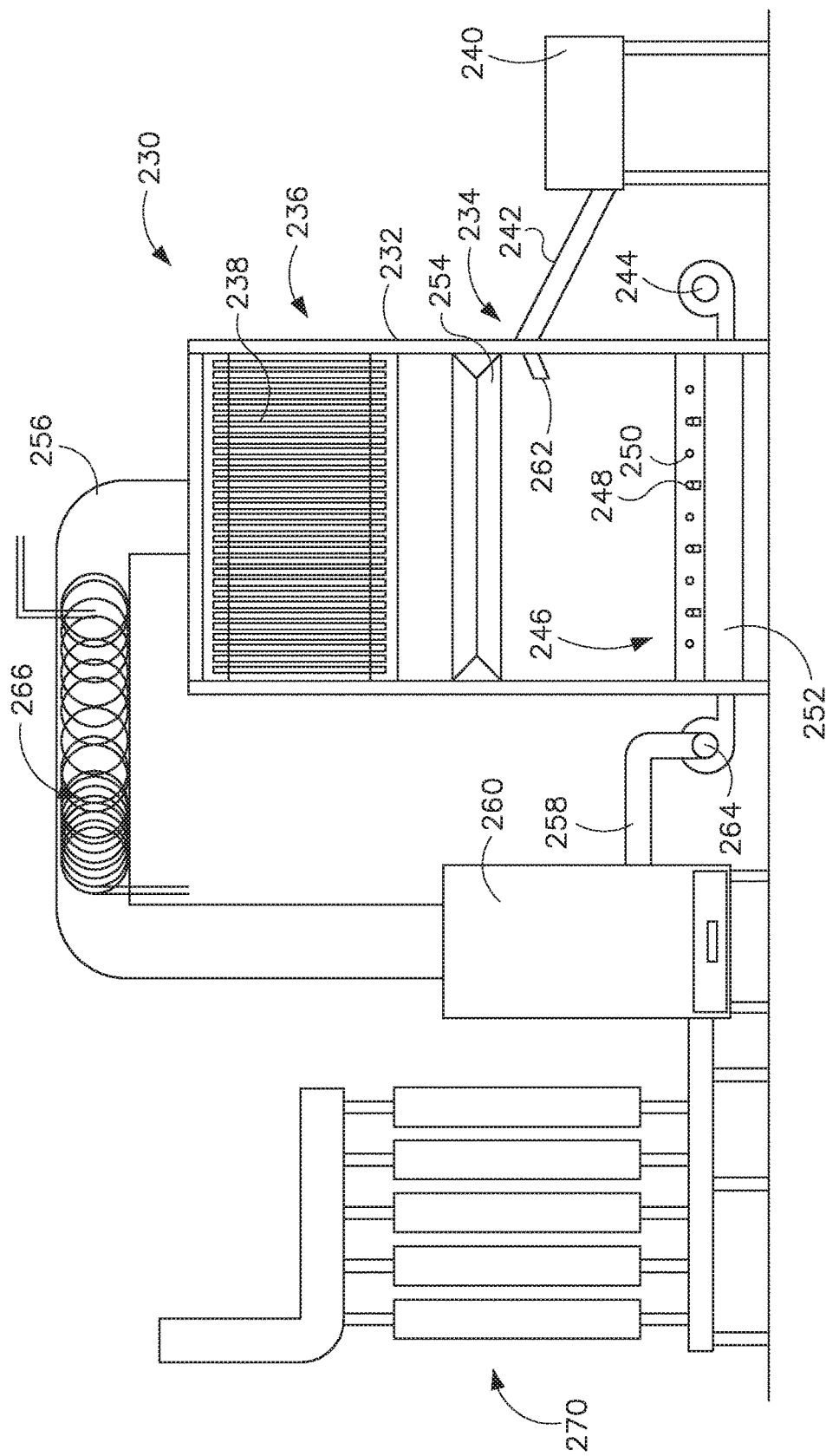

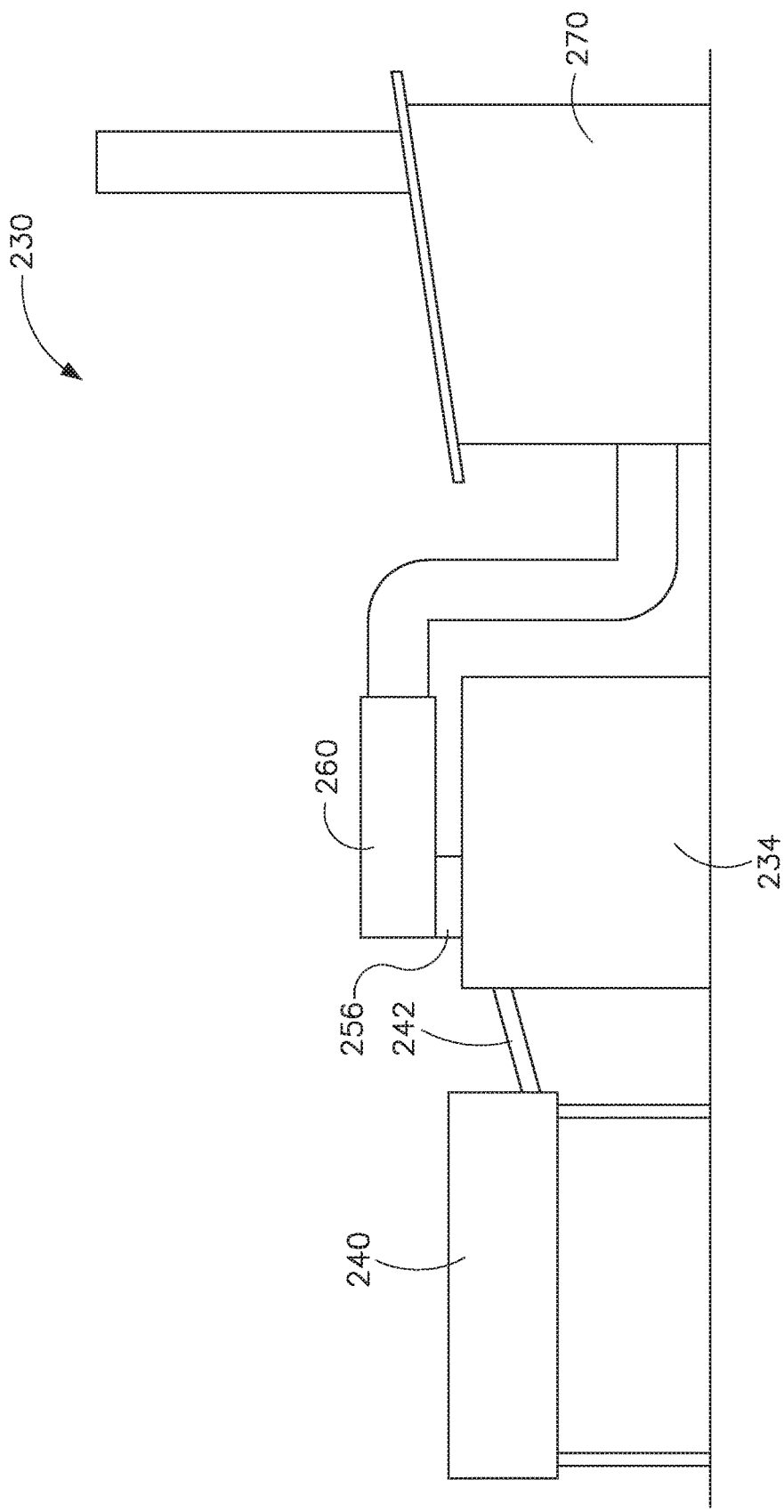

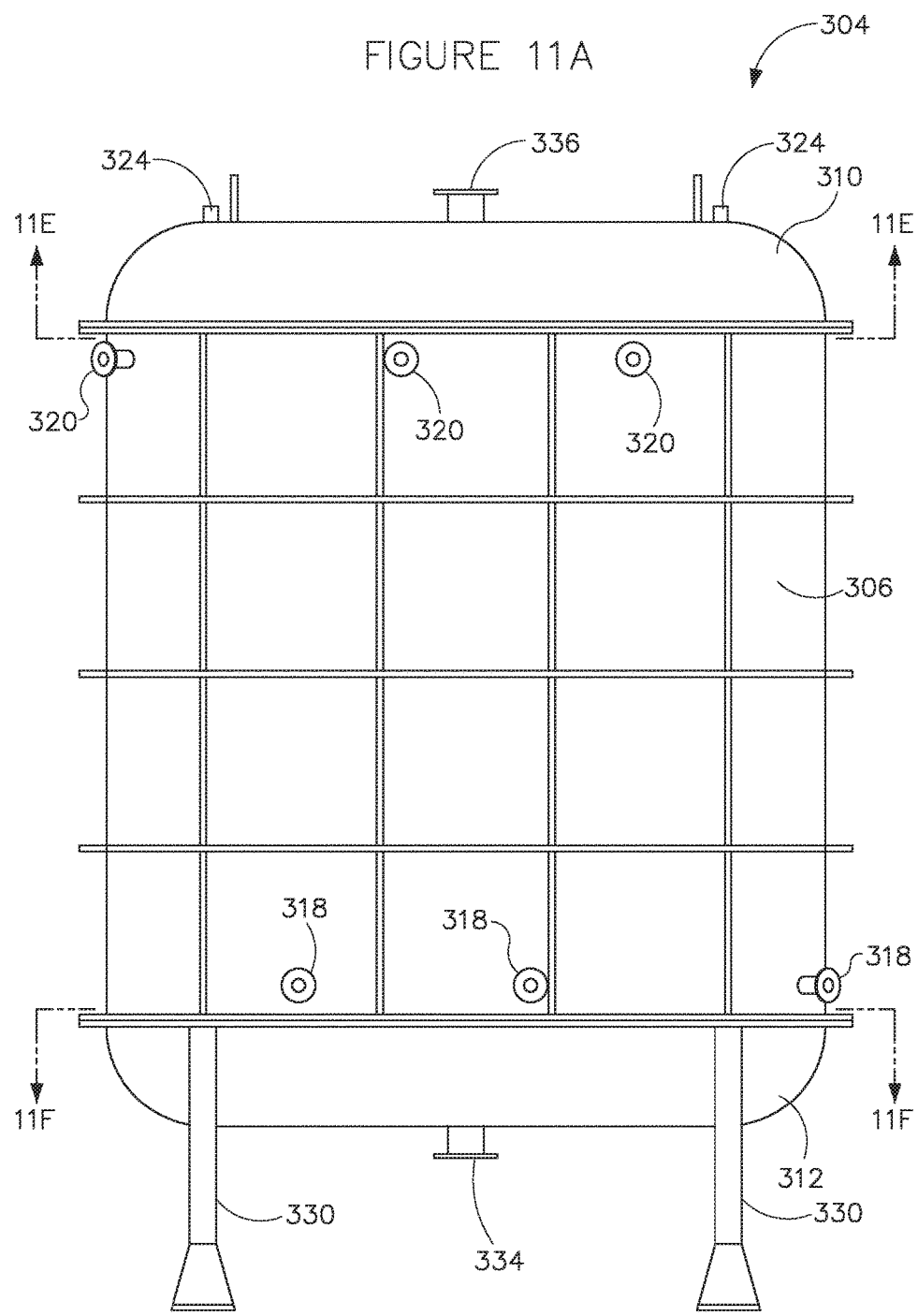

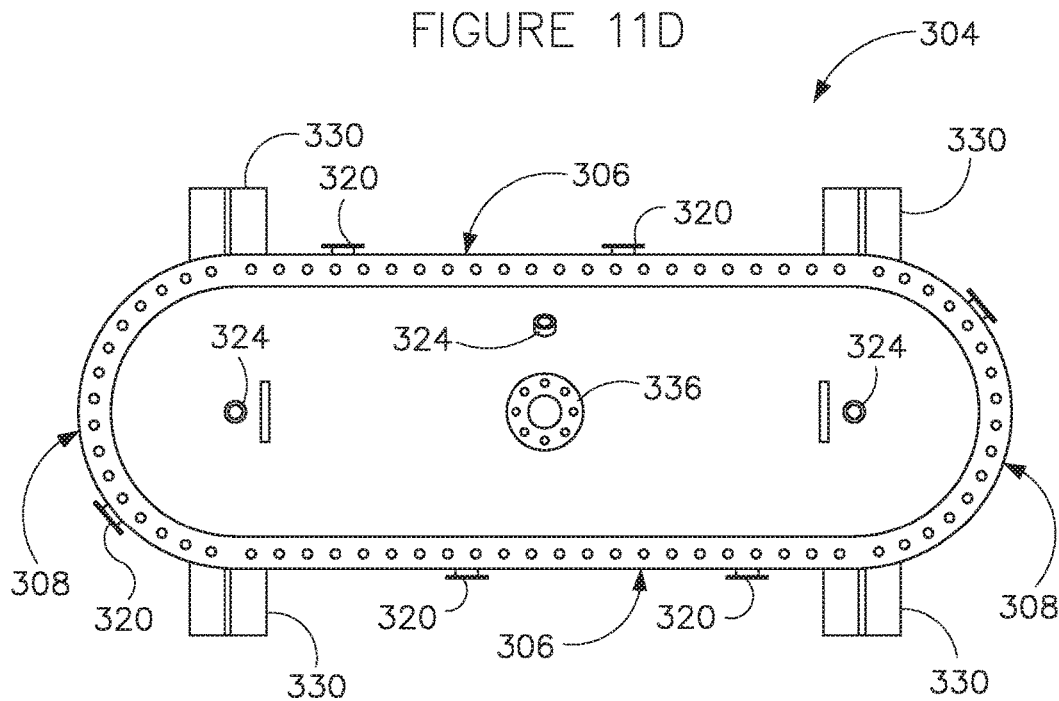
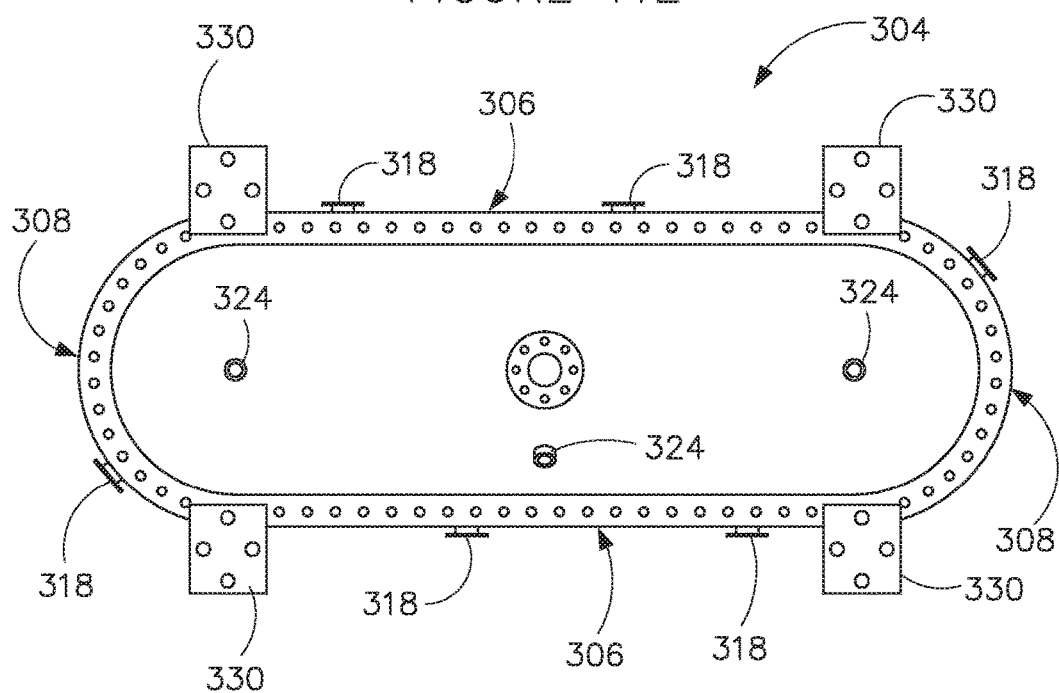

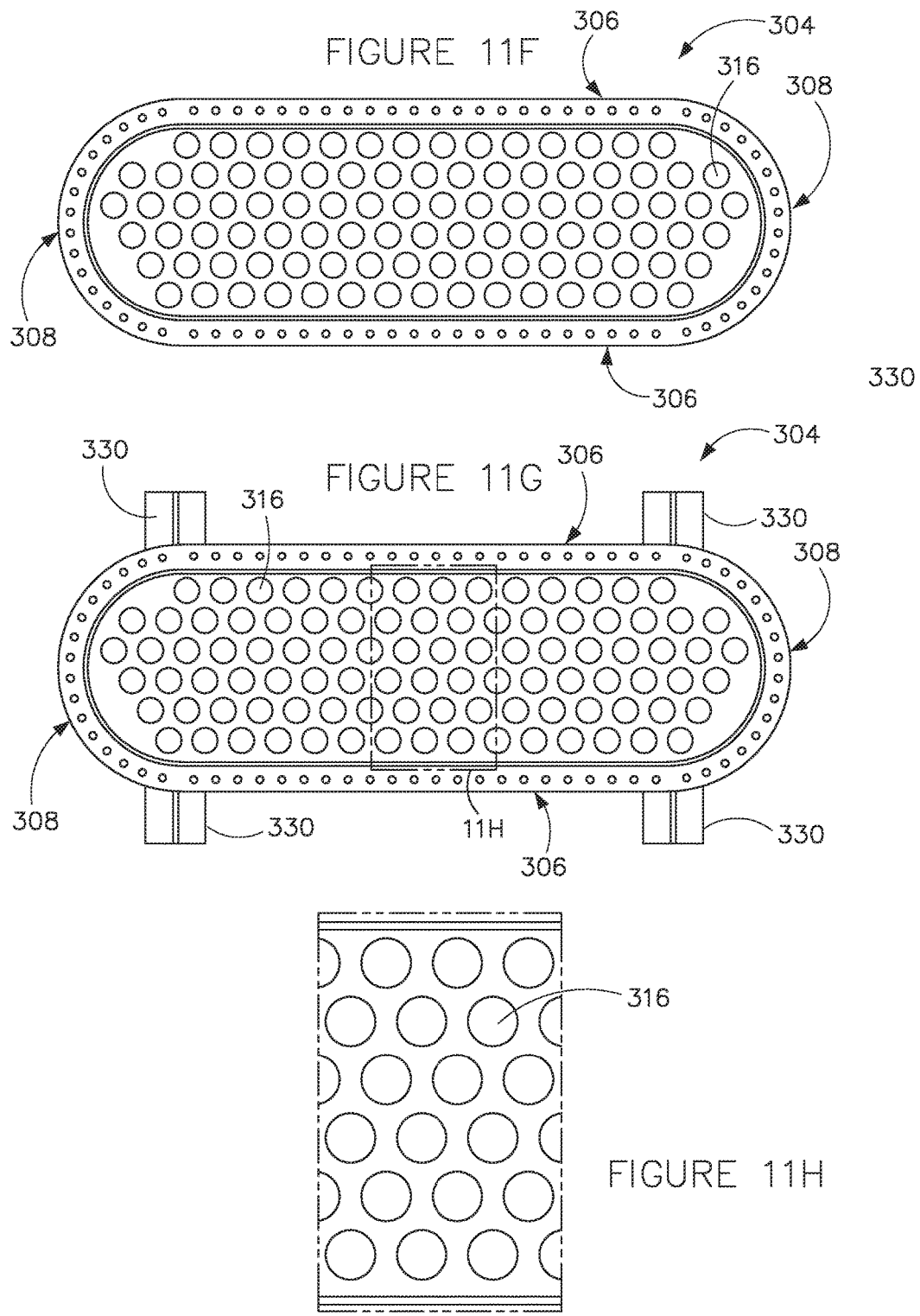

SYSTEMS AND METHODS FOR WATER RECLAMATION

CROSS REFERENCE TO RELATED PATENT APPLICATIONS

This application is a continuation-in-part of U.S. patent application Ser. No. 15/922,099 titled "Systems and Methods for Water Reclamation" filed Mar. 15, 2018; which is a continuation of U.S. patent application Ser. No. 15/833,745 titled "Systems and Methods for Water Reclamation" filed Dec. 6, 2017; which is a continuation of U.S. patent application Ser. No. 14/294,939 titled "System and Methods for Water Reclamation and Ethanol Distillation" filed Jun. 3, 2014; which is a continuation of U.S. patent application Ser. No. 13/182,040 titled "Water Reclamation System and Method" filed Jul. 13, 2011; which is a continuation-in-part of U.S. patent application Ser. No. 12/937,173 titled "Water Reclamation System and Method" filed October, 2010; which is a national stage application of P.C.T. Application No. PCT/US2009/040516 titled "Water Reclamation System and Method" filed Apr. 14, 2009; which claims the benefit of and priority to U.S. Provisional Application No. 61/124,247 titled "Water Reclamation System and Method" filed Apr. 15, 2008, U.S. Provisional Application No. 61/192,061 titled "Water Reclamation System and Method" filed Sep. 12, 2008, and U.S. Provisional Application No. 61/209,765 titled "Water Reclamation System and Method" filed Mar. 11, 2009. The entire disclosures of U.S. patent application Ser. Nos. 15/922,099, 15/833,745, 14/294,939, 13/182,040, 12/937,173, P.C.T. Application No. PCT/US2009/040516, U.S. Provisional Application No. 61/124,247, U.S. Provisional Application No. 61/192,061, and U.S. Provisional Application No. 61/209,765 are incorporated by reference herein.

FIELD

The field of the disclosure relates generally to reclamation of water used in municipal, agricultural, food processing or manufacturing processes prior to returning the water to the environment. More specifically, the disclosure relates to a system and method of reclaiming water through the use of a renewable or other environmentally-friendly energy source. More particularly, the disclosure relates to a system and method of reclaiming water that disposes of biomass waste and provides thermal and/or electrical energy as a by-product.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Facilities which require water for processing agricultural or other products are well known. Sites for production of agricultural and/or livestock products (generally referred to generically herein as "farms") are also known. Upon completion of the processing operation, or as a result of farming activities, the water is often contaminated with dissolved solids, particles or other contaminants that often render the water unfit for returning to the environment in a manner that meets certain water cleanliness regulatory requirements. For example, regulations often limit the content of total dissolved solids (TDS) in the water released from a processing facility or farm to the environment. Dissolved solids are often difficult to remove from water because they are usually small enough to survive filtration. Discharging water having excess TDS levels may cause certain undesirable environmental effects and result in regulatory fines being imposed on the facility, or require expensive and/or energy-intensive systems for treating or reclaiming the water prior to its release to the environment.

What is needed is a system and method for reclaiming water used in a facility (e.g., food processing, agricultural, wine-making, dairy, oil-drilling, etc.) or farming operation to reduce undesirable contaminants (such as TDS) to cleanliness levels that meet or exceed applicable regulatory requirements. What is further needed is a system and method for reclaiming water using renewable or other environmentally-friendly energy sources. What is further needed is a system and method for reclaiming water that advantageously disposes of biomass waste and also provides thermal energy as a byproduct for use in other applications.

Accordingly, it would be desirable to provide a system and method for reclaiming water from a processing facility, municipality, operation or farm through the use of environmentally-friendly energy sources and that disposes of biomass waste and provides thermal energy as a byproduct for use in a wide variety of other beneficial applications.

SUMMARY

In an exemplary embodiment, a system for processing wastewater includes a wastewater source, a biomass burner, and a first heat exchanger. The biomass burner is configured to receive biomass from a biomass source, combust the biomass to produce heat and ash, receive a thermal transfer fluid, and heat the thermal transfer fluid using the heat produced from the combustion of the biomass. The first heat exchanger is configured to heat the wastewater to produce steam. The first heat exchanger includes a first inlet, a second inlet, a first outlet, a second outlet, and a third outlet. The first inlet is configured to receive the wastewater from the wastewater source. The second inlet is configured to receive the thermal transfer fluid from the biomass burner. The first outlet is configured to discharge the steam. The second outlet is configured to discharge the thermal transfer fluid. The third outlet is configured to discharge blow-by water separated from the wastewater within the first heat exchanger. The thermal transfer fluid does not contact any of the wastewater, the steam, and the blow-by water. A volume of the blow-by water discharged from the third outlet is less than 5% of a volume of the wastewater received by the first inlet, over a period of time.

In another exemplary embodiment, a system for processing wastewater includes a wastewater source, a heat source, a first heat exchanger, and a second heat exchanger. The heat source is configured to heat a thermal transfer fluid. The first heat exchanger is configured to heat the wastewater to produce steam. The first heat exchanger includes a first inlet, a second inlet, a first outlet, a second outlet, and a third outlet. The first inlet is configured to receive the wastewater from the wastewater source. The second inlet is configured to receive the thermal transfer fluid. The first outlet is configured to discharge the steam. The second outlet is configured to discharge the thermal transfer fluid. The third outlet is configured to discharge blow-by water separated from the wastewater within the first heat exchanger. The second heat exchanger is configured to receive the steam from the first heat exchanger and to use heat from the steam in a drying process or to generate electricity. A volume of the blow-by water discharged from the third outlet is less than 5% of a volume of the wastewater received by the first inlet, over a period of time.

In another exemplary embodiment, a system for processing wastewater includes a wastewater source, a burner, a first heat exchanger, and a second heat exchanger. A burner is configured to produce heat, discharge exhaust gases, receive a thermal transfer fluid, and heat the thermal transfer fluid. The first heat exchanger includes a first inlet, a second inlet, a first outlet, a second outlet, and a third outlet. The first inlet is configured to receive wastewater from the wastewater source. The second inlet is configured to receive the thermal transfer fluid from the burner. The first outlet is configured to discharge steam. The second outlet is configured to discharge the thermal transfer fluid. The third outlet is configured to discharge blow-by water separated from the wastewater within the first heat exchanger. The second heat exchanger is configured to receive the steam from the first heat exchanger and to use heat from the steam in a drying process or to generate electricity. The thermal transfer fluid is contained within a pipe in the first heat exchanger. A volume of the blow-by water discharged from the third outlet is less than 5% of a volume of the wastewater received by the first inlet, over a period of time.

In another exemplary embodiment, a water reclamation system and method are shown to include six primary or functional regions (e.g., subsystem, etc.): a 'water capture and delivery region,' and a 'contaminant collection and removal region,' and a 'heat generation region,' and a 'steam energy conversion and power generation region,' and a 'free heat recovery region,' and a 'reclaimed water retention and release region.'

The 'water capture and delivery region' includes a reservoir or other retention device for receiving the contaminated water from a facility, operation or farm. The 'contaminant collection and removal region' includes a filtration station to filter the contaminated water and a vertical shell and tube boiler that receives heat energy from the 'heat generation region' to evaporate the contaminated water so that the contaminants are collected in the bottom of the boiler and on the sides of the tubes. The 'heat generation region' heats a thermal transfer fluid during the day using parabolic solar concentrator panels and a rectangular collector tube, and heats the thermal transfer fluid during the nighttime by combusting a biofuel (in the form of a biomass waste supply). The steam from the boiler is directed through a moisture-vapor separator and to a steam energy conversion device, such as a piston-type steam engine or Tesla turbine to drive an electric generator to produce electricity for the system and surplus is provided back to the facility or farm. Exhaust steam from the steam engine or turbine is directed through another moisture-vapor separator and then to the 'free heat recovery region' where it provides heat to one or more supplemental heat loads, such as laundry equipment, farm equipment, ethanol distillation equipment, process facility equipment, and/or may be used to pre-heat the thermal transfer fluid being returned to the heat generation region. The steam exiting the supplemental heat loads is directed to the 'reclaimed water retention and release region' where the steam is condensed, tested, filtered and released as reclaimed water in either vapor or liquid form to the environment or back to the facility or farm for reuse. The system also includes a control system that monitors signals representative of the various parameters associated with the system and provides appropriate output signals to operate the various components of the system.

According to another exemplary embodiment, a system and method is provided which subsidizes the costly distillation of contaminated water through the aggregation of multiple renewable energy applications enabled by the resulting pressure and heat. By vaporizing water under pressure to drive steam engines of the present invention integrated with generators, heat exchangers of the present invention are able to reduce the solids and contaminants by up to approximately 97% in certain applications. Approximately 50% of the heat energy utilized for the vaporization process is reclaimed in certain applications, and its productive use is optimized. In certain applications, the design is intended to enable the construction of a consolidated renewable energy and water cleaning facility which, while cleaning approximately 5 million gallons per day (GPD) of water, is intended to be capable of generating approximately 30 MW per hour of electricity and yield sufficient heat energy to process approximately 50 million gallons per year (GPY) of ethanol and/or other biofuel. Electricity and fuel production create attendant revenue streams, each of which bears a proportionate share of the energy cost of vaporization, thus fractionalizing the energy cost of distillation. The system and method are intended for processing a wide variety of water sources, such as (but not limited to) raw seawater, reverse osmosis brine, agricultural tile water, drainage water, food processing plant waste water, dairy wastewater and chemically contaminated water.

According to another exemplary embodiment, the components of the water reclamation system and method may include a reservoir or other retention device for receiving the contaminated water from a facility or farm. A filtration station filters the contaminated water and a vertical shell and tube boiler receives heat energy from heat generation devices (e.g., a bio-reactor boiler or solar array) to vaporize the contaminated water so that the contaminants are collected in the bottom of the boiler and on the sides of the tubes. A thermal transfer fluid is heated during the day using a solar array having parabolic solar concentrator panels and a rectangular collector tube. During nighttime, the thermal transfer fluid is heated by combusting a biomass material (in the form of a biomass waste supply). The steam from the boiler is directed through a moisture-vapor separator and to a steam engine, such as a piston-type steam engine or Tesla turbine to drive an AC electric generator to produce electricity for the system and surplus is provided back to the facility. Exhaust steam from the steam engine or turbine is directed through another moisture-vapor separator and then to other (e.g., supplemental, etc.) heat loads, such as ethanol distillation equipment, drying pans of a zero liquid discharge system, or other process facility equipment. The steam exiting the heat loads is directed to the 'reclaimed water retention and release region' where the steam is condensed, tested, filtered and released as reclaimed water in either vapor or liquid form to the environment or to another suitable location for reuse. The system also includes a control system that monitors signals representative of the various parameters associated with the system and provides appropriate output signals to operate the various components of the system.

In another exemplary embodiment, a water reclamation system for reclaiming contaminated water includes a shell and tube boiler that boils the contaminated water so that steam exits the boiler and contaminants are collected in the boiler. Parabolic solar concentrator panels and a biomass combustion device operate to heat a thermal transfer fluid that is circulated through the boiler to provide heat energy to boil the contaminated water. A steam energy conversion device receives the steam from the boiler and drives an electric generator. One or more heat loads receive the steam exhausted from the steam energy conversion device. A condenser receives and condenses the steam exhausted from the heat loads. A control system operates the solar panels when an amount of sunlight is adequate to heat the thermal transfer fluid sufficiently to boil the contaminated water in the boiler, and operates the biomass combustion device when the amount of sunlight is not adequate to heat the thermal transfer fluid sufficiently to boil the contaminated water in the boiler. A filter station may be provided to filter the contaminated water prior to boiling the water in the boiler. A natural gas fired heating device may be provided as a backup to the solar panels and biomass combustion device. The solar panels may include a rectangular tube for heating the thermal transfer fluid. The steam energy conversion device may include a piston-type steam engine or a Tesla turbine. The heat loads may include laundry equipment, farm equipment, ethanol distillation equipment, or process facility equipment. An algae tank may be provided to receive exhaust gases from the biomass combustion device to promote growth of the algae and to reduce the volume of carbon dioxide emission in the exhaust gases. One or more moisture-vapor separators may be provided to remove contaminants from the steam.

In a further exemplary embodiment, a method of reclaiming contaminated water includes providing a shell and tube boiler, directing the contaminated water to the boiler and boiling the contaminated water so that steam exits the boiler and contaminants are collected in the boiler, and removing the collected contaminants from the boiler. The method also includes circulating a thermal transfer fluid to the boiler to boil the contaminated water, and heating the thermal transfer fluid using solar panels when an amount of sunlight is adequate to heat the thermal transfer fluid sufficiently to boil the contaminated water in the boiler, and heating the thermal transfer fluid using a biomass combustion device when the amount of sunlight is not adequate to heat the thermal transfer fluid sufficiently to boil the contaminated water in the boiler. The method may also include directing the steam from the boiler to a steam energy conversion device and driving an electric generator, and directing the steam exhausted from the steam energy conversion device to one or more heat loads to provide heating. The method may also include condensing the steam exhausted from the heat loads and collecting the condensate in an evaporation pond. The method may also include providing a control system operable to receive signals representative of temperature and pressure and flow rate of the steam and thermal transfer fluid and to control operation of the boiler and the steam energy conversion device. The method may also include providing a filter station to filter the contaminated water prior to boiling the water in the boiler. The method may also include providing a natural gas fired heating device as a backup to the solar panels and biomass combustion device. The solar panels may include a rectangular tube for heating the thermal transfer fluid. The steam energy conversion device may include a piston-type steam engine or a Tesla-type turbine. The heat loads may include laundry equipment, farm equipment, ethanol distillation equipment, or process facility equipment. The method may also include bubbling exhaust gases from the biomass combustion device through an algae tank to promote growth of the algae and to reduce the volume of carbon dioxide emission in the exhaust gases. The method may also include providing one or more moisture-vapor separators to remove contaminants from the steam.

According to another exemplary embodiment, a system for reclaiming contaminated water has a contaminant collection subsystem including a boiler configured to receive and concentrate contaminants in the contaminated water by boiling the contaminated water and producing steam. A heat generation subsystem including a thermal fluid flow network circulates a thermal transfer fluid through a heat exchanger that is in communication with a heat source to heat the thermal transfer fluid. A steam energy conversion subsystem includes a steam turbine and a generator. The boiler receives the heated thermal transfer fluid to boil the contaminated water so that at least a portion of contaminants in the contaminated water are retained in the boiler, and the steam is directed from the boiler to the heat exchanger to superheat the steam, and the superheated steam is directed to the steam turbine for driving the generator.

According to yet another exemplary embodiment, a system for reclaiming contaminated water at a facility has a contaminant collection subsystem including a boiler that receives and concentrates contaminants in the contaminated water by boiling the contaminated water and producing steam. A gas-fired turbine burns a supply of fuel gas and drives a generator that provides power to the facility, the gas-fired turbine has an exhaust that provides a source of waste heat. A heat generation subsystem includes a thermal fluid flow network that circulates a thermal transfer fluid through a heat exchanger that is in communication with the source of waste heat from the gas-fired turbine to heat the thermal transfer fluid. The boiler receives the heated thermal transfer fluid to boil the contaminated water so that at least a portion of contaminants in the contaminated water are retained in the boiler.

According to still another exemplary embodiment, a system for reclaiming municipal wastewater having sewage contaminants includes a contaminant collection subsystem with a boiler that receives the municipal wastewater and concentrates the sewage contaminants into a concentrated sewage sludge by boiling the municipal wastewater and producing steam. A heat generation subsystem includes a thermal fluid flow network that circulates a thermal transfer fluid through a heat exchanger that is in communication with a biomass combustion device that burns a biomass material to heat the thermal transfer fluid. The boiler receives the heated thermal transfer fluid to boil the municipal wastewater and the biomass material comprises the concentrated sewage sludge.

According to yet another exemplary embodiment, a system for reclaiming contaminated water has a contaminant collection subsystem including a boiler that receives and concentrates contaminants in the contaminated water by boiling the contaminated water and producing steam. A heat generation subsystem includes a thermal fluid flow network that circulates a thermal transfer fluid through a heat exchanger that is in communication with a heat source to heat the thermal transfer fluid. A steam turbine receives the steam, and a modular condensing system receives and condenses the steam from the steam turbine. The modular condensing system includes (i) a plurality of vertically oriented planar heat exchangers having an interior with a pattern of baffles for directing the steam though a flow path, and an exterior, (ii) a water supply and nozzles configured to direct cooling water onto the exterior of the planar heat exchangers, and (iii) at least one fan configured to create an airflow over the exterior of the planar heat exchangers.

BRIEF DESCRIPTION OF THE DRAWINGS

Exemplary embodiments of the invention will hereafter be described with reference to the accompanying drawings, wherein like numerals denote like elements.

FIG. 2 depicts a block diagram of a method for a water reclamation system for use with a process facility or farm, according to an exemplary embodiment.

FIG. 3 depicts a schematic image of a contaminant collection device in the form of a vertical tube and shell heat exchanger, according to an exemplary embodiment.

FIG. 4B depicts a schematic image of a detailed elevation view of the steam energy conversion device in the form of a piston-type steam engine, according to an exemplary embodiment.

FIGS. 4C-4F depict schematic images of the detailed portions of a slide valve for use with a piston-type steam engine, according to an exemplary embodiment.

FIG. 6 depicts a schematic image of a solar heat generator, according to an exemplary embodiment.

FIG. 7A depicts a schematic image of a contaminant collection device having multiple stages, according to an exemplary embodiment.

FIG. 8 depicts a schematic image of an elevation view of a biofuel combustion device, according to an exemplary embodiment.

FIG. 10 depicts a schematic image of a combustion chamber portion of the biofuel combustion device of FIG. 8, according to an exemplary embodiment.

FIGS. 11A-11H depict a schematic image of a contaminant collection device, according to an exemplary embodiment.

DETAILED DESCRIPTION

Figure 1:
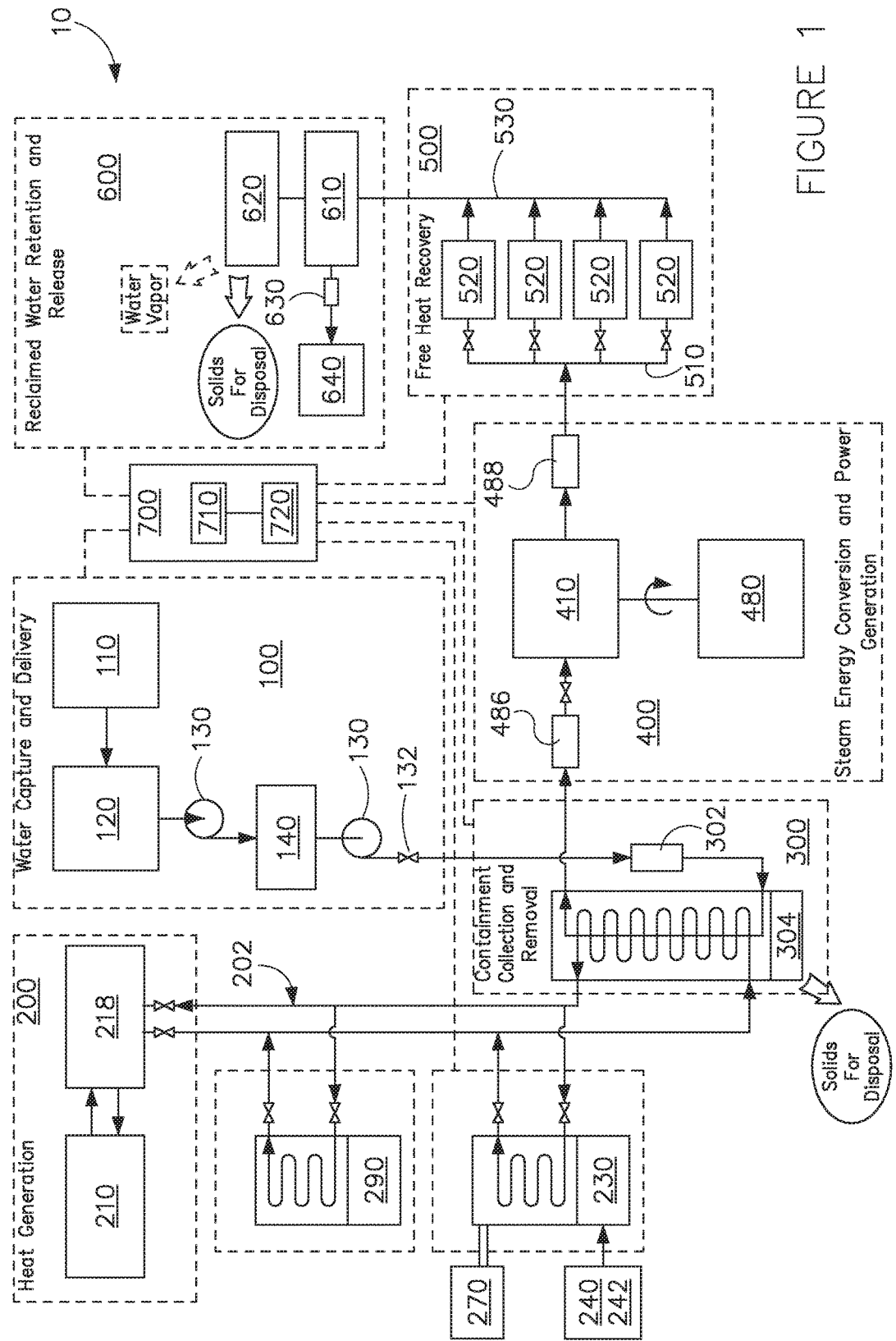
FIG. 1 depicts a schematic diagram of a water reclamation system for use with a process facility or farm, according to an exemplary embodiment.

With reference to FIG. 1, a water reclamation system 10 is shown according to one exemplary embodiment to include the following primary regions or subsystems: a water capture and delivery region 100; a heat generation region 200; a contaminant collection and removal region 300; a steam energy conversion and power generation region 400; a free heat recovery region 500; a reclaimed water retention and release region 600; and a control system 700 interfacing with each of the regions to coordinate and control operation of the equipment within the regions of the system.

The water capture and delivery region 100 is shown to include a processing facility, operation or farm (shown collectively as 110) that uses water in the processing of a product (such as a food or agricultural or livestock product). According to one embodiment, the product is an agricultural product such as, for example, olives and the water is used in the processing of the olives (or other agricultural product) for consumption by humans. According to another embodiment, the facility may be a winery that uses water for processing and discharges organics and wastewater. According to yet another embodiment, the farm may be a dairy farm that discharges waste water having a relatively high concentration of organic materials. According to still another embodiment, the facility may be an oil-drilling facility (e.g., field, rig, etc.) producing waste water having a relatively high concentration of salts and hydrocarbons. Accordingly, all such embodiments are intended to be within the scope of this disclosure.

The contaminated water is discharged from the facility 110 and captured for reclamation in a contaminated water holding reservoir 120 (or other suitable large scale storage or retention device, such as a tank, silo, pond, etc.). According to one embodiment, the reservoir 120 is formed on a relatively level (or concave) section of ground outside and adjacent to the facility 110, and includes a berm approximately five (5) feet high and defining a perimeter that encloses an area of approximately 10,000 square feet (although other berm heights and reservoir sizes may be used to suit the process requirements of a particular facility). A durable, rugged and waterproof membrane (e.g., layer, sheet, etc.) of material is provided on the enclosed ground and over the berm to form the reservoir. According to one embodiment, the waterproof membrane is made of polyurethane with a thickness of approximately 60 mils and is commercially available from B&B Supply of Fresno, Calif. The membrane is preferably black in color to enhance solar heating of the contaminated water in the reservoir to promote evaporation of the contaminated water. After being discharged from the facility 110, the contaminated water is retained within the reservoir 120 until processed by the water reclamation system. The contaminated water is delivered (e.g., routed, directed, transported, etc.) from the reservoir 120 to the contaminant collection and removal region 300 using suitable piping (e.g., tubing, conduits, etc.). According to the illustrated embodiment, one or more pumps 130 may be used for moving the water, and an intermediate storage tank 140 is provided for allowing particulate contaminants in the water to settle. According to one exemplary embodiment, the results of a chemical analysis of a sample of contaminated water from the facility 110 for processing by the system resulted in an average TDS of approximately 10,538.8 mg/L.

Referring further to FIG. 1, upon delivery under pump pressure from the reservoir 120 and/or storage tank 140, the contaminated water enters the contaminant collection and removal region 300. According to the illustrated embodiment, the contaminated water is first directed through a filtration station 302 having one or more sets of filters to remove any particulate contaminants from the contaminated water. According to one embodiment, the filters are a self-flushing type commercially available from US Filter or Seimens Water Technologies and having a sieve size of approximately twenty (20) microns (although any suitable filter size may be used according to other embodiments or applications where the contaminated water has other types of contaminants). According to an alternative embodiment, the filtration station may include reserve osmosis or other suitable filtration equipment.

Figure 11B:
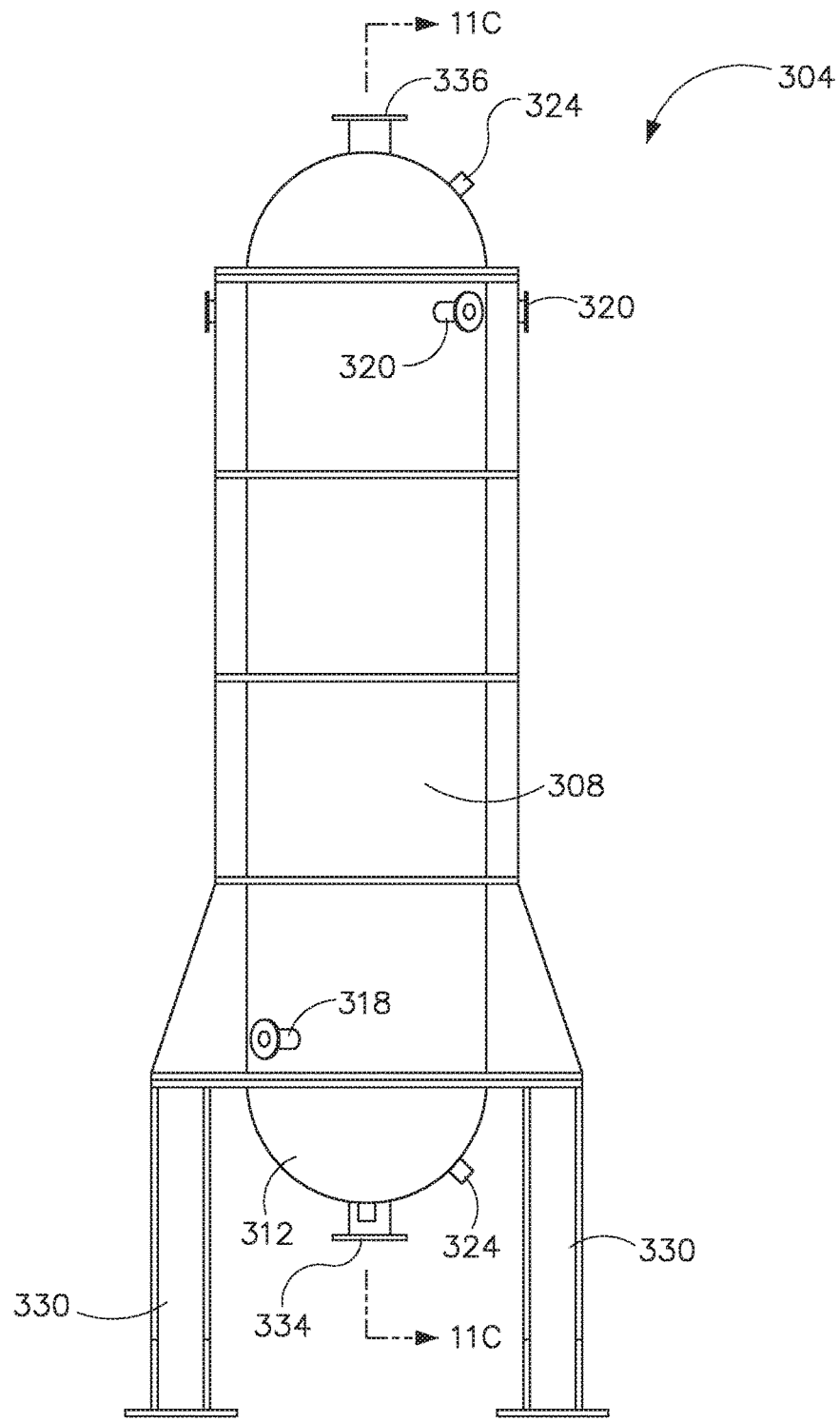
Figure 11C:
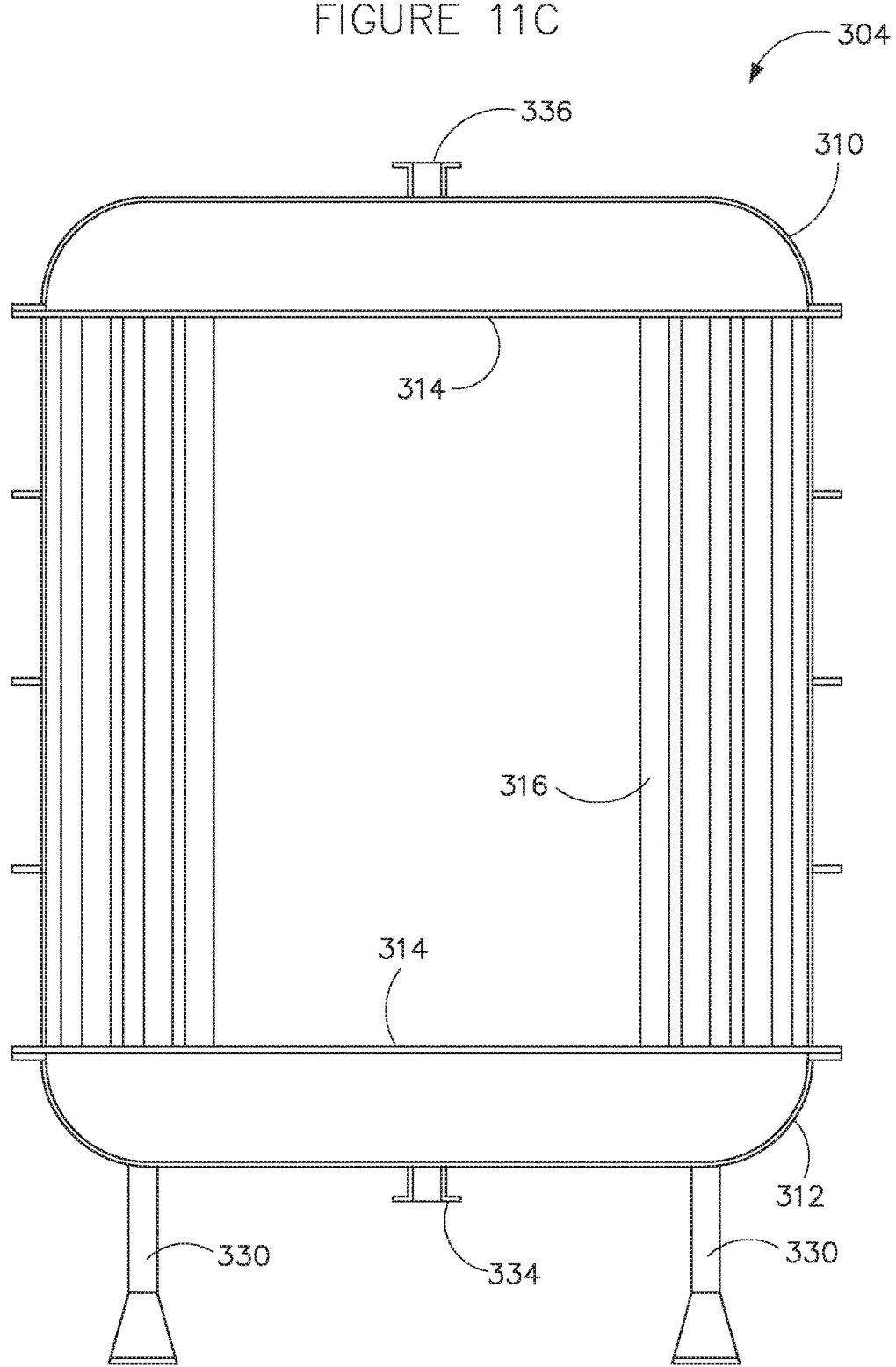

Upon discharge from the filter station 302, the filtered process water enters a contaminant collection device 304. According to one embodiment, the contaminant collection device 304 comprises a vertical shell-and-tube heat exchanger (e.g., boiler, steam generator, etc.—shown more particularly in FIGS. 3 and 11) and the contaminated water is directed in through the bottom of the tube-side of the heat exchanger 304 where it is heated and converted (e.g., boiled, evaporated, etc.) to steam and discharged from the tube side at the top of the heat exchanger 304. The heat for converting the contaminated water to steam is provided by a thermal transfer fluid that is heated in the heat generation region of the system and directed through the shell side of the heat exchanger 304. The conversion of the contaminated water to steam results in the concentration or distillation of the contaminants (e.g., TDS, etc.) from the contaminated water so that the contaminants are collected within the heat exchanger 304 (e.g., within the bottom and/or top end bells and along the surfaces of the tubes of the heat exchanger).

Referring more particularly to FIGS. 11A-11G, the contaminant collection device in the form of heat exchanger 304 is shown in more detail. The collection device 304 is shown to include a vertical shell and tube heat exchanger designed to meet the requirements of the ASME Boiler and Pressure Vessel Code. The heat exchanger 304 includes a sidewall with two parallel elongated wall sections 306 and joined at opposite ends by two rounded (shown as semicircular) wall sections 308 to provide a rounded rectangular cross section. The top and bottom end heads 310, 312 (e.g., bells, etc.) are joined to the top and bottom of the side walls sections 306, 308 (respectively) to form a pressure vessel. An end wall 314 having an array of apertures (e.g., tube sheet, etc.) is disposed on the top and bottom of the side walls 306, 308 and an array of tubes 316 are arranged in a pattern within the vessel corresponding to the apertures and fixed to the tube sheets 314 to provide the tube-side of the heat exchanger 304 so that the contaminated water flows into one end bell 312, through the apertures and tubes 316 and into an opposite end bell 310. The side walls sections 306, 308 of the shell of the heat exchanger 304 includes thermal transfer fluid inlet nozzles 318 (shown for example as six nozzles) spaced about a lower perimeter of the side wall sections 306, 308. The rectangular shape of the contaminant collection device and the spacing, location, and separation distance of the thermal transfer inlet nozzles 318 are designed so that each tube is within a predefined maximum distance from each thermal transfer fluid inlet 318 (e.g., twelve inches according to one embodiment). The shape of the heat exchanger 304 and number/location of the thermal transfer fluid inlet nozzles 318 are intended to permit the device to be built larger and still have a relatively uniform distribution of thermal transfer fluid to all of the tubes in the heat exchanger. Thermal transfer fluid outlet nozzles 320 are shown as spaces about an upper perimeter of the side wall sections 306, 308. The length of the tubes 316 are sufficiently long to accommodate foaming and frothing of the contaminated water within the heat exchanger 304 so that carryover of foam and froth with the steam discharge from the heat exchanger is eliminated or minimized. According to one embodiment, the length of the tubes 316 is approximately 89 inches, but may be other lengths as appropriate for use with certain contaminants and other process parameters (e.g., required flow rates, etc.).

The heat exchanger 304 includes four legs 330 that are removably coupled to the heat exchanger 304 and designed to comply with modern seismic/earthquake standards. A plurality of connector flanges 324 (shown for example as three connector flanges) are provided as instrument nozzles to accommodate instrumentation intended to accurately monitor pressure, temperature and corrosion sensors within the heat exchanger 304. An inlet and outlet nozzle 334, 336 are provided on the lower and upper end bells 312, 310 respectively for supply of the contaminated water and discharge of steam.

According to the illustrated embodiment, the heat exchanger 304 may be provided with the following specific features by way of example, however variations in sizes, quantities and capacities to accommodate other applications are intended to be within the scope of the invention: the components are formed from steel, such as 304 stainless steel, or carbon steel; shell side design pressure is approximately 100 psig and design temperature is approximately 560° F.; the number of tubes is approximately 97 tubes each having an outside diameter of approximately 3.5 inches; the energy rating of the heat exchanger is approximately 150 hp, but may be scaled up to approximately 500 hp.

According to the illustrated embodiment, the heat exchanger 304 is intended to operate in a manner that actively promotes "fouling" of the heat exchanger surfaces (unlike most conventional heat exchangers that are operated in a manner intended to avoid fouling), as a method for separating the contaminants from the contaminated water. The contaminants may be removed from the heat exchanger in a generally non-invasive manner by periodically discharging water with the highly concentrated contaminants from a bottom drain of the heat exchanger (e.g., blow-down, blow-by, etc.) and directing the water to a containment location (e.g., evaporation pond or heat exchanger, storage tank etc.). The contaminants may also be removed in a more invasive manner where the heat exchanger is opened and cleaned at periodic intervals to remove the collected mass of contaminants that were removed from the contaminated water. The contaminants may be removed in any suitable manner, such as manual removal. For example, the top and/or bottom ends 310, 312 of the heat exchanger 304 may be removed to permit access to the tube 316 ends by a suitable device for removing the contaminants (e.g., with tools such as an auger, or push-rod, agitator, or the like). According to one embodiment, an auger may be used having several heads to clean multiple tubes simultaneously. According to another embodiment, the contaminants may be removed in an automatic or semi-automatic manner (e.g., ultrasonically, compressed air, etc.). For example, the heat exchanger 304 may be filled with water and an ultrasonic probe(s) is lowered into the tubes. When the probe is activated, the high frequency sound waves create sufficient vibration to dislodge the contaminants from the tubes for collection beneath the tubes. The Applicants believe these methods of collecting the contaminants from the interior of the heat exchanger are particularly well-suited for applications where the contaminants include high concentrations of salts and/or sulfates, and the contaminants form a dense layer that carries the sound vibrations well. The contaminants removed from the interior of the tubes 316 may be collected in the bottom end bell 312 and flushed out, or collected in another suitable repository (e.g., cart, drum, bin, dumpster, shipping container, etc.) and then dried (if necessary—e.g., by evaporation, sunlight, etc.) and then disposed in a suitable manner (e.g., sale to others as a reusable chemical byproduct, landfill storage, etc.). According to other embodiments, where the contaminants include oil and organics, the oil and organics tend to create frothing of the contaminated water within the tubes. The frothing tends to promote rising of the solids to the top of the tubes, where the solids are carried out of the heat exchanger 304 by the velocity of the steam. As the solids and other contaminants exit the heat exchanger 304, they are separated from the 'clean' steam (by separators as further described herein) and may be diverted to a drying device (e.g., pan, pond, reservoir, etc.) where the remaining water, also known as 'blow-by' water is evaporated. The amount of blow-by water is less than 5% of the total water processed by the boiler. In various embodiments, the amount of blow-by water is between $1\% \leq x < 5\%$ (e.g., including 1% but not including 5%) of the total water processed by the boiler. In some embodiments, the amount of blow-by water is 1% of the total water processed by the boiler. In some embodiments, the amount of blow-by water is between 1% and 3%, inclusive (e.g., including 1% and 3%), of the total water processed by the boiler. For example, if the boiler processes 100 gallons of water, the amount of blow-by water is between 1 gallon and 3 gallons, inclusive (e.g., including 1 gallon and 3 gallons), in these embodiments. According to alternative embodiments, an agent may be used in the contaminated water to promote frothing as a less invasive method of removing the contaminants from the boiler. In this manner, the heat exchanger 304 is operated as a distillation-type device that collects the contaminants within, and discharges steam from the heat exchanger 304 for use in the steam and energy conversion and power generation region 400 and the free heat recovery region 500.

Although only one heat exchanger 304 is shown in FIG. 1 for clarity, two or more heat exchangers may be provided (e.g., arranged and connected in parallel) to obtain a desired capacity for reclaiming the contaminated water from the facility or farm. According to such an embodiment, one or more "extra" heat exchangers may be provided in order to accommodate maintenance and removal of collected contaminants, so that a desired number of heat exchangers remain in operation while others are cleaned and/or maintained. According to one embodiment, the heat exchanger 304 operates with a contaminated water flow rate of approximately 120 gallons per hour (GPH), and a shell-side heat transfer fluid inlet temperature of approximately 460 degrees Fahrenheit (° F.) and flow rate of approximately 81 GPH. However, other flow rates (e.g., 50-500 GPH) and temperatures (e.g., 250-750° F.) may be used to achieve the desired steam generation and contaminant removal within the heat exchanger. According to alternative embodiments, the contaminant collection device may be a horizontal shell and tube heat exchanger, tank, still, or any other type of apparatus for converting contaminated water to steam and collecting the contaminants within the apparatus and discharging the steam for use in other applications.

Figure 7B:
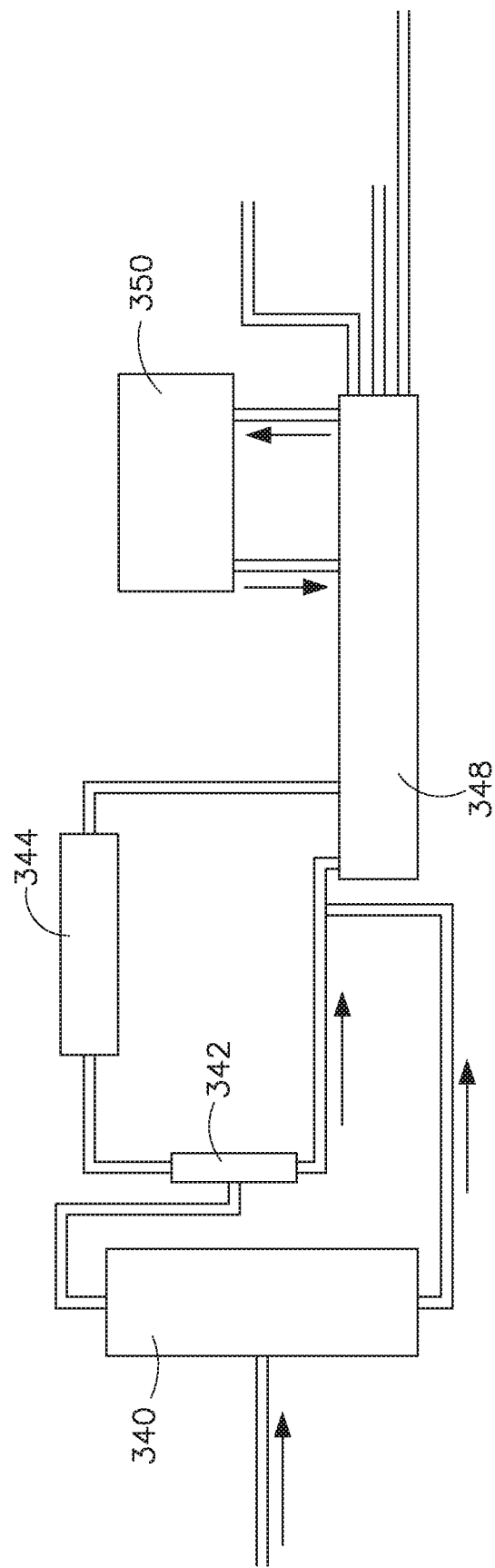
FIG. 7B depicts a schematic image of a system for separating chemical compounds from concentrated contaminated water, according to an exemplary embodiment.

Referring to FIGS. 7A-7B, the heat exchanger 304 may be provided in multiple stages (e.g., in a cascade arrangement, etc.), according to an exemplary embodiment. The multi-stage contaminant collection device may be suited to applications having particularly high levels of contaminants, or for applications where zero liquid discharge is desired. For example, according to the illustrated embodiment, a first contaminant collection device (shown as a main boiler 340) operates at relatively high pressure as a contaminant collection device in a manner as previously described. Highly contaminated liquid water having a concentrated collection of contaminants (e.g., "concentrate") is directed from the main boiler 340 to a steam separator 342 and then to a secondary (e.g., supplemental, cascade, etc.) boiler 344 operating at a reduced pressure. The secondary boiler 344 re-processes (e.g., boils, evaporates, etc.) the concentrate and discharges steam to a steam outlet line 346, and liquid water having a further concentrated collection of contaminants may be directed to a third boiler (not shown) for continued processing, or to an evaporator 348 (such as a plate evaporator or the like), or to an evaporation pond to further collect and separate the contaminants from the water. Accordingly, all such variations of the contaminant collection device are included within this disclosure.

Referring further to FIG. 7B, certain chemical compounds may be separated from highly contaminated water discharged from the contaminant collection device or boilers 340, 344, according to an exemplary embodiment. According to the illustrated embodiment, the concentrate may be used to separate (e.g., by precipitation, crystallization, etc.) certain other commercially desirable chemical compounds from the water, such as calcium sulfate, sodium sulfate, etc. For example, the separation of sodium sulfate may be conducted using any suitable procedure, such as concentration and temperature reduction. The Applicants believe that concentrating the contaminants in the water (using the contaminant collection device) to a TDS level of approximately 120,000 mg/L and then capturing the concentrate in a container (e.g., "solid separation tank") where the temperature of the water can be reduced sufficiently (e.g., to approximately 38° F.) to produce precipitation and/or crystallization of the compounds from the water. The water may then be drained from the container and re-processed by the system, and the precipitated crystals may be collected and dried. By further way of example, concentration and temperature change may be used to cause the separation of calcium sulfate. According to one embodiment, the contaminant collection devices are used as brine boilers to increase the concentration of the brine to approximately 160,000 parts per million (PPM) (e.g., approximately 16% solids) and then the highly concentrated water is directed through a cooling tower 350 or evaporation tower (such as a cooling tower of the type that are commercially available from the Amcot Cooling Tower Corporation of Ontario, Calif.) or the like to cause calcium sulfate to crystallize and collect on the bottom of the tower 350. According to alternative embodiments, the separation of the chemical compounds from the water may be conducted using other suitable processes, such as ion exchange, or raising the ph of the reclaimed water using an alkaline material such as lime, or the like. All such variations are intended to be within the scope of this disclosure.

Referring further to FIG. 1, the heat generation region 200 of the system 10 for providing a heat source to the contaminant collection device 304 is illustrated according to an exemplary embodiment. The heat generation region 200 is shown to include multiple heat generators, which may operate independently or in cooperation with one another, and which may operate sequentially or simultaneously. The heat generators are shown to include a solar heat generator 210, a biofuel heat generator 230, and a natural gas heat generator 290. Each of the heat generators is configured to add heat to a thermal transfer fluid that is circulated through a piping loop 202 to the contaminant collection device for providing heat to convert the contaminated water to steam. According to the illustrated embodiment, the piping loop 202 communicates with each heat generator in a parallel configuration and includes suitable valves to permit isolation of each heat generator from the loop, so that any one or more of the heat generators may operate to add heat to the thermal transfer fluid circulating in the piping loop 202 to, and through, the contaminant collection device 304. According to one embodiment, the heat transfer fluid is known as XCELTHERM® 600 commercially available from Radco Industries of LaFox, Ill.

According to one embodiment, the control system 700 operates the heat generators and associated valves as necessary to maintain a relatively constant temperature and flow of the heat transfer fluid to the contaminant collection device 304. For example, the control system 700 is normally configured to operate the solar heat generator 210 as the primary heat generator during the day time (i.e. when sufficient sunlight is available), and to operate the biofuel heat generator 230 at nighttime (or when sufficient sunlight is not available). The natural gas heat exchanger 290 is typically in a "standby" mode for use as a back-up when either the solar heat generator 210 and/or the biofuel heat generator 230 are unavailable (e.g., during maintenance, etc.). According to any preferred embodiment, the solar heat generator 210 and biofuel heat generator 230 are the primary heat generators to provide a renewable and environmentally friendly heat source for removing the contaminants from the contaminated water.

Referring to FIGS. 1 and 6, the solar heat generator 210 is shown according to one embodiment. Solar heat generator 210 in FIG. 6 includes a plurality of reflective parabolic solar panels 212 (e.g., troughs, etc. arranged in the form of a solar array, etc.) that concentrate sunlight on a collector tube 214 positioned generally at a focal point of the reflector 212. According to one embodiment the collector tube 214 acts as a conduit for transporting the thermal transfer fluid through the solar concentrator 212 and the tube 214 has a substantially rectangular shape with dimensions of approximately one (1) inch wide by three (3) inches high, which the Applicants believe provides advantageous heat transfer characteristics over conventional collector tubes 214 having a circular cross-sectional shape. According to other embodiments, the substantially rectangular collector tubes 214 may have dimensions of approximately one (1) inch wide by four (4) inches or five (5) inches high, although other dimensions may be used to obtain optimum heat transfer characteristics for a particular solar panel geometry. For example, the Applicants believe that the additional height provided by the reflective sidewalls of the tubes provides a larger target for the reflected light, and promotes turbulent flow of the thermal transfer fluid within the tube to reduce the fluid boundary layer effects and enhance the heat transfer characteristics (relative to conventional circular tubes). The heat transfer fluid is circulated in a "loop" through the collector tube where it is heated by the reflected sunlight incident on the surfaces of the rectangular collector tube 214, and then to an insulated reservoir 218 (e.g., tank, etc.) to provide a source of heated thermal transfer fluid for use in removing contaminants from the contaminated water in the contaminant collection device. According to one embodiment, the surface area of the reflective panels 212 is approximately 200,000 square feet, corresponding to a power generation capability of approximately 2 MW, and the heat transfer fluid is circulated at a flow rate of approximately 25-100 GPH, and more particularly 35-75 GPH, and yet more particularly 45-65 GPH, and is heated to a temperature of approximately 600° F.

It should be understood that the present invention may work with a variety of solar arrays available from commercial sources. It is desirable, however, that the solar array be a parabolic concentrator trough that is able to concentrate sunlight approximately eighty-two times onto the collector tube that runs through the focal center of the trough. In such solar arrays, the collector tube may be painted black (or otherwise provided with a black surface) with a high temperature black paint such as that known as solcoat. The parabolic mirror trough should be supported by a framework; here a framework of angular steel may be employed, as is known in the art. Such solar arrays are available, for example, from Solar Genics of Golden, Colo., Soele of Jerusalem, Israel or Five Star Engineering of Boulder, Colo. These parabolic troughs typically have an efficiency of around 80 percent (sun/heat) depending upon the time of year. The amount of square footage of the solar array according to the present invention, of course, will depend upon the size of the site to be designed. Such arrays may be anywhere from a few thousand square feet to several million square feet, again depending upon the amount of thermal transfer fluid to be heated. The panels may be made of any suitable material such as aluminum and the collector tube may be made of a suitable material, such as copper, aluminum, steel, etc.

The solar heat generator 210 also includes a tracking device 220 operable to tilt or "rock" the panels in a back-and-forth manner to permit the panels to track the east-to-west motion of the sun throughout the course of the day. According to one embodiment, the tracking device includes heat gain transducers (e.g., having thermistors, etc.) in a closed loop control arrangement to provide an active sensing system that senses the movement of the sun and in turn adjusts the tilt of the panels by driving a motor and linkage connected to the panels. Such a tracking device is commercially available from Beartrap Enterprises of Coalinga, Calif.

According to another embodiment, the reservoir 218 for storing the thermal transfer fluid may be insulated, or otherwise provided as an energy storage device for storing the thermal energy of the heated thermal transfer fluid. For example, the reservoir 218 may be provided as a thermal energy storage system. One type of thermal energy storage system may be provided as a buffer storage, for example to be accessed during transitory time periods (of e.g., about 30 minutes to about 3 hours) during which the heating generation region of the system may not be able to match the requirements for a given load demand (such as when solar radiation is attenuated by transitory cloud cover or when a transitory load demand exceeds the steady state capacity of the system or a temporary interruption of the biomass supply, etc.). In contrast, the thermal energy storage system may be provided for longer-time storage, for example 3 hours to 24 hours, etc.

The thermal energy storage system may include a thermal energy storage medium and a plurality of conduits buried within the storage medium in a heat exchange relationship with the storage medium to form a composite structure, and the composite structure is surrounded by a layer of an insulating material. Each conduit is arranged to carry the thermal transfer fluid through the thermal energy storage medium and may also have thermally conductive heat transfer elements (e.g., fins, plates, disks, sheets, etc,) to enhance heat transfer between the storage medium and the conduits. Each of the heat transfer elements functions alternatingly as a heat distributor and retriever and it extends into the energy storage medium for the purpose of transferring thermal energy reversibly between the thermal transfer fluid in the associated conduit and the discrete (thermally conductive) components of the medium.

The thermal energy storage system may be located at least in part above the local ground level, or located below ground level and integrated in the localized ground so that the ground itself forms an extension of the thermal energy storage system (e.g., located beneath or around the solar collector 212 array or other suitable location).

Particulate insulating material (e.g., relatively non-conductive material) or a mat-type insulating material (not shown) may be located about and/or over the top of the thermal energy storage system. Such insulating material optionally comprises sand and/or rock dust and the upper region of the storage system may optionally comprise a higher grade insulating material and may be positioned upon an upper region of the storage system, at or a small distance below ground level.

The thermal energy storage medium may include any of a wide variety of materials such as, but not limited to, rock, gravel, sand, silt, clay, quartzite, basalt, soil, as well as specific types, chemical compositions, or isolated fractions thereof. Thus, a "material" may be, for example, rock, quartzite rock, or clay {e.g., clay may be an isolated fraction of some soils). In general, the thermal energy storage medium may comprise any medium useful for thermal energy storage, including granular thermal energy storage mediums. Additional examples of thermal energy storage mediums include concrete, sand, and an earthen structure composed substantially of conductive inorganic mineral material. Granular thermal energy storage mediums may comprise one or more granular components, and lack a binding material such as cement or hydrated lime. Granular storage mediums permit relative movement of the various components of the thermal energy storage system, including longitudinal movement of the conduits, as caused by thermal expansion within the medium. A granular storage medium typically maintains its granular integrity through complete thermal cycles, and additionally maintains its granular integrity if exposed to water.

Various materials, for example, inorganic minerals and earthen materials (e.g., topsoil and/or subsoil and/or individual materials of topsoil and/or subsoil and/or rock and/or gravel) may be useful in the thermal storage medium. Non-limiting examples of materials which may be useful include, for example, aggregate (e.g., rock, quartzite, granite, basalt, silicates, limestone, shale, hematite, alumina, periclase (MgO), etc.), gravel (e.g., quartzite, granite, basalt, silicates, limestone, shale, hematite, alumina, periclase (MgO), etc.), concrete pieces), sand, soil (e.g., topsoil and/or subsoil), clay, silt, soil organic material, metals, metal oxides (e.g., hematite, ironsand, alumina, periclase (MgO)), glass (e.g., recycled glass), silicates, metal carbonates, graphite, metal nitrates, metal nitrites, metal nitrides (e.g., aluminum nitride), molten salts, soluble minerals (e.g., soluble carbonates and nitrates), and liquids (e.g., silicone, mineral oil, glycerol, sugar alcohols, retene, tetracosane).

Referring to FIGS. 1 and 8-10, the biofuel heat generator 230 is shown according to one embodiment. The biofuel heat generator 230 (e.g., biofuel combustion device, etc.) is shown to include an enclosure 232 having a lower section 234 that operates as a combustor or combustion chamber (e.g., firebox, etc.) and an upper portion 236 with a bank of tubes 238 (e.g., heat exchanger coil, etc.) through which the heat transfer fluid is circulated and heated by the rising heat of combustion from the combustion chamber 234. A biofuel storage device 240 and feed conveyor 242 are provided to deliver a generally steady supply of biofuel to the combustion chamber 234 via top feed biofuel chutes as necessary to maintain a desired temperature of the heat transfer fluid exiting the tube bank 238. According to one embodiment, the biofuel storage device 240 is a hopper or palletized container and the conveyor 242 is a screw-feed type conveyor for receiving the biofuel from the hopper and delivering the biofuel through the biofuel chutes to the combustion chamber 234. The screw-feed conveyor is driven by a motor and gearbox arrangement that is controlled by the control system to deliver biofuel at a rate (e.g., approximately two (2)-six (6) tons/hour) that maintains the desired temperature of the heat transfer fluid exiting the tube bank 238. The biofuel combustion device 230 may be made of any suitable materials, such as steel, aluminum and the like, and insulated with a suitable insulation material, such as ceramic fiber fireboard having a temperature rating of approximately 3000° F.

According to one embodiment shown more particularly in FIG. 8, the biofuel combustion device 230 includes an external air intake having an air intake fan 244 (e.g., variable speed, etc.), a combustion chamber 234, a bed 246, directional jets 248, cup deflectors 250, a burner 252, a combustion flue nozzle 254, a heat exchanger 238, an exhaust flue 256, flue gas take-off and recirculation return ducts 258, a particulate filter 260 (e.g., scrubber, etc.) and top feed biofuel shoots 262. The scrubber 260 operates to compress the flue gas and then direct the gas for use in producing algae (through consumption of $CO_2$ in the gas) as will be described further herein.

Figure 9:
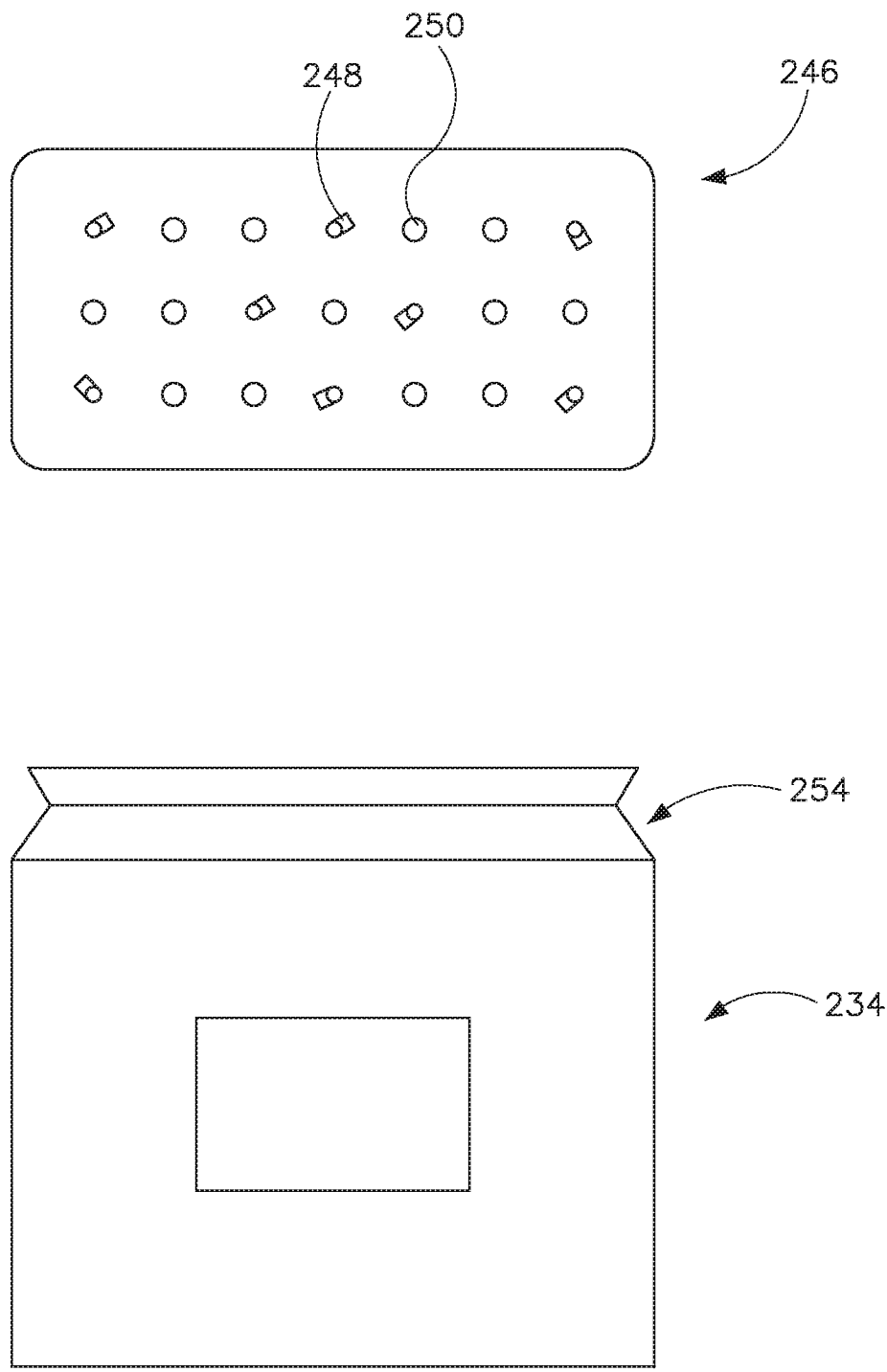
FIG. 9 depicts a schematic image of a detailed elevation view of a combustion chamber portion of the biofuel combustion device of FIG. 8, according to an exemplary embodiment.

According to one embodiment, the combustion chamber 234 operates with a combustion bed temperature within the range of approximately 1300-1800° F. The directional jets 248 and cup deflectors 250 are arranged to produce a cyclone effect at the bed 246 of the combustion chamber 234, so that the gas is accelerated and drawn away from the bed 246 so that the temperature of the bed 246 is reduced. According to one exemplary embodiment, the directional jets 248 and cup deflectors 250 are arranged in a configuration as shown in FIG. 9. A combustion flue nozzle 254 is provided at the top of the combustion chamber 234 and is configured to compress and ignite the gases at a location just below the heat exchanger 238 and provide more thorough burning of the gas.

According to one embodiment, the biofuel combustion device 230 operates with flue gas recirculation (FGR) to reduce nitrogen oxide (NOx) emissions (e.g., up to about 60 percent in certain applications) by recirculating a portion of the flue gas (e.g., about 20-25% through recirculation duct 258, although greater or lesser portions of the flue gas may be used) into the combustion chamber 234. This process is intended to reduce the peak combustion temperature and lower the percentage of oxygen in the combustion air/flue gas mixture, thus retarding the formation of NOx caused by high flame temperatures (thermal NOx—produced from the oxidation of nitrogen (N2) at temperatures above about 1500° F.). NOx emissions are generally understood to be a pervasive pollutant that causes or contributes to a wide variety of problems, such as diseases, ozone and smog formation, acid rain, and is the basis for visibility problems because of the formation of aerosols. Recirculation of the flue gas is shown by way of example to be conducted by directing the flue gas through a flue gas outlet 256 or takeoff device, and then through the particulate filter(s) 260 and then to the inlet of the combustion chamber 234 via a recirculating flue gas return duct 258 that includes a variable speed flue gas recirculation fan 264 for drawing the desired flow rate of the flue gas to the inlet of the combustion chamber 234. The remaining flue gas is directed through dispersion devices (e.g., spargers, bubblers, etc.) into water contained in the algae holding tank to promote growth of algae, as will be further described.

Referring further to FIG. 8, a flue gas heat exchanger 266 may be provided to transfer heat from the flue gas to the thermal transfer fluid, so that the thermal transfer fluid is pre-heated before entering the main heat exchanger 238 in the biofuel heat generator 230. The flue gas heat exchanger 266 may be any suitable heat exchanger (e.g., tube coil, etc.—with or without fins) and disposed internally or externally to the flue gas takeoff duct 256. The control system 700 also monitors the flue gas for its heat and gas content, and will operate the air intake and flue gas recirculation fans to control the combustion of the biofuel within the combustion chamber. For example, if NOx content exceeds a predetermined amount, the control system will reduce the speed of the fan(s) to lower the temperature of the combustion bed.

According to other embodiments, the biofuel heat generator may include a furnace, which is generally considered among the simplest combustion technology. In a furnace, biomass fuel burns in a combustion chamber, converting biomass into heat energy. As the biomass burns, hot gases are released, which typically contain about 85 percent of the fuel's potential energy. According to an alternative embodiment, the heat generation device and the contaminant collection device may be combined in a single device as a biomass-fired boiler, which is generally considered to be a more adaptable direct combustion technology because the boiler transfers the heat of combustion into steam, without the use of a thermal transfer fluid. A boiler's steam output typically contains 60 to 85 percent of the potential energy in biomass fuel. The major types of biomass combustion boilers are pile burners, stationary or traveling grate combustors and fluidized-bed combustors. Pile burners typically consist of cells, each having an upper and a lower combustion chamber, where the biomass fuel burns on a grate in the lower chamber, releasing volatile gases. The gases burn in the upper (secondary) combustion chamber. The burners may have manual or automatic ash removal systems. In a stationary or traveling grate combustor, an automatic feeder distributes the biomass fuel onto a grate, where the fuel burns. Combustion air enters from below the grate. In the stationary grate design, ashes fall into a pit for collection. In contrast, a traveling grate system has a moving grate that drops the ash into a hopper. Fluidized-bed combustors generally burn biomass fuel in a hot bed of granular material, such as sand. Injection of air into the bed creates turbulence resembling a boiling liquid. The turbulence distributes and suspends the fuel. This design increases heat transfer and is intended to allow for operating temperatures below about 972° C. (1700° F.) to reduce nitrogen oxide (NOx) emissions. Fluidized-bed combustors can also typically handle high-ash fuels and agricultural biomass residue. Accordingly, all such biofuel combustion devices and technologies are considered to be within the scope of this disclosure.

Biomass is generally considered a renewable energy source because the energy it contains comes from the sun. Through the process of photosynthesis, chlorophyll in plants captures the sun's energy by converting carbon dioxide from the air and water from the ground into carbohydrates, complex compounds composed of carbon, hydrogen, and oxygen. When these carbohydrates are burned, they turn back into carbon dioxide and water and release the sun's energy they contain. The most common way to capture the energy from biomass is to burn it, to make heat, steam, and electricity. There are many types of plants in the world, and many ways they can be used for energy production. In general there are two approaches: growing plants specifically for energy use, and using the residues from plants that are used for other purposes (e.g., food products, etc.).

According to one embodiment, the biofuel comprises a biomass waste product such as olive pits, which represent a readily available source of biomass waste resulting from the processing of olives in the facility, and combustion of the olive pits advantageously generates heat to reclaim the contaminated water, while significantly reducing the amount of biomass that would otherwise be deposited in a landfill or other undesirable location. The applicants believe that olive pits (as a form of biomass waste) represent an impressive source of biofuel for use in a water reclamation system because they generate a significant amount of heat and produce very little smoke and ash. The Applicant believes that the use of olive pits as a biofuel will result in favorable NOx emission levels, in view of applicable regulatory limits. Based upon preliminary factors, the Applicant estimates that NOx emission rates for one embodiment of the system will be approximately 11 pounds (lbs) per hour, based upon a combustion rate of approximately 42,000 lbs of olive pits per day.

According to alternative embodiments, any other suitable form of biomass waste may be used as a biofuel in the combustor, such as grass, almond or other nut shells, used pallets, pulp and paper mill residue, forest harvesting and lumber mill scrap, municipal waste, agricultural or crop waste and residues such as corn stover (the stalks, leaves, and husks of the plant), rice straw and wheat straw, animal waste (e.g., cattle, chicken and pig manure, etc.), and urban wood waste (e.g., construction waste and scraps, lawn and tree trimmings, etc.), and municipal waste (e.g., trash, landfill gas, etc.). The source of the biofuel is preferably based (at least partially) on a biomass waste product generated by the facility or farm for which water is being reclaimed, in order to maximize the overall benefit provided by the system. Alternatively, the biofuel may be acquired from biomass waste producers that would otherwise dispose of the waste in a less desirable manner (e.g., landfill storage, etc.). According to any preferred embodiment, the biofuel heat generator uses a biomass waste product to heat a thermal transfer fluid to reclaim the contaminated water, and to dispose of the biomass waste, during time periods when insufficient sunlight exists for the solar heat generator to maintain a desired temperature of the circulating thermal transfer fluid.

Referring further to FIGS. 1 and 8, the exhaust heat from the combustion of the biofuel may be used for any of a wide variety of advantageous purposes. For example, the heat may be used to pre-warm the heat transfer fluid contained in the solar heat generator reservoir. By further way of example, the exhaust heat and gasses from the biofuel combustion device may be discharged through suitable headers and nozzles (e.g., spargers, bubblers, etc.) in an algae-growing water tank 270 (e.g., pond, reservoir, photobioreactor, etc.) to promote algae growth and reduction in the amount of carbon dioxide released into the environment by the biofuel combustion device. In general, algae need water, sunlight and carbon dioxide to grow. Up to 50 percent of an alga's body weight is comprised of oil, and the oil they produce can then be harvested from the tank and converted into a biodiesel fuel, and the algae's carbohydrate content can be fermented into ethanol.

Biodiesel is often referred to as the mono alkyl esters of long chain fatty acids derived from renewable lipid sources. Others have defined biodiesel as a material made from vegetable oils or animal fats. All biodiesels are generally based on triglycerides, three fatty acids bound by glycerol. If the source is animal fat, e.g., tallow or lard or whale oil, the fatty acids are saturated, that is they contain no double bonds. If the source is vegetable, the fatty acids are unsaturated, they contain one or more double bonds. The process of making biodiesel from algae, was reported in Biodiesel from Algae, A Look Back at the U.S. Department of Energy's Aquatic Species Program, which reported that the algae species studied in the program could produce up to 60% of their body weight in the form of triacylglycerols, the same natural oil made by oilseed crops. The complete Report No. NREL/TP-580-24190, July 1998, is incorporated by reference herein in its entirety. More details on biodiesel manufacture may be taken from International Patent Application Publication No. WO2006/036836 and U.S. Pat. Nos. 6,855,838; 6,822,105; 6,768,015; 6,712,867; 6,642,399 and 6,398,707, all of which are incorporated by reference herein in their entirety.

Growth of the algae can be accelerated by bubbling supplemental carbon dioxide from the exhaust of the biofuel combustion device 230 through the algae tank 270, providing the added benefit of capturing a potent greenhouse gas before it reaches the atmosphere. Given the right conditions, algae can double its volume overnight, and unlike other biofuel feedstocks, such as soy or corn, it can be harvested day after day. Harvesting, as used herein, is the act of collecting the grown algae (e.g., algal bloom). Generally harvesting is accomplished mechanically (e.g., raking, netting, dredging), and can be accomplished manually or automatically. Typically, the harvested algae is transferred to a tank or other sealable apparatus for a degradation process. The algae tanks may be located in a generally close proximity to the other components of the system (e.g., adjacent to the contaminated water holding reservoir and/or the evaporation pond, etc.). The algae may be harvested or collected on a predetermined frequency (e.g., daily) and processed to extract the oil from the algae (e.g., by pressing or the like), for conversion to a fuel such as biodiesel.

Several methodologies are currently feasible for the production of fuel from algae. For example, methane may be produced therefrom via biological or thermal gasification. The biomass may be fermented, thereby forming ethanol. It may be burned directly. It may be pressed to release the oils therefrom and those oils may be transesterfied, in which the triglicerols therein are reacted with a simple alcohol, to form alkyl ester, which is commonly known as biodiesel. Additionally, it is generally known that certain green algae will, when subjected to an anaerobic environment, produce hydrogen, which may be recovered and used as a fuel. Other methodologies for production of biodiesel fuel from algae are described in U.S. Pat. No. 5,661,017, the subject matter of which are incorporated by reference herein in their entirety. Methodologies for production of ethanol from algae are also currently feasible. For example, ethanol may be produced using a fermentation and separation process, such as that described in U.S. Pat. No. 7,135,308, the subject matter of which is incorporated by reference herein in its entirety. Accordingly, all such uses and methodologies are intended to be within the scope of this application.

Referring further to FIG. 1, the natural gas heat generator 290 is shown according to one embodiment. The natural gas heat generator 290 is intended to serve as a back-up to the solar heat generator 210 and the biofuel heat generator 230 and is maintained in a standby mode in the event that the solar and/or biofuel heat generators are unavailable (e.g., for maintenance, etc.). Although not generally considered a "renewable" energy source, the natural gas heat generator 290 is intended to provide a relatively clean-burning source of heat for the rare occasions when solar and/or biofuel heating is unavailable, and the energy storage capability of the thermal energy storage system 218 is insufficient to provide the amount of heat necessary to maintain the desired temperature of the thermal transfer fluid, in order to maintain the operational reliability of the system.

Accordingly, the heat generation region 200 of the system 10 includes a variety of environmentally-friendly heat generators that provide heat to reclaim the contaminated water from the facility 110, and also reduce the amount of biomass waste that would otherwise be disposed in a less desirable manner, and further helps to promote the growth of algae which in turn may be used to produce biodiesel fuel and ethanol.

Referring further to FIG. 1, the heat generated by the heat generation region 200 heats a thermal transfer fluid that is circulated through a piping loop 202 to (and through) the contaminant collection device 304 to covert the contaminated water to steam and separate the contaminants from the water. According to one embodiment, the steam exits the contaminant collection and removal region 300 at a relatively "low" pressure of approximately 80-200 pounds per square inch (PSI), and more particularly, 100-170 PSI, and yet more particularly 110-150 PSI and still more particularly 130-135 PSI, and is piped to the steam energy conversion and power generation region 400. According to the illustrated embodiment, the steam energy conversion and power generation region 400 includes a steam energy conversion device 410 that converts the steam energy to a mechanical output and an electric power generator 480 that uses the mechanical output to generate electricity. The steam that is exhausted from the steam energy conversion device is then directed to the free heat recovery region 500 where the steam is then used to provide "free" heating to any of a wide variety of heat loads associated with the facility or farm. According to alternative embodiments, the pressure of the steam generated in the contaminant collection device may be higher or lower, as appropriate for a particular steam energy conversion device.

Figure 4A:
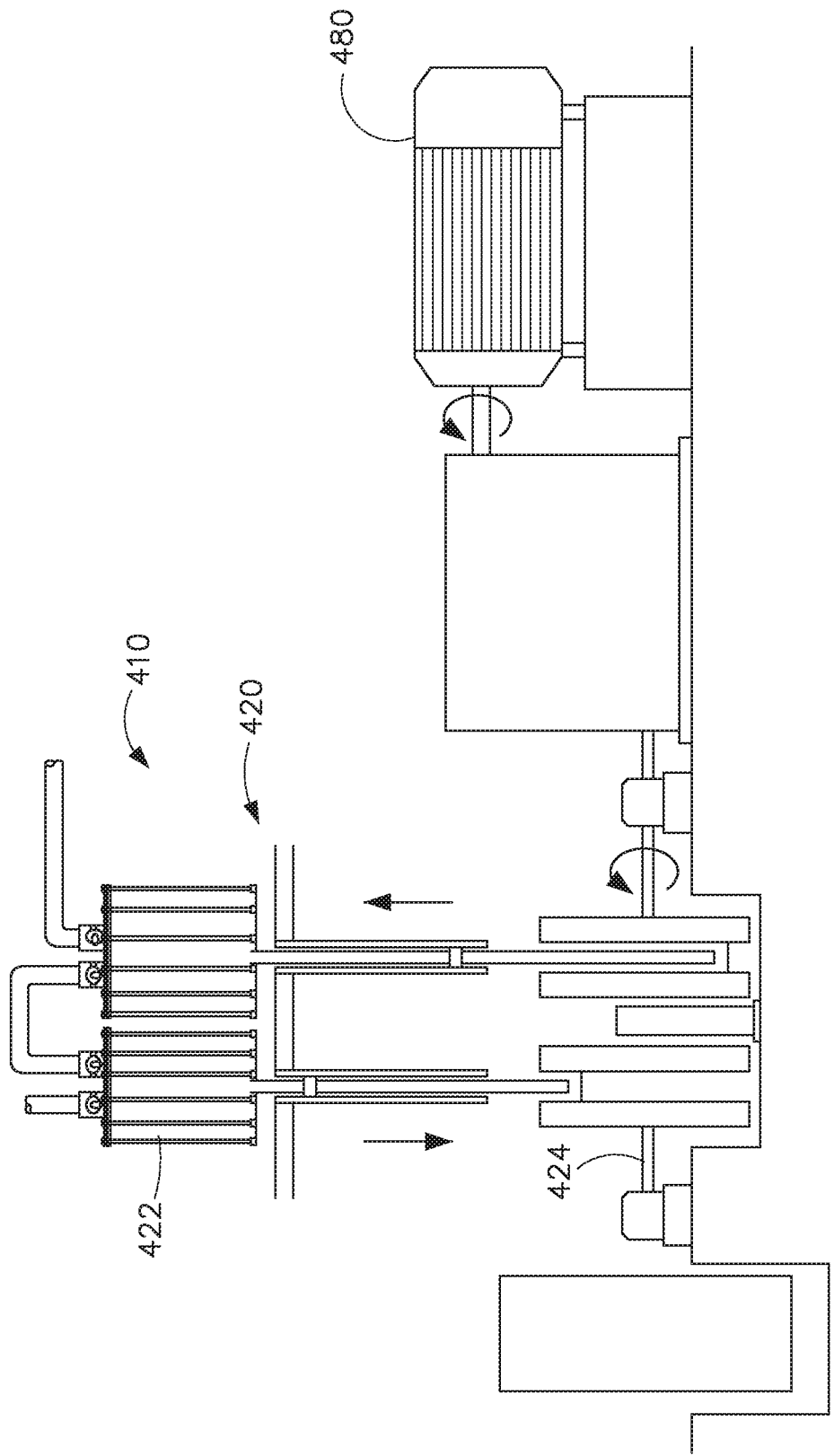
FIG. 4A depicts a schematic image of a steam energy conversion device in the form of a piston-type steam engine, according to an exemplary embodiment.

According to one embodiment, the steam energy conversion device 410 is a piston-type expansion steam engine 420 (shown more particularly in FIGS. 4A-4B) having a horse-power (HP) rating of approximately 300 HP, (but may be within the range of 5 HP-5000 HP, and more particularly within the range of 100 HP-1500 HP) which receives the steam from the boiler 304 for expansion in cylinders 422 to drive the pistons 424 and rotate a crankshaft 426 at a speed of approximately 300-325 revolutions per minute (RPM) to provide the mechanical output to the electric generator 480. The piston-type steam engine 420 has been found to be particularly suited for use in this application due to its inherent ability to tolerate contaminants (e.g., minerals, salts, sulfates, organics and chemical wastes, etc.) that may carry over in the steam from the contaminant collection device, and is thus more reliable that other devices that are less tolerant of potential contaminants in the steam supply. Further, the components of the engine 420 that are exposed to the contaminants in the steam supply are readily and economically replaced, in the event that replacement becomes desirable. A control valve 428 is provided on the steam inlet to the engine 420, and may be a manual throttle valve, or may be an automatically operated valve designed to open/close rapidly (e.g., snap-open/snap-closed, etc.) for control of the engine.

Referring more particularly to FIG. 4B, the piston-type steam engine 420 is shown to include cylinder/piston assemblies 422/424, with each assembly having associated steam transfer pipes 430 and steam chest 432 with steam input port; a control valve 428 in the form of a slide valve (such as a vertical D valve) with rocker arm 434 and a connecting rod 436 eccentrically coupled via a bearing 438 to a drive shaft 424; piston shaft 440, packing gland 442, piston guide plate 444, piston shaft guide 446, and connecting arm 448 coupled to a drive shaft. According to one embodiment, the cylinders 422 are provided in the form of stock cylindrical pipe, which may have a diameter within a range of approximately 6-42 inches, thus advantageously avoiding the need for large cast cylinders. The steam transfer box 432 is used rather than a conventional steam transfer pipe, and the block may be welded or bolted to the frame of the engine. The D valve 428 is operated as a "dual action" type slide valve by a linkage connected to a rocker arm 434 that is pivotally coupled to a connecting rod 436 which is eccentrically coupled to the drive shaft 424. The linkage, rocker arm and eccentrically coupled connecting rod allow the valve to "snap" into position, which reduces the transient time of the valve and improves the efficiency of the steam flow input/output from the cylinder. The connecting rod 436 includes an oversize rocker arm slot that allows the connecting rod to move between 5-40% of its travel before the rocker arm 434 becomes engaged. Thus the rocker arm 434 becomes engaged at a point that corresponds to mid-stroke of the connecting rod 436, resulting in a rapid (e.g., "snap," "jerk," etc.) of the linkage and opening/closing the D valve 428.

Referring to FIG. 4C-4F, the steam inlet and exhaust port arrangement within the D valve 428 is shown according to one embodiment. D valve 428 includes a steam box portion 437 and a slidable D-shaped stem 435. The steam box includes inlet ports 431 in the form of a row of apertures shown having a circular shape (however, apertures having other shapes may be used according to alternative embodiments). The exhaust port 433 on the steam box 437 is shown as a single port in the form of an elongated rectangle and positioned substantially parallel in the middle between the two rows of inlet port apertures 431. The D-shaped stem 435 includes two arms 435a, 435b having a seal material 439 on the end thereof and configured to slide back and forth over the surface of the steam box to cover and uncover the inlet ports and the exhaust ports in the desired sequence to admit and exhaust steam to/from the associated cylinder 422 as the rocker arm 434 and connecting rod 436 move the stem 435 back and forth in a snap-type motion. The Applicant believes that the inlet port apertures provide enhanced steam inlet flow characteristics that provide improved performance of the piston-type steam engine.

According to one embodiment, the piston-type steam engine 420 includes a frame 450 having a size of approximately 24 inches deep×48 inches wide by 65 inches high, and cylinders 422 having a diameter of approximately 12 inches and a height of approximately 12 inches. The engine 420 operates with a steam supply having a pressure of approximately 200 PSI and a temperature of approximately 400° F. and a flow rate of approximately 3600-4400 lb/hr, and a steam exhaust pressure within a range of approximately 10-80 PSI, to provide shaft output power of approximately 300 HP at 325 RPM for an electrical output of approximately 250 KW.

Figure 5:
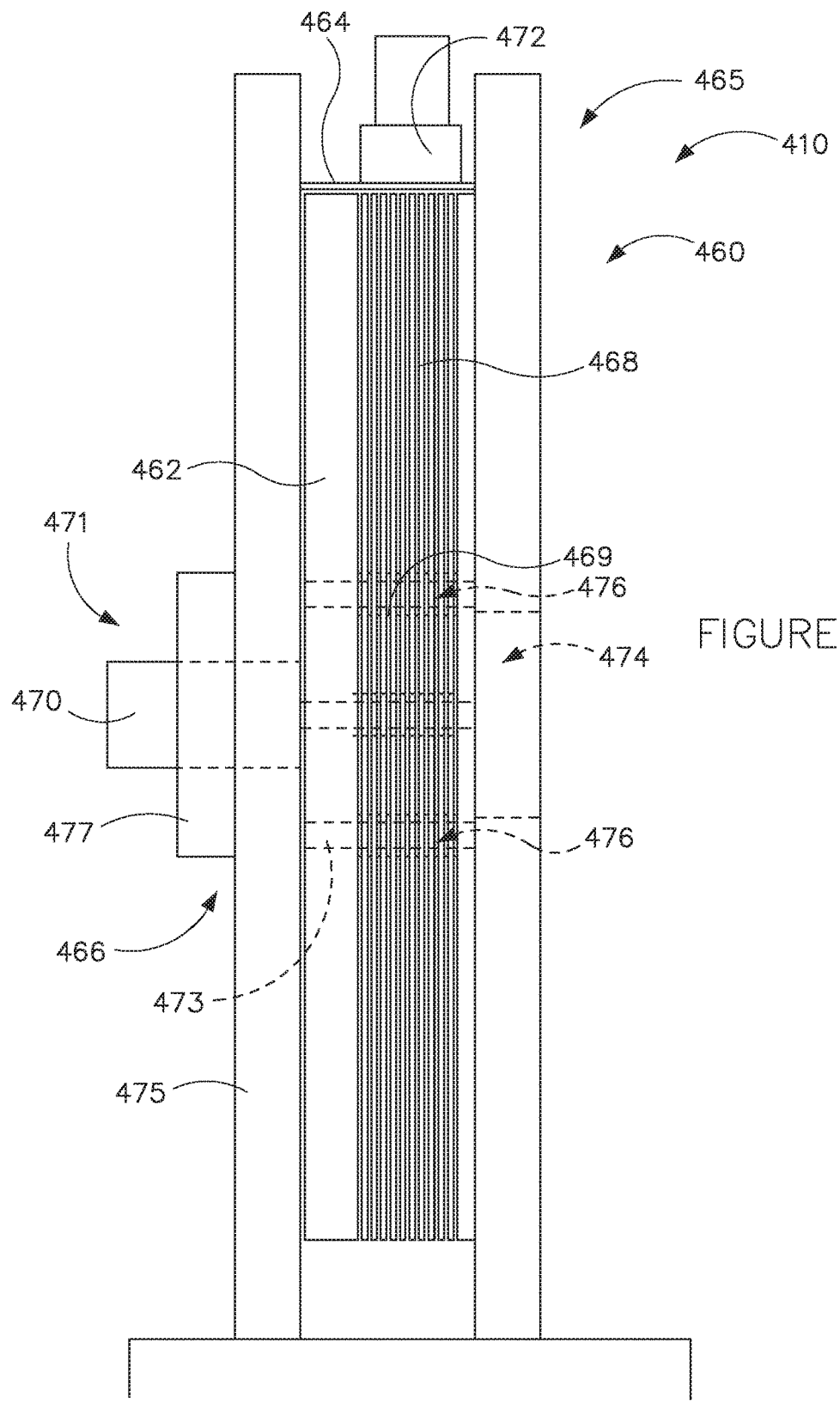
FIG. 5 depicts a schematic image of a steam energy conversion device in the form of a Tesla turbine, according to an exemplary embodiment.

According to another embodiment, the steam energy conversion device 410 may be a turbomachine such as a disk-type turbine steam engine, and more particularly such as a modified Tesla-type turbine 460 (shown more particularly in FIG. 5). Turbine 460 converts the kinetic energy of a flow of fluid (typically, wet, or "low grade" steam) from heat exchanger 304 into useful shaft power by directing the steam flow generally parallel to the faces of a series of thin rotating turbine discs 468. The fluid flow imparts momentum to the discs 468 in the direction of their rotation by means of a shear force acting through a viscous boundary layer attached to the surfaces of the discs 468. Such multiple discs 468 are located concentrically on, and attached mechanically to, a shaft 470. The assembly of turbine discs 468 and shaft 470 is generally referred to as a turbine rotor. The rotor is mounted in low friction bearings 466 and contains provision for coupling the output power of the shaft to an electrical generator 480, or other dynamic load. The rotor rotates on a fixed axis with a small amount of clearance inside a cylindrical housing 464. A fluid flow is first formed into a two-dimensional jet stream, whose width is much larger than its thickness. The center line of the jet is directed to impinge on the discs 468 in a generally tangential direction, at a location near the periphery of the discs 468. In imparting momentum to the discs 468, the fluid flow loses kinetic energy. Because the rotor is contained in a close fitting housing 464 which prohibits outward flow, the resultant loss of velocity causes the fluid to flow radially inward across the faces of the discs 468 and acquire an axial component of velocity, forming a self-stable vortex. A pattern of holes 476 penetrating through the thickness of the discs 468 centered on a circle a short distance from the center of the discs 468 provides a path to accommodate the axial flow of the fluid. Upon exiting the stack of turbine discs, the flow is directed to an exhaust port 460 and is conducted away from the housing 464 by a circular pipe (not shown).

Referring further to FIG. 5, the turbine includes three primary components, or assemblies: a nozzle-rotor housing assembly 465, the rotor assembly 471, and the rotor bearing housing assembly 466. The nozzle-rotor housing assembly 465 includes a converging-diverging, subsonic nozzle 472 penetrating through the periphery of a cylindrical housing 464 whose inside diameter is slightly larger than the outside diameter of the assembly of discs 468. The converging section (not shown) of the nozzle 472, upstream from the throat, is circular in cross-section and is fed by (for example) a short threaded section of pipe. The nozzle's diverging section, downstream from the throat, is rectangular in cross-section. The throat (where near sonic flow is achieved) is square in cross-section. The exit plane of the diverging nozzle has an aspect ratio of approximately 8-to-1, and has an area ratio (relative to the throat) of approximately 32-to-1. The divergence half-angle of the nozzle 472 is limited to approximately 12 degrees, in order to prevent flow separation and recirculation prior to the flow departing the exit plane. The rectangular cross-section fluid jet is directed onto the discs 468 through a rectangular window which penetrates the housing 464, and the nozzle 472 is welded to the cylindrical housing 464 at a location on the housing periphery where the angle of contact between the nozzle and the shell is about 45 degrees. One end of the housing 464 terminates in a fixed wall containing sealed ball bearings 466, and the other end of the housing terminates in a fixed wall with a circular exhaust port 474 located on axis.

The rotor assembly 471 includes a series of large discs 468 (e.g., "power discs" etc.) and small discs 469 (e.g., "spacer discs" etc.) placed in an alternating sequence on a shaft 470. Both varieties of discs have a central hole through their thickness, allowing a precision slip fit onto the shaft 470. The power discs 468 have an outside diameter chosen such that their rim speed, at nominal operational conditions is approximately equal to the fluid flow speed emanating from the nozzle 472. The power discs 468 have a thickness equal to approximately 1/64 their diameter. The power discs 468 also have a pattern of circular holes 476 ("axial flow holes") bored through the disc 468 centered on a circle concentric with the shaft 470 axis with a diameter approximately 1/3 the size of the outside diameter of the disc 468. The diameter of the axial flow holes is chosen such that the summation of the cross sectional areas of the pattern of holes is approximately equal to the exhaust area of the nozzle. The spacer discs have a diameter such that their outside rims are tangent to the inside rims of the axial flow holes 476 and do not occlude them, when viewed axially. The thickness of the spacer discs 469 is chosen to be twice the thickness of the effective boundary layer of the fluid at the nominal design speed, viscosity, and density conditions. The number of power discs 468 and spacer discs 469 is chosen such that the resultant stack of discs has a height approximately equal to its diameter. The disc stack is clamped together on the power shaft into a rigid unit by the action of 3 draw bolts 473 located in circular holes extending through the length of the stack and extending into hubs located on both ends of the stack. The draw bolt holes are located on a bolt circle with a diameter equal to approximately 1/3 the diameter of the power discs 468. Taper lock collets (not shown) are used to affix the hubs at each end of the stack onto the shaft 470 and transmit torque from the rotor stack to the shaft 470. A taper lock collet (not shown) is used at the end of the rotor shaft 470 to connect a drive sprocket (not shown) to the shaft 470.

The rotor bearing assembly 466 includes a short cylindrical shell 475 of approximately the same diameter as the housing 464 with a solid membrane wall attached across a diameter. The membrane wall provides a positive barrier to fluid flow, which forces all the fluid to exit the housing 464 at the exhaust 474. The membrane wall also has an on-axial hole of sufficient diameter to allow clearance for protrusion of the shaft 470 through it and bolt holes for attachment of ball bearing assemblies. A pair of ball bearings 477 are attached with threaded fasteners to either side of the membrane wall (only one ball bearing is shown for clarity) and one end of the shaft 470 protrudes through the bearings. The bearing assembly 466 thus provides a kinematically determinate location of the rotor relative to the rotor housing and allows the rotor to spin on its axis with minimum frictional loss.

According to one embodiment, the discs 468 are formed of 316 stainless steel which is intended to resist warping and improve longevity of the discs, however the discs may be made from other suitable materials such as high temperature ceramics, etc. The size of the exhaust port aperture 474 may be changed (modified, etc.,) to correspond to a desired pressure drop across the discs, such as within a range of approximately 25-90% of supply pressure. The turbine 460 is intended for operation at a relatively high RPM. For example, a 50 lb. rotor with discs having a diameter of approximately 12 inches in intended to operate at a nominal speed of approximately 15,000 RPM. The applicants also believe that the Tesla-type turbine is particularly well-suited to the water reclamation application due to its inherent ability to handle (or accommodate) potential contaminants in the steam, and its characteristic of having only a single moving part. According to alternative embodiments, other steam energy conversion devices may be used to provide a mechanical output to an electric generator, such as, for example, any of a variety of impulse type turbines.

Referring further to FIG. 1, the steam energy conversion and power generation region 400 is also shown to include a first (e.g., "upstream") moisture-vapor separator 486 at an inlet side of the steam energy conversion device 410 to help reduce any moisture carry-over in the steam from the contaminant collection device 304. The separator 486 also advantageously helps to capture contaminants that carry-over with the steam, and may be collected from the drain portion of the separator 486. According to one embodiment, a chemical analysis of a sample of the liquid and contaminants separated from the steam by the system indicated a TDS of approximately 62,100 mg/L. A second (e.g., "downstream") moisture-vapor separator 488 is shown on the exhaust side of the steam energy conversion device 410 to help remove moisture from the exhausted steam prior to the steam being directed to the free heat recovery region 500 of the system 10.

The mechanical output of the steam energy conversion device 410 is used to rotate an electric generator 480 to generate electricity. Preferably, the amount of electricity generated is sufficient to power all electrically-operated equipment in the system (e.g., valves, motors, actuators, control devices, etc.) so that the system is electrically self-sustaining. According to one embodiment, the electrical output of the generator(s) of the system is approximately two (2) mw. Surplus electrical energy may be used by the facility or farm to meet (or at least partially meet) its own electricity supply needs, or may be sold to a local utility or power provider according to local laws and regulations.

Referring further to FIG. 1, after the steam exits the downstream separator 488 it is directed to a supply header 510 in the free heat recovery region 500 where it provides "free" steam to heat any one of a wide variety of heat loads 520 typically associated with the facility, operation or farm 110. For example, the heat loads may be arranged in a parallel configuration and include such loads as: heating a potable or domestic water supply; and heating for a laundry operation; and heating for food processing operations, and heating for an ethanol distillation device; and heating for dairy processing equipment; and enhanced evaporation of compost. Accordingly, all such heat loads that can advantageously be supplied with 'free heat' from the water reclamation process are intended to be within the scope of this disclosure.

After providing free heat for the heat loads 520, the steam is typically a mixture of low quality liquid and vapor and is exhausted to a discharge header 530 which directs the steam to the reclaimed water retention and release region 600 as shown in FIG. 1 according to an exemplary embodiment.

The reclaimed water retention and release region 600 is shown to include a condenser 610, and an evaporation pond 620, and a filter station 630 and a release point 640. The steam received from the discharge header 530 of the free heat recovery region 500 is directed through a condenser 610 (e.g., on a tube side of the condenser) to condense any remaining vapor to return the steam to a liquid state in distilled form and now having a contaminant concentration that meets or exceeds regulatory requirements for cleanliness (herein referred to as 'reclaimed water'). According to one embodiment, a chemical analysis of a sample of the reclaimed water from the evaporation pond 620 and processed by the system 10 indicates a TDS of approximately 140 mg/L, which represents an average TDS reduction of approximately 98.7 percent (%) from the average sample of contaminated water from the facility 110. Cooling water for the condenser 610 may be provided from the storage tank 140, from the contaminated water holding reservoir 120, from the evaporation pond 620, or other suitable source.

The reclaimed water is then directed to the evaporation pond 620, where it is retained for testing and collection of any remaining contaminants (e.g., through evaporation, screening, etc.). In a manner similar to the contaminated water holding reservoir 120, the evaporation pond 620 is formed on a relatively level section of ground outside and adjacent to the facility 110, and includes a berm approximately two (2) feet high and defining a perimeter that encloses an area of approximately 2,500 square feet (although other sizes may be used to suit the process requirements of a particular facility). A durable, rugged and waterproof membrane (e.g., layer, sheet, etc.) of material is provided on the enclosed ground and over the berm to form the evaporation pond 620. According to one embodiment, the waterproof membrane is made of polyurethane with a thickness of approximately 60 mils and is commercially available from B&B Supply of Fresno, Calif. The membrane is preferably black in color to enhance solar heating of the reclaimed water in the evaporation pond to promote evaporation of the reclaimed water.

The reclaimed water may be permitted to return to the environment in vapor form by evaporating into the atmosphere, and/or in liquid form by return to the facility or farm for recycled usage, or direct release to the environment (e.g., drainage pipe, stream, tributary, etc.). According to a preferred embodiment, the reclaimed water that is released in liquid form is directed through a final filter station 630 and a quality checkpoint sampling station 640 to ensure proper cleanliness.

The system also includes a control system 700, including a control device 710 such as a microprocessor or programmable logic controller or the like configured to receive, from appropriate instrumentation 720, signals that are representative of the various parameters associated with operation of the system 10. The instrumentation includes temperature sensing devices (e.g., thermocouples, RTDs, thermistors and the like), pressure sensing devices (e.g., gages, transducers, etc.), flow sensing devices (e.g., differential pressure flow transducers, etc.), rotational speed sensing devices (e.g., tachometer, etc.), electric power meters (e.g., volt meters, watt meters, amp meters, etc.), and level sensors (e.g., site-glasses, differential pressure type level transducers, etc.). The parameters associated with operation of the system 10 that are monitored by the instrumentation 720 and controlled by the control device 710 include:

(a) water level in the contaminated water holding reservoir 120 and/or storage tank 140,
(b) contaminated water flow rate to the contaminant collection and removal region 300,
(c) pressure and temperature of the contaminated water/steam in the contaminant collection device 304,
(d) level of the contaminated water in the contaminant collection device 304,
(e) temperature and flow rate of the thermal transfer fluid circulating in the piping loop 202 between the heat generators 210/230/290 and the contaminant collection device 304,
(f) temperature of the thermal transfer fluid entering and exiting the collector tube 214, and temperature of the thermal transfer fluid in the solar reservoir 218,
(g) mass of biofuel remaining in the biofuel storage device 240,
(h) delivery rate of biofuel to the combustor,
(i) position of the valves of the system (i.e. open, closed, throttled, etc.),
(j) temperature and pressure of the steam entering the steam energy conversion device 410,
(k) rotational speed of the mechanical output of the steam energy conversion device 410,
(l) temperature and pressure of the steam exiting the steam energy conversion device 410,
(m) temperature and pressure of the steam exiting the heat loads, 520
(n) water level in the evaporation pond 620, and
(o) flow rate of reclaimed water being released from the release point 640.

According to one embodiment, the control system 700 uses either a two-element or a three-element control strategy for controlling the level of contaminated water in the boiler 304 to separate and collect the solids in the boiler 304. The difference between two-element and three-element control depends on the number of process variables measured and to effect control of the contaminated water level in the boiler 304 by providing an output signal to modulate the position of a control valve 132 on the supply of contaminated water to the boiler 304. These measured process variables include: liquid level in the boiler 304, flow of contaminated water to the boiler 304, and flow of steam leaving the boiler 304. The control system 700 operates to maintain liquid level in the boiler 304 to ensure that the liquid level remains low enough to provide adequate disengaging volume above the liquid, and high enough to assure that there is water present in every steam generating tube 316 in the boiler 304, which typically results in a relatively narrow range in which the liquid level in the boiler 304 should be maintained for optimal performance.

The contaminated water supply used to maintain liquid level in the boiler comes from the contaminated water holding reservoir 120 and is brought up to the operating pressure of the boiler 304 by one or more pumps 130 as shown in FIG. 1. The control system 700 includes suitable boiler control devices, such as level controller, and a flow controller (not shown).

In a two-element control (boiler liquid level to feedwater flow rate) cascade control strategy, the level controller decides whether it needs more or less flow of the contaminated water to the boiler 304. The level controller transmits its target flow as a set point to the flow controller. The flow controller then decides how much to open or close the control valve as supply pressure swings to meet the set point target. By placing this feedwater flow rate in a fast flow control loop, the flow controller will sense any variations in the supply conditions which produce a change in flow of the contaminated water supply to the boiler 304. The flow controller will adjust the position of the control valve to restore the flow to its set point before the boiler 304 liquid level is substantially affected. The level controller is the primary controller (sometimes referred to as the master controller) in this cascade, adjusting the set point of the flow controller, which is the secondary controller (sometimes identified as the slave controller).

In a three-element control strategy, the third element in the control system is the flow rate of steam leaving the boiler 304, and is useful in addressing variation in demand from the steam loads downstream of the boiler 304 (e.g., the steam energy conversion device 410, etc.). By measuring the steam flow leaving the boiler 304, the magnitude of demand changes can be used as a feed forward signal to the level controller. The feed forward signal can be added into the output of the level controller to adjust the flow controller set point, or can be added into the output of the flow controller to directly manipulate the control valve. The control systems may add the feed forward signal into the level controller output to the secondary (feedwater flow) controller set point to eliminate the need for characterizing the feed forward signal to match the control valve characteristic. Alternatively, the difference between the outlet steam flow and the inlet water flow may be calculated. The difference value is directly added to the set point signal to the feedwater flow controller. Therefore, if the steam flow out of the boiler 304 is suddenly increased by the start up of the steam energy conversion device 410 (for example) the set point to the feedwater flow controller is increased by the amount of the measured steam flow increase. Similarly, a sudden drop in steam demand caused by the stopping of one of the downstream steam loads will produce a matching drop in contaminated water supply flow to the boiler 304 without producing any significant disturbance to the boiler level control.

According to any exemplary embodiment using either a two-element or a three-element control strategy, the control system 700 monitors the appropriate process variables or parameters and provides the appropriate output signals to control the level of contaminated water in the boiler 304. The control system 700 also monitors the temperature of the thermal transfer fluid entering and exiting the boiler 304 and adjust the flow rate and/or temperature of the thermal transfer fluid to maintain the desired temperature and boiling/evaporation rate within the boiler 304. The control system 700 may designate the solar heat generator 210 as the primary or "lead" heat generator for heating the thermal transfer fluid for circulation to the boiler 304, and supplement as necessary (e.g., during cloudy conditions, nighttime, etc.) with heat provided by the biofuel heat generator 230 (e.g., as a "secondary" heat generator) to maintain a desired temperature at a corresponding desired flow rate of thermal transfer fluid to the boiler 304. For example, the control system 700 monitors the temperature of the thermal transfer fluid in the solar-heated holding tank 218 and switches operation to the biofuel heat generator 230 when the fluid temperature decreases below a predetermined setpoint (e.g., 460° F. or other suitable temperature for a particular application), such as might occur during prolonged cloudy periods or during early morning, late evening and nighttime periods, and switched operation back to the solar heat generator 210 when the temperature of the thermal transfer fluid in the solar heated holding tank 218 increases above the predetermined setpoint (e.g., during prolonged sunny conditions, etc.).

In the event that further heating capacity is necessary to maintain the desired temperature of the thermal transfer fluid, the control system 700 is configured to operate the natural gas-fired heater 290 as a back-up source of heat for the system 10. Accordingly, the control system 700 monitors the signals representative of the temperature of the thermal transfer fluid and provides the necessary corresponding output signals to control operation of the appropriate heat generators, including opening/closing isolation valves to each heat generator, controlling the thermal transfer fluid pump speed, starting/stopping the biofuel combustion device 230 and the biofuel storage 240 and feed conveyor 242, and starting/stopping the natural gas-fired heater 290. Accordingly, all such control system features are within the scope of this application.

Figure 12:
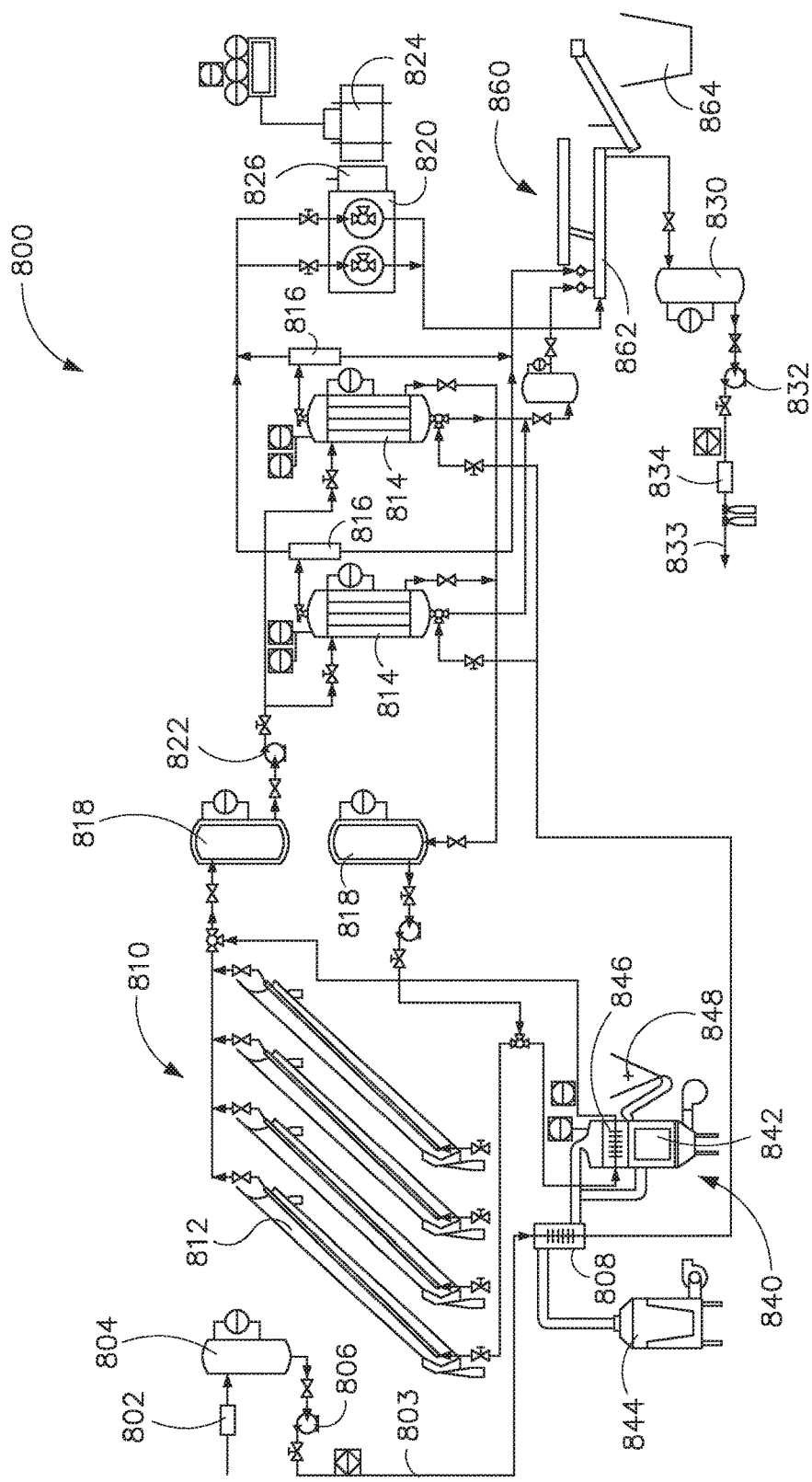
FIG. 12 is a schematic representation of a process flow diagram of another water reclamation system and method, according to an exemplary embodiment.
Figure 13:
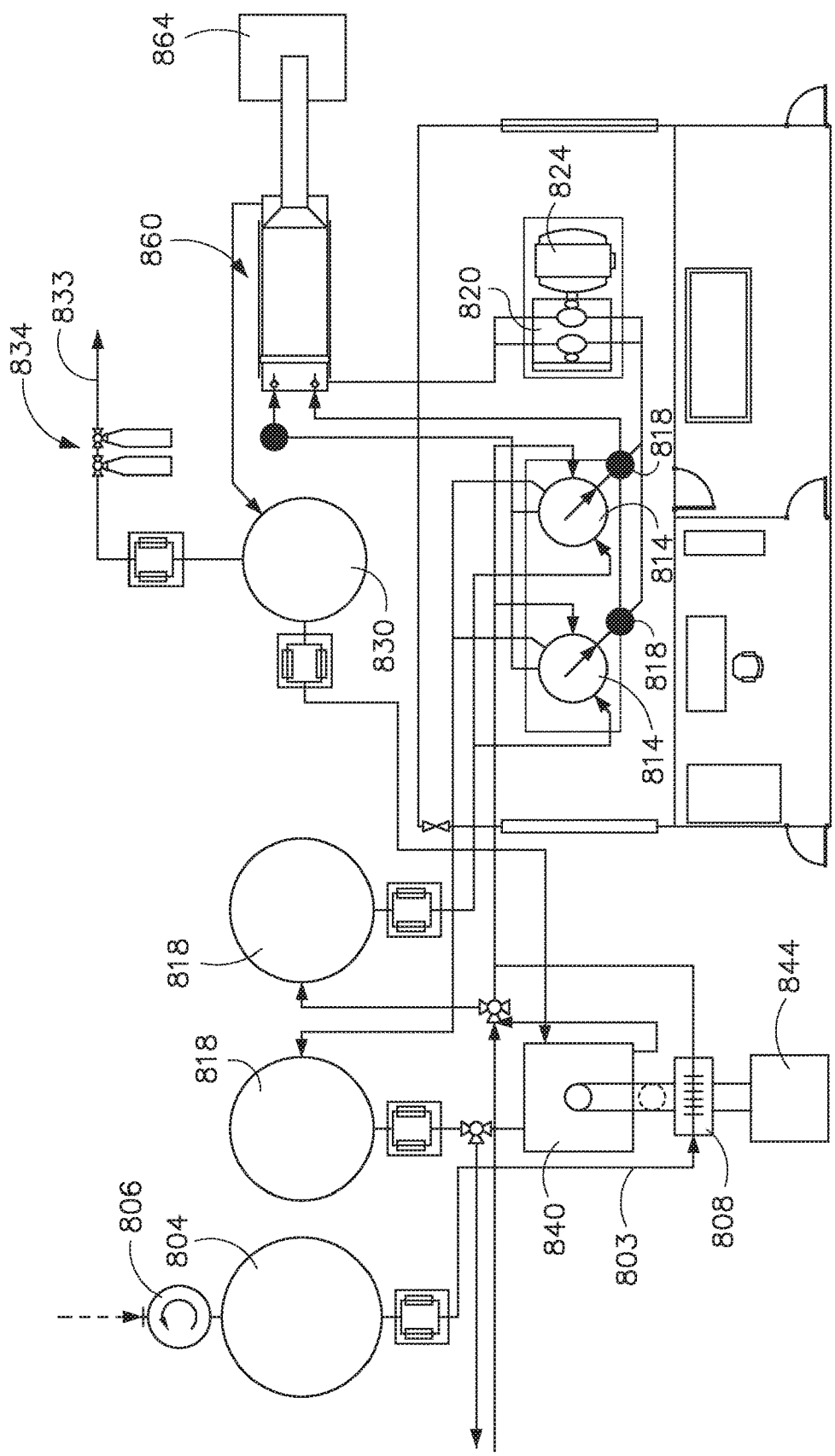
FIG. 13 is a schematic representation of an equipment layout arrangement for the components of the water reclamation system and method, according to an exemplary embodiment of FIG. 12.
Figure 14:
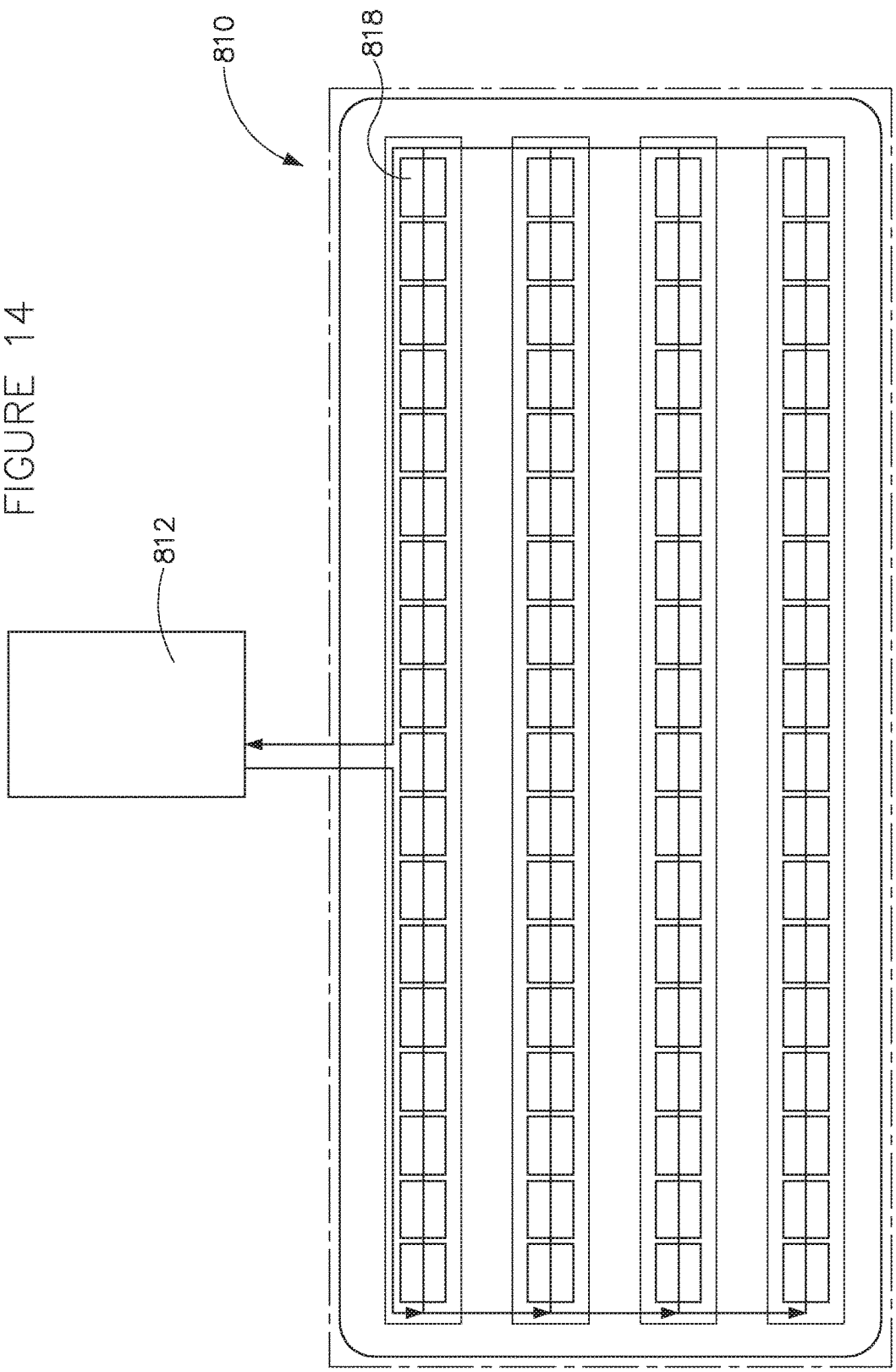
FIG. 14 is a schematic representation of a solar array of reflective parabolic solar collector panels for use by the water reclamation system and method of FIGS. 12-13, according to an exemplary embodiment.

Referring now to FIGS. 12-14 another system and method for water reclamation is shown according to an exemplary embodiment. The system is shown for example as a 20 (or more) GPM solar/biomass powered water treatment system 800 for processing wastewater such as municipal wastewater that may include contaminants such as sewage material. The system 800 includes a solar array field 810 comprising approximately 72 solar collector panels 812 encompassing approximately 2 acres for providing a solar powered heat source, two (2) approximately 150 HP heat exchangers 814 for receiving the heat from the solar powered heat source (and a biomass heat source) and vaporizing the waste water and collecting contaminants, and a 300 HP steam engine 820 which drives generators 824 capable of producing approximately at least about 150 kilowatts (KW) of electricity. The system 800 according to the embodiment is also intended to generate approximately 4M BTU of process heat per hour, which will supply the necessary heat requirement for a zero liquid discharge (ZLD) system. An additional use for the heat may be found, for example in a small ethanol processing system, or other suitable application. However, other sizes, capacities and features may be provided. All such variations are intended to be within the scope of this disclosure.

According to one embodiment, the system 800 is configured to process a minimum of approximately 20 GPM of water, such as irrigation drainage water or municipal wastewater provided to the system by a supplier, such as a municipal water district. Complementary to processing the drainage water the system 800 also generates electricity and process heat for use by the system and other applications. The system and method for water reclamation according to the illustrated embodiment includes (among others) the stages of thermal distillation, thermal energy production, power generation, and minimal or zero liquid discharge.

The thermal distillation circuit components according to an exemplary embodiment are shown to include (among others), a self cleaning filter 802 (approximately 75 microns or other suitable size), a feed water storage tank 804 (approximately 5,000 gallons or other suitable size), a boiler feed water variable flow controlled pumps 806 (shown for example as 1 duty pump and 1 standby pump), a stack mounted heat exchanger 808 (intended to preheat the boiler feed water to a temperature of approximately 200° F.), boilers 814 (shown for example as 2 boilers having a capacity of approximately 150 Hp each for vaporizing the feed water and to collect the contaminants from the feed water), steam separators 816 (shown for example as 1 per boiler, but any number may be used), condensing product water tank 830 (having a capacity of approximately 4,000 gallons), product water pumps 832 (shown for example as 1 duty pump and 1 standby pump), and pressure filters 834 (shown for example as 2 filters having a capacity of approximately 20 GPM each).

According to the illustrated embodiment, a supply of contaminated water from a source (e.g., farm, facility, municipal water district, etc.) passes through the self-cleaning filter device 802 having a 75 micron filter before entering the feed water storage tank 804. From the feed water storage tank 804, the water is pumped to the boilers 814 by the feed water pump 806 at a pressure sufficient to compensate that of the steam pressure produced in the boilers 814. The feed water is passed through the stack mounted heat exchanger 808 installed in the stack of a heat source device shown as a bio-reactor burner 840 (to be further described herein) or in the exhaust stream of the steam engines (to be further described herein) which pre-heats the feed water to a temperature of approximately 200° F. before entering the boilers 814. The water is heated in the boilers 814 to a temperature of approximately 400° F. by heat transferred from a thermal transfer fluid heated in the bio-reactor burner 840 or the solar panel array 810 and then circulated through the shell-side of the boilers 814. The boilers 814 produce saturated steam at a pressure of approximately 200 pounds per square inch (psi). During vaporization of the feed water in the boilers 814, pressurized steam is produced in a top area of the boilers' tubes, while contaminants in the water are concentrated in the lower area of the boiler 814 and evaporation tubes. The contaminants such as concentrated sewage sludge accumulate as solids, which are removed from the boiler 814 in the form of a highly concentrated slurry. The boilers 814 are also constructed so that the top and bottom covers can be easily removed to enable the tubes to be cleaned.

Although many contaminants will typically be collected in the boilers 814, certain contaminates may be carried in the steam flow from the boilers 814. The steam is passed through the steam separator 816 where contaminates and splash water are separated to provide 'cleaned' steam, while the remaining waste stream is conveyed to a concentrate flash evaporator device 860.

The cleaned steam passes through a top outlet of the steam separator 816 and is conveyed to a steam engine 820. The exhaust steam from the steam engine 820 then flows to a process heat load, such as a hot plate of the concentrated flash evaporator 860 where the residual thermal energy in the steam is used in the flash evaporation process. From the concentration flash evaporator 860 the steam then enters the condensation product water tank 830 where it is stored and pumped from the site to an irrigation canal (or other suitable location—not shown). According to one embodiment, post filtration may be provided on the product water line to capture any remaining particulate contaminants.

In certain applications, the total dissolved solids within the final product water will typically range below approximately 500 mg/L and rest within a range of approximately 350 mg/L to 750 mg/L.

The thermal energy production components according to an exemplary embodiment are shown to include (among others) solar parabolic trough collectors 812 (shown for example as 72 arrays having a size of approximately 20-ft long and 16-ft wide, however, other numbers and sizes may be used), insulated heat transfer fluid tanks 818 (shown for example as 2 tanks one for hot fluid received from the solar arrays in a hot fluid circuit to be provided for heating the boilers, and one for relatively cold fluid returned from the boilers in a cold fluid circuit to the solar arrays), heat transfer fluid variable flow controlled pumps 822 (shown for example as 2 sets each including operation and standby pumps, 1 set for the hot fluid circuit and the other set for the cold fluid circuit), a bio-reactor burner 840 (to heat the thermal transfer fluid during periods where the solar energy is not available or otherwise insufficient), and a bag filter 844 to recover any ash in the exhaust stack.

Solar energy is harnessed by a solar field 810 comprising a solar array of 72 solar parabolic reflective troughs 812 of a suitable size such as 20 long and 16 ft wide. According to one embodiment, the troughs 812 are shown aligned in rows of 18 with a central tracking and positioning drive system for the entire row. Each row of troughs 812 are positioned on a generally north—south alignment with approximately 40 ft spacing between the center lines of each row. The central tracking and positioning drive system tracks the sun from morning to night. At the end of each day when the tracking system 'loses' the sun it will return the alignment of the troughs 812 back to a preset morning position ready for the next day. In certain applications, the solar array is intended to produce approximately 4.8 MMBTU/hr during sunny periods or approximately 8.9 billion BTU/year. The method of transferring the heat from the solar system is through circulation of the thermal transfer fluid which comprises a non toxic paraffin based fluid with a rated temperature of approximately 600° F. The solar array panels 812 are built to design standards intended to withstand approximately 100 (or more) MPH winds and are resistant to hail and dust.

The bio-reactor burner 840 is designed to cleanly gasify and combust a biomass material, particularly an agricultural or municipal waste material. The bio-reactor burner 840 is intended to operate at a temperature of approximately 1500° F. in order to minimize (or eliminate) thermal NOx emissions. The bio-reactor burner 840 is designed to be fully automated and is equipped with safety features such as a high temperature cut-off, exterior heat sensors, and a high oil temperature warning (among others). The bio-reactor burner 840 is designed to be self cleaning and require very little maintenance. According to one embodiment, a fire box portion 842 of the bio-reactor burner 840 is constructed of high temperature fire brick and high temperature ceramic board. The bio-reactor burner 840 also employs a flue gas recirculation system to further reduce NOx and other contaminants. According to one embodiment, the bio-reactor burner 840 also has a capacity to deliver approximately 16 MMBTU/hr to a vertically integrated heat exchanger 846 disposed above the firebox for heating the thermal transfer fluid. The bio-reactor burner also includes features such as a fire box nozzle and directional jets in the fire box (as previously described). According to one embodiment, the bio-reactor burner 840 will consume approximately 2000 lb/hr of biomass material. The bio-reactor burner 840 also includes a hopper 848 that is capable of holding up to approximately 20 tons of biomass material, (corresponding to approximately 2.5 days worth of fuel for certain applications). The biomass material may include any of a wide variety of materials, such as sewage sludge (as one example of a refuse-derived fuel) that is recovered by the system from the reclaimed water in the municipal wastewater treatment application and then dried in the concentrator/evaporators, or other materials as previously described.

The power generation components according to an exemplary embodiment are shown to include (among others), a steam engine 820 (having a rating by way of example of approximately 300 HP, however, other ratings or multiple steam engines may be provided), and an AC electric generator 824 (such as a three-phase AC generator having a rating of approximately 150 kw).

Power generation will be accomplished by directing the pressurized steam (e.g., at a pressure of approximately 200 psig, or other suitable pressure) from the boilers 814 to the steam engine 820. According to one embodiment, the steam engine 820 utilizes approximately 10,000 lb/hr of steam at approximately 400° F. in normal operation and is preferably self lubricating. According to one embodiment, the steam engine is a piston-type engine (as previously described) with two 12 inch diameter pistons have a stroke of approximately 10 inches and operates at a rotational speed of approximately 300 RPM. According to an alternative embodiment, the steam engine may be a Tesla-type turbine (as previously described). According to one embodiment, the output of the steam engine 820 is conveyed by a 2 inch driveshaft connected to a transmission device 826, such as a Cleveland gear (having a gear ratio of approximately 12:1) that powers the AC generator 824.

The zero liquid discharge portion of the system is designed to lower the remaining moisture (to below 50%) in the concentrate that is discharged from the steam separator 816 and the blow down of the boilers 814. The ZLD system is shown by way of example to include a concentrated flash evaporation device 860 having substantially flat plate drying pans 862 that utilize the heat (for example at a temperature of approximately 300° F.) provided from the exhaust of the steam engines 820. The drying pans 862 are intended to be self cleaning and are configured to deposit the solids into a bin 864. The drying pans 862 may also be used for the separation of the different species of minerals that are in the water. It is expected that the ZLD system will produce approximately one ton of solids per day in certain applications. According to one embodiment where the reclaimed water is municipal wastewater, the produced solids may comprise dried sewage sludge material, which may also be used as a fuel source in the bioreactor burner. According to one embodiment, dried sewage sludge may be transferred directly from bins 864 to the hopper 848 of the bioreactor burner 840 (e.g. by a suitable conveyor or the like).

According to the illustrated embodiment of the system and method for water reclamation shown in FIGS. 12-14, the system 800 will generally occupy an area of approximately 20 feet×40 feet for the boilers and the steam engines, and the bio-reactor burner and thermal transfer fluid tanks will generally occupy an area of approximately 20 feet×25 feet. Suitable connections for use in connecting the components of the system are generally shown to include a 2 inch internal diameter water line 803 from the feed water storage tank 804 to the boiler 814, a 2 inch line 833 from the condensing product water tank 830 to the product water destination (e.g., irrigation canal, etc.), and one 200 amp panel for the pumps and fans of the system. If the electricity from the generators 824 is to be net metered, a connection is provided to an electrical panel.

The "treated" water will be recovered by a condenser, and then directed to the condenser product water tank 830 and ultimately to the irrigation channel (or other suitable location).

According to one embodiment, the estimated recovery of solids produced by the system (composition including moisture content and recommended disposal) will be approximately 2000 lbs per day with a moisture content of 50% or less. The solids may be separated into different species are intended to be suitable for disposal in a Class 1 land fill site.

Referring to FIG. 2, a method 900 of reclaiming water from a process facility or farm (or other suitable source) is shown according to one embodiment to include the following steps (among other possible steps):

(a) 902—constructing a contaminated water holding reservoir to receive contaminated water from a facility, operation, farm or other suitable source, (b) 904—delivering the contaminated water to a contaminant collection and removal station having a filter station and a contaminant collection device, (c) 906—filtering the contaminated water in the filter station and heating the contaminated water in the contaminant collection device to convert the contaminated water to steam and separate the contaminants from the contaminated water, (d) 908—heating a thermal transfer fluid in at least one of a solar heat generator and a biofuel heat generator and circulating the heated thermal transfer fluid to the contaminant collection device to convert the contaminated water to steam, (e) 910—removing the separated contaminants from the contaminant collection device, (f) 912—directing the steam from the contaminant collection device to a steam energy conversion device to provide a controlled mechanical output, (g) 914—generating electricity using the mechanical output, (h) 916—directing the steam from the steam energy conversion device to one or more heat loads associated with the facility, operation or farm, and (i) 918—condensing the steam and directing the distilled condensate, as reclaimed water, to an evaporation pond for release into the environment or reuse by the facility, operation or farm.

(j) 920—directing exhaust gases from the biofuel heat generator to an algae-growing tank for bubbling carbon dioxide through the water to promote algae growth; and harvesting the algae from the tank; and pressing the algae to extract oil; and converting the algae oil to biodiesel fuel and ethanol, and (k) 922—precipitating and extracting certain chemicals such as calcium sulfate and sodium sulfate (or other desirable chemicals) from the water of the evaporation pond.

However, any one or more of a variety of other steps may be included, in any particular order to accomplish the method of reclaiming water from a process facility or farm (or other source) and reducing biomass waste disposal requirements and generating electrical power and supplying one or more heat loads associated with the facility or farm.

Figure 15:
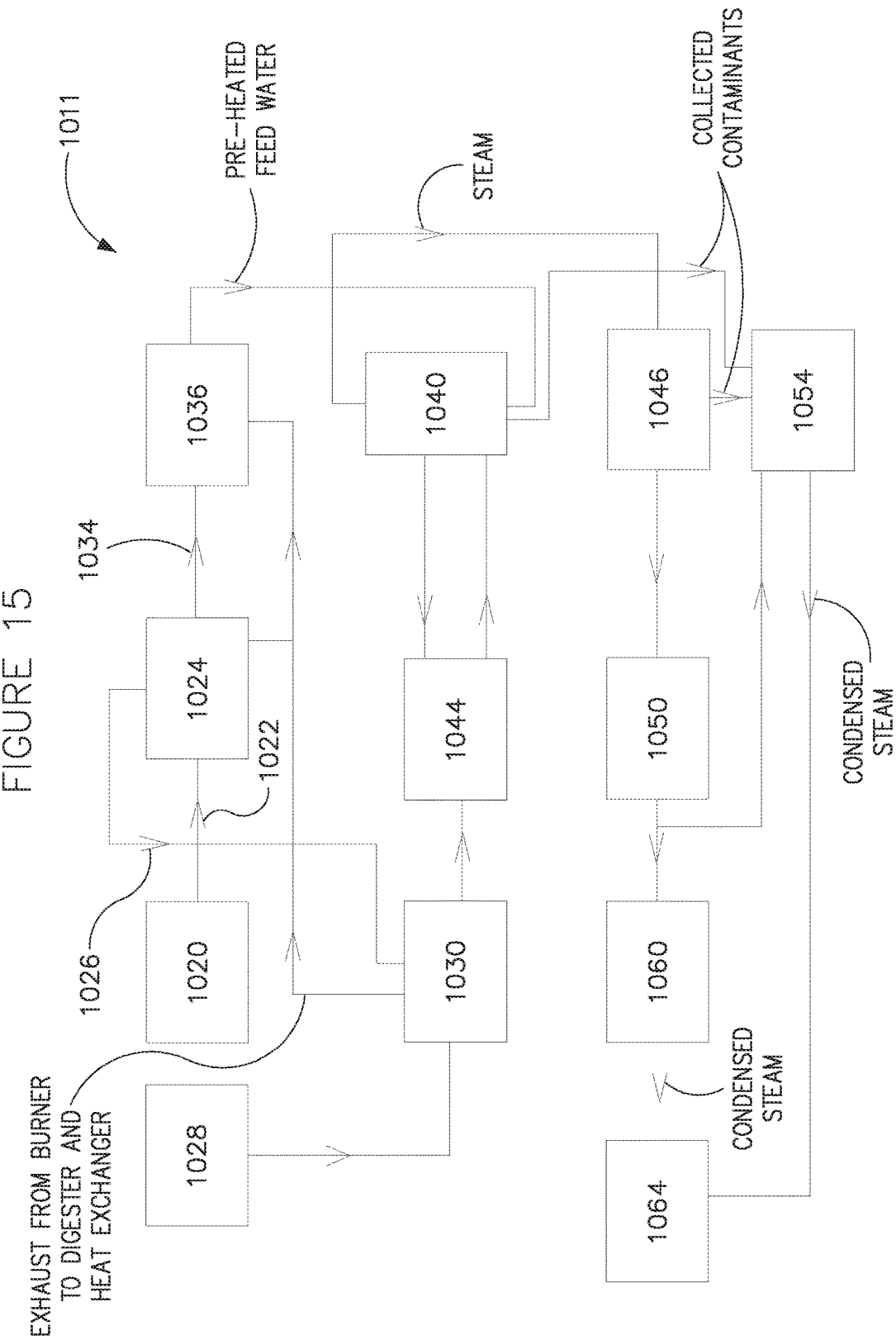
FIG. 15 is a schematic representation of a flow diagram of another water reclamation system and method directed to wine making facilities (e.g., wineries), according to an exemplary embodiment.

Referring now to FIG. 15 another system 1010 and method for water reclamation is shown according to an exemplary embodiment for use with wine-making facilities (shown by way of example as winery 1020). The waste water 1022 from the winery 1020 typically includes relatively high concentrations of organics and is first directed into an anaerobic digester 1024 where the organics are decomposed and syngas 1026 is produced. The syngas 1026 is directed to a heat generation device (e.g., syngas heat generation 1030) where it is burned to produce heat. The heat from the syngas heat generation device is used to heat a thermal transfer fluid which is circulated through a storage device or reservoir 1044. System 1010 may also include other heat generation devices operating in a "parallel" manner or the like with the syngas heat generator such as a solar thermal heat generator, biomass heat generator (e.g., in this embodiment using biomass 1028 from the wine process such as grape seeds, grape crush waste and waste vines, etc.), and a natural gas heat generator—as shown and described in previous embodiments of this disclosure.

After the anaerobic digester process is complete the digested waste water 1034 (now minus the organic material) is directed to a heat recovery device (shown as a heat exchanger 1036) where the "waste" heat from the exhaust of the syngas heat generator 1030 and exhaust steam heat from "free-heat recovery loads" (such as described with reference to FIG. 1 in this disclosure) are used to pre-heat the digested waste water 1034 before being directed to a contaminant collection device (shown for example as a heat exchanger or boiler 1040). The heat exchanger 1040 receives a thermal transfer fluid from a heated thermal transfer fluid storage device 1044, where the thermal transfer fluid has been heated by the syngas heat exchanger (or other heat generator) in a manner as described with reference to FIG. 1 and previously disclosed embodiments to generate steam and separate the contaminants from the steam of the digested waste water 1034.

The steam from the heat exchanger 1040 is directed to a moisture vapor separator 1046, where any carryover contaminants are directed to an evaporation or drying device 1054 (as previously described with reference to other embodiments disclosed herein). The steam is then directed to a steam energy conversion device 1050 (such as a steam engine or turbine of a type previously disclosed herein) to generate electricity. The exhaust steam from the steam energy conversion device is then directed to other heat loads in the system, such as heat exchanger 1036 to preheat the digested waste water, to heat or cool the digesters 1024, to provide heating for the evaporation or drying device 1054, to preheat the thermal transfer fluid, or other "free heat" loads 1060 in the wine-making process or as comfort heating/cooling, or for drying the grape crush at the winery, etc.

The evaporation or drying device 1054 is configured to receive the contaminants collected in the heat exchanger 1040 (e.g., through a blow-down, or manual removal operation or the like), and to receive contaminants collected by the moisture-vapor separator from the carryover steam. Drying device 1054 may also receive steam from the steam conversion device exhaust as a source of heat for drying the contaminants. Once the contaminants have been dried and any desired chemical compounds separated therefrom, the remaining concentrated contaminants may be disposed in a suitable manner (e.g., landfill storage, etc.).

After the steam is discharged from the free heat loads 1060 and/or the evaporation or drying device 1054, the steam is then condensed in a suitable condenser (or evaporation pond or the like) and discharged as clean water from a discharge point 1064 (e.g., through further filters and/or testing or sampling stations as described with reference to previously disclosed embodiments).

Figure 16:
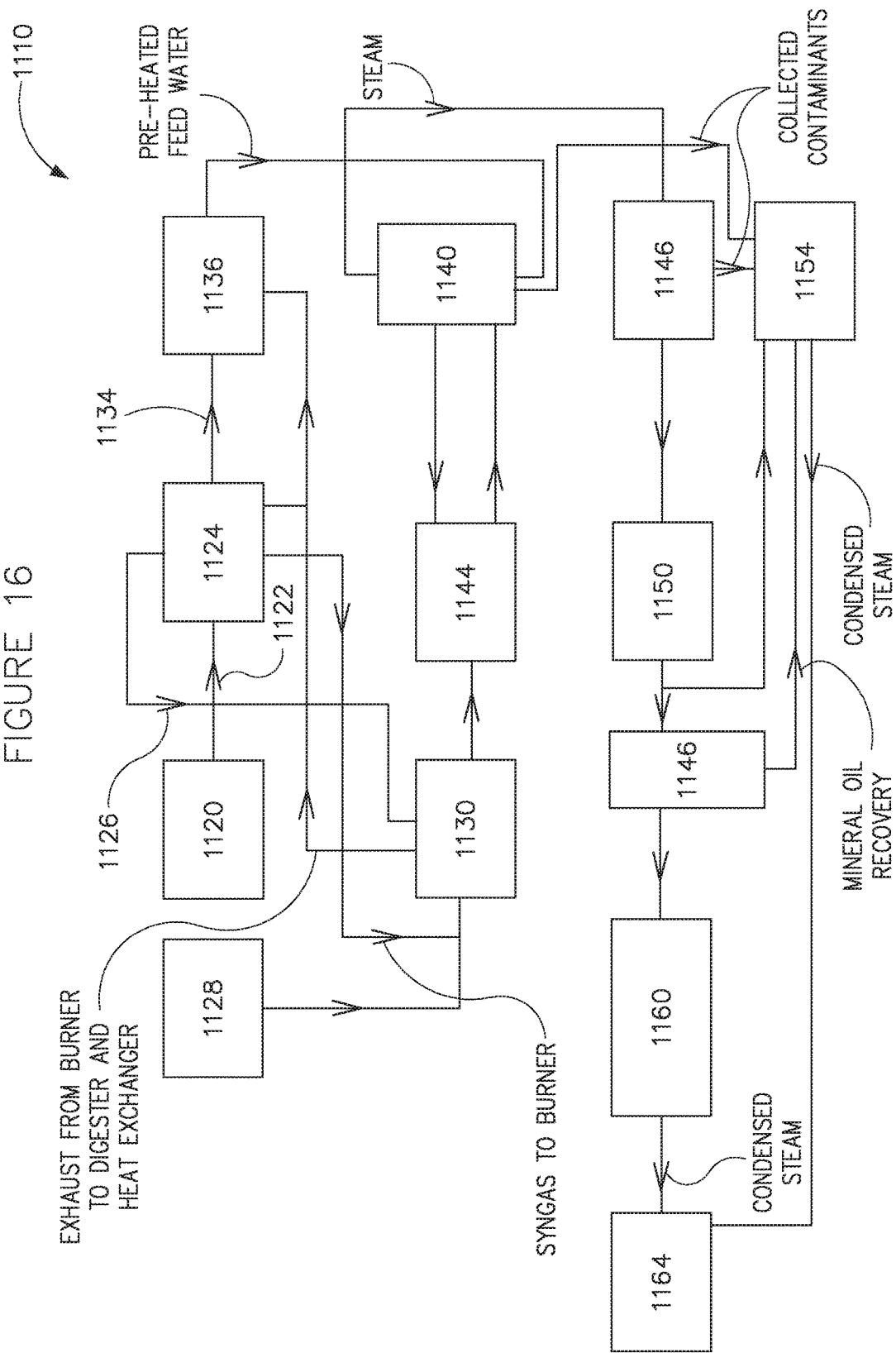
FIG. 16 is a schematic representation of a flow diagram of another water reclamation system and method directed to oil-drilling operations, according to an exemplary embodiment.

Referring now to FIG. 16 another system 1110 and method for water reclamation is shown according to an exemplary embodiment for use with dairy farm operations (shown by way of example as a dairy 1120). The waste water 1122 from the dairy 1120 typically includes relatively high concentrations of organics and is first directed into an anaerobic digester 1124 where the organics are decomposed and syngas 1126 is produced. The syngas 1126 is directed to a heat generation device (e.g., syngas heat generation device 1130) where it is burned to produce heat. The heat from the syngas heat generation device is used to heat a thermal transfer fluid which is circulated through a storage device or reservoir 1144. System 1110 may also include other heat generation devices operating in a "parallel" manner or the like with the syngas heat generator such as a solar thermal heat generator, biomass heat generator (e.g., in this embodiment using biomass 1128 from the dairy farm operation such as cow manure, solids from the anaerobic digester, other agricultural waste, etc.), natural gas heat generator—as shown and described in previous embodiments of this disclosure. Exhaust from the syngas heat generation device 1130 may be returned to the digester 1124 to help promote algae growth and to help sequester carbon dioxide.

After the anaerobic digester process is complete the digested waste water 1134 (now minus the organic material) is directed to a heat recovery device (shown as a heat exchanger 1136) where the "waste" heat from the exhaust of the syngas heat generator 1130 and exhaust steam heat from "free-heat recovery loads" (such as described with reference to FIG. 1 in this disclosure) are used to pre-heat the digested waste water 1134 before being directed to a contaminant collection device (shown for example as a heat exchanger or boiler 1140). The heat exchanger 1140 receives a thermal transfer fluid from a heated thermal transfer fluid storage device 1144, where the thermal transfer fluid has been heated by the syngas heat generator (or other heat generator) in a manner as described with reference to FIG. 1 and previously disclosed embodiments to generate steam and separate the contaminants from the steam of the digested waste water 1134.

The steam from the heat exchanger 1140 is directed to a moisture vapor separator 1146, where any carryover contaminants are directed to an evaporation or drying device 1154 (as previously described with reference to other embodiments disclosed herein). The steam is then directed to a steam energy conversion device 1150 (such as a steam engine or turbine of a type previously disclosed herein) to generate electricity. The exhaust steam from the steam energy conversion device 1150 is then directed to other heat loads in the system, such as a heat exchanger 1136 to preheat the digested waste water 1134, to heat or cool the digesters 1124, to provide heating for the evaporation or drying device 1154, to preheat the thermal transfer fluid, or other "free heat" loads 1160 in the dairy process (e.g., heating/cooling milk, etc.) or as comfort heating/cooling, or for cleaning stalls of the dairy cows, etc.

The evaporation or drying device 1154 is configured to receive the contaminants collected in the heat exchanger 1140 (e.g., through a blow-down, or manual removal operation or the like), and to receive contaminants collected by one or both of the moisture-vapor separators 1146 from the carryover steam. Drying device 1154 may also receive steam from the steam conversion device 1150 exhaust as a source of heat for drying the contaminants. Once the contaminants have been dried and any desired chemical compounds separated therefrom, the remaining concentrated contaminants may be disposed in a suitable manner (e.g., landfill storage, etc.).

After the steam is discharged from the free heat loads 1160 and/or the evaporation or drying device 1154, the steam is then condensed in a suitable condenser (or evaporation pond or the like) and discharged as clean water from a discharge point 1164 (e.g., through further filters and/or testing or sampling stations as described with reference to previously disclosed embodiments).

Figure 17:
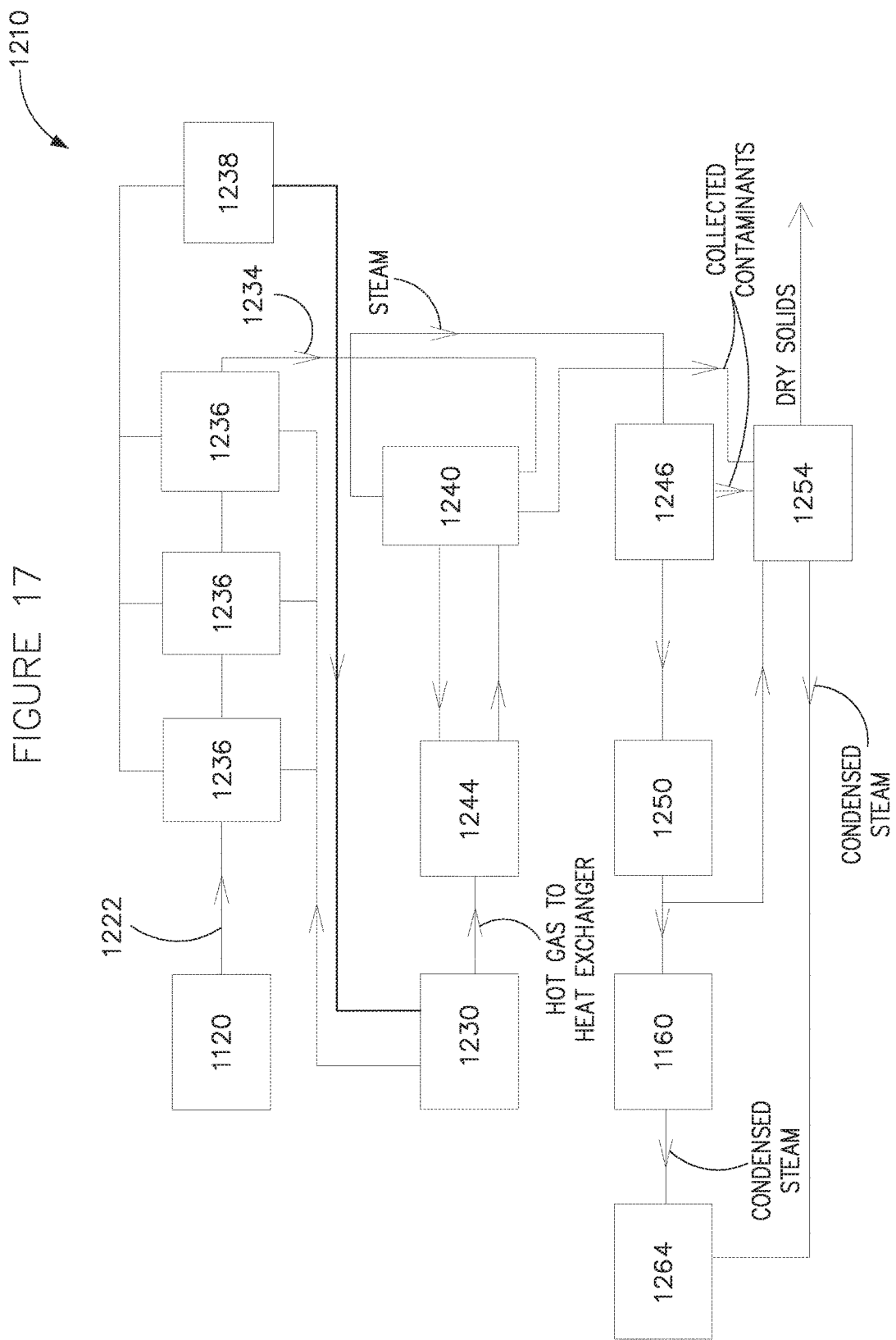
FIG. 17 is a schematic representation of a flow diagram of another water reclamation system and method directed to farming operations, such as dairy farms, according to an exemplary embodiment.

Referring now to FIG. 17 another system 1210 and method for water reclamation is shown according to an exemplary embodiment for use with oil field and/or drilling operations (shown by way of example as an oil field 1220). The waste water 1222 from the oil field 1220 typically includes relatively high concentrations of salts and hydrocarbons and is preheated in a series of heat exchangers 1236 (shown for example as three heat exchangers, but any suitable number of heat exchangers may be used for a particular application) that form a distillation column where the light hydrocarbons are driven off from the waste water at lower temperatures. As the temperature rises, the distillation column will drive off heavier hydrocarbon materials. The separated hydrocarbons are captured in a storage device 1238.

The captured hydrocarbons from storage device 1238 are directed to a heat generation device (e.g., hydrocarbon heat generation device 1230) where they are burned to produce heat. The heat from the hydrocarbon heat generation device is used to heat a thermal transfer fluid which is circulated through a storage device or reservoir 1244. System 1210 may also include other heat generation devices operating in a "parallel" manner or the like with the hydrocarbon heat generator such as a solar thermal heat generator, biomass heat generator (e.g., in this embodiment using biomass or other combustible wastes from the oil field operation, etc.), natural gas heat generator (or a gas heat generator that uses oil field-generated gas)—as shown and described in previous embodiments of this disclosure. Exhaust from the hydrocarbon heat generation device 1230 may be returned to the heat exchangers 1236 of the distillation column for use as a heat source in preheating the waste water and driving off the hydrocarbon contaminants.

The pre-heated waste water 1234 (with most of the hydrocarbons removed) is directed to a contaminant collection device (shown for example as a heat exchanger or boiler 1240). The heat exchanger 1240 receives a thermal transfer fluid from a heated thermal transfer fluid storage device 1244, where the thermal transfer fluid has been heated by the hydrocarbon heat generator (or other heat generator) in a manner as described with reference to FIG. 1 and previously disclosed embodiments to generate steam and separate the contaminants from the steam of the waste water 1234.

The steam from the heat exchanger 1240 is directed to a moisture vapor separator 1246, where any carryover contaminants are directed to an evaporation or drying device 1254 (as previously described with reference to other embodiments disclosed herein). The steam is then directed to a steam energy conversion device 1250 (such as a steam engine or turbine of a type previously disclosed herein) to generate electricity. The exhaust steam from the steam energy conversion device 1250 is then directed to other heat loads in the system, such as heat exchangers 1236 to drive off the hydrocarbons from the waste water 1234 in the distillation column, to provide heating for the evaporation or drying device 1254, to preheat the thermal transfer fluid, or other "free heat" loads 1260 in the oil field operation (e.g., oil recovery processes involving injecting steam into wells, etc.). The steam discharged from the contaminant collection device may still include certain amounts of hydrocarbons, in which case a further distillation column(s) may be used to remove any remaining hydrocarbons.

The evaporation or drying device 1254 is configured to receive the contaminants collected in the heat exchanger 1240 (e.g., through a blow-down, or manual removal operation or the like), and to receive contaminants collected by the moisture-vapor separator(s) 1246 from the carryover steam. The drying device 1254 may also receive steam from the steam conversion device 1250 exhaust as a source of heat for drying the contaminants. Once the contaminants have been dried and any desired chemical compounds separated therefrom, the remaining concentrated contaminants may be disposed in a suitable manner (e.g., landfill storage, etc.).

After the steam is discharged from the free heat loads 1260 and/or the evaporation or drying device 1254, the steam is then condensed in a suitable condenser (or evaporation pond or the like) and discharged as clean water from a discharge point 1264 (e.g., through further filters and/or testing or sampling stations as described with reference to previously disclosed embodiments).

Figure 18:
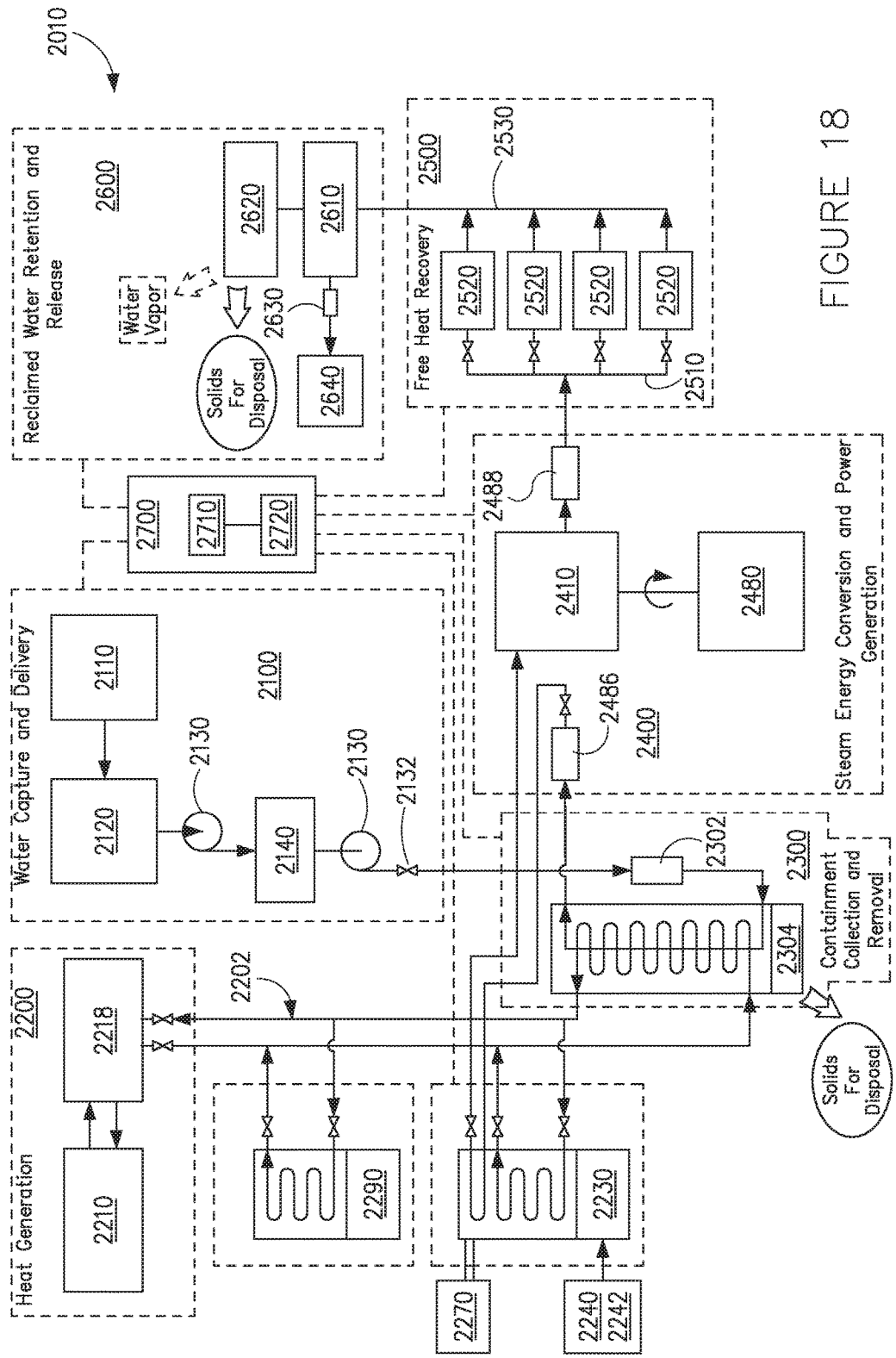
FIG. 18 depicts a schematic diagram of another water reclamation system, according to an exemplary embodiment.

Referring to FIG. 18, a water reclamation system 2010 is shown according to one exemplary embodiment to include the following primary regions or subsystems: a water capture and delivery region 2100; a heat generation region 2200; a contaminant collection and removal region 2300; a steam energy conversion and power generation region 2400; a free heat recovery region 2500; a reclaimed water retention and release region 2600; and a control system 2700 interfacing with each of the regions to coordinate and control operation of the equipment within the regions of the system. The features of the exemplary embodiment of FIG. 18 can be substantially similar to, and/or incorporate, those of the embodiments of FIGS. 1-17, but are shown to include another embodiment of steam energy conversion and power generation components.

According to the illustrated embodiment, the steam energy conversion and power generation region 2400 includes a steam energy conversion device 2410 that converts the steam energy to a mechanical output and an electric power generator 2480 that uses the mechanical output to generate electricity. The steam that is exhausted from the steam energy conversion device is then directed to the free heat recovery region 2500 where the steam is then used to provide "free" heating to any of a wide variety of heat loads associated with the facility or farm. According to alternative embodiments, the pressure of the steam generated in the contaminant collection device may be higher or lower, as appropriate for a particular steam energy conversion device.

According to one embodiment, the steam energy conversion device 2410 is a multi-stage turbine, such as a two-stage steam turbine, where the steam discharged from heat exchanger 2304 is first routed through the heat generation region 2200 to superheat the steam supply prior to delivering the steam to the multi-stage turbine. According to the illustrated embodiment, the steam is shown as routed through the biofuel heat generator 2230 to superheat the steam. However, the steam may also be routed through the natural gas heat generator 2290, and/or the thermal storage medium 2218. According to another embodiment, a separate heat exchanger for superheating the steam may be provided on thermal transfer fluid piping loop 2202. Accordingly, all such variations are intended to be within the scope of this disclosure. The multi-stage turbine may have any suitable power rating or capacity, as appropriate for the steam supply available from the system. According to one embodiment, the multi-stage turbine can have a power rating of up to approximately 10,000 Hp. The steam may be superheated to any suitable pressure and temperature for use in the multi-stage turbine. According to one embodiment, the steam is superheated to approximately 200 psig and 440° F. (or any other suitable temperature and pressure), and then directed through the multi-stage turbine to drive electric generator 2480. Exhaust steam discharged from the multi-stage turbine can then be directed through the free heat recovery region 2500 and then condensed, as described herein with reference to other embodiments.

Figure 19:
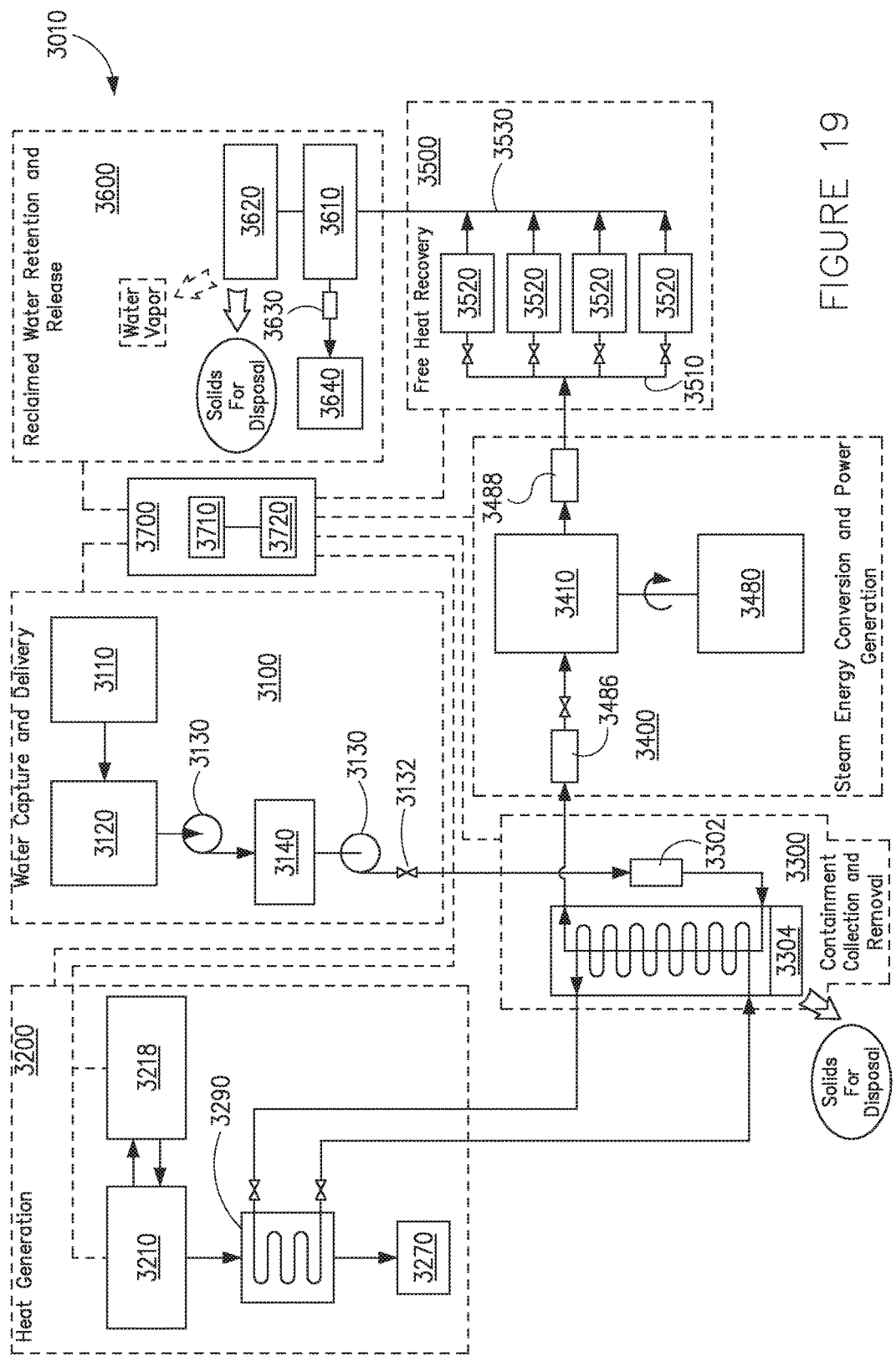
FIG. 19 depicts a schematic diagram of yet another water reclamation system, according to an exemplary embodiment.

Referring to FIG. 19, a water reclamation system 3010 is shown according to one exemplary embodiment to include the following primary regions or subsystems: a water capture and delivery region 3100; a heat generation region 3200; a contaminant collection and removal region 3300; a steam energy conversion and power generation region 3400; a free heat recovery region 3500; a reclaimed water retention and release region 3600; and a control system 3700 interfacing with each of the regions to coordinate and control operation of the equipment within the regions of the system. The features of the exemplary embodiment of FIG. 19 can be substantially similar to, and/or incorporate, those of the embodiments of FIGS. 1-18, but are shown to include another embodiment of heat generation components in the heat generation region 3200.

According to the illustrated embodiment, the system is configured for use with a natural gas-fired turbine 3210 and electric generator 3218, such as can be provided (or may otherwise exist) at large manufacturing or production facilities or the like. The waste heat from the gas-fired turbine 3210 is used in the heat generation region 3200 as the source of thermal energy in heat exchanger 3290 to heat the thermal transfer fluid for routing to the contaminant collection boiler 3304. According to one embodiment, the gas-fired turbine 3210 and electric generator have a capacity of approximately 20 MW, but the system can be used with a gas-fired turbine having any suitable capacity and that provides sufficient waste heat for use a thermal energy source to heat the thermal transfer fluid. According to another embodiment, the gas-fired turbine 3210 may be used in combination with other heat generation sources within the heat generation region 3200, such as a biofuel combustion device and/or a solar thermal generator. Accordingly, all such variations are intended to be within the scope of the disclosure. After being used as a source of thermal energy to heat the thermal transfer fluid in the heat exchanger 3290, the exhaust gas may be direct to an algae growth tank 3270, such as in a manner previously described herein with reference to other embodiments. Combining the advantageous features of the water reclamation system with a gas-fired turbine is intended to provide more effective use of the waste heat at a facility, and also to reclaim the wastewater generated by the operations or processes of the facility.

Figure 20:
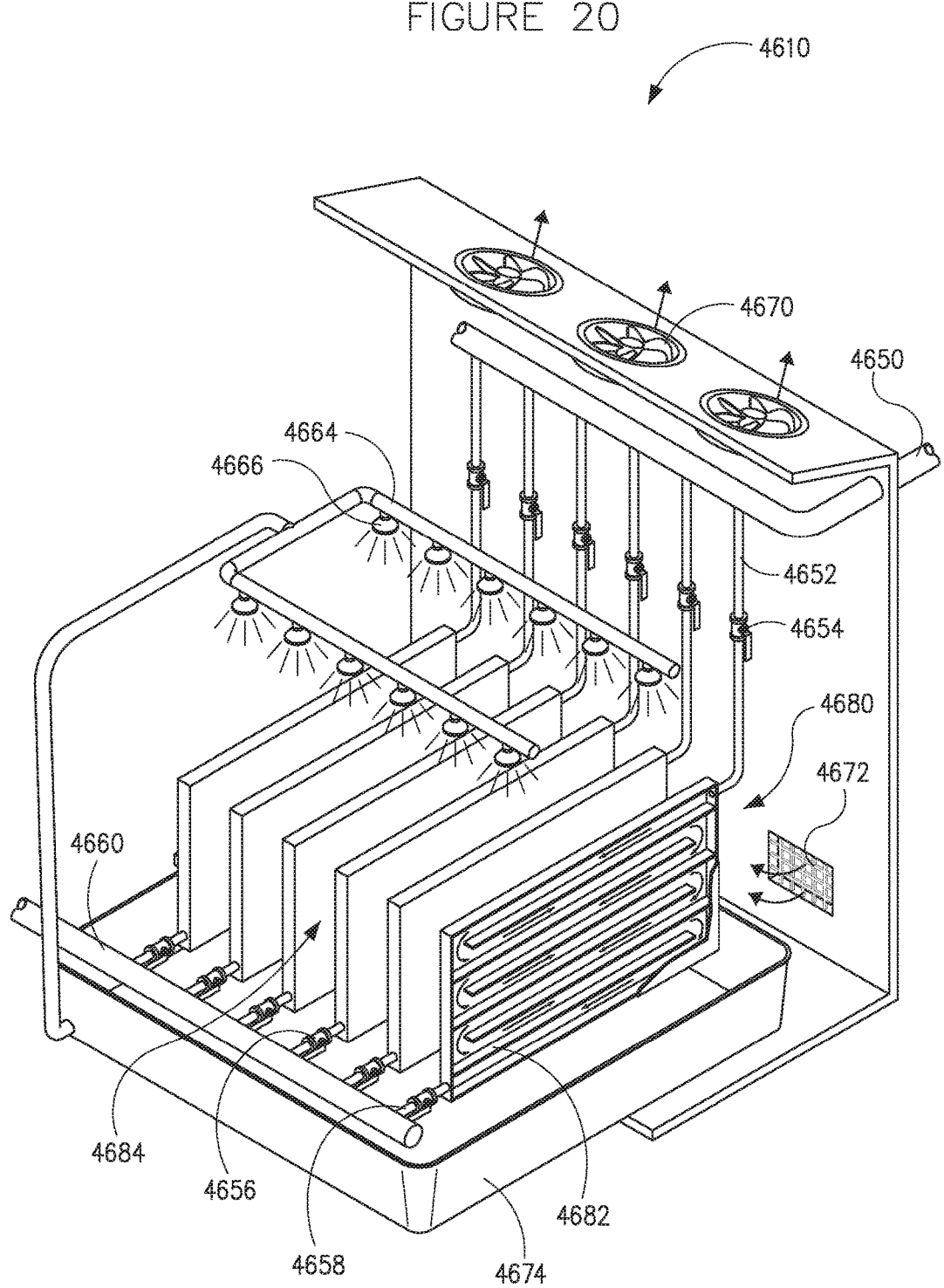
FIG. 20 depicts a schematic diagram of a condensing system for a water reclamation system, according to an exemplary embodiment.

Referring to FIG. 20, a steam condensing system 4610 is shown according to one exemplary embodiment for use in the reclaimed water retention and release region of any of the exemplary embodiments of the water reclamation system and method described herein. Steam condensing system 4610 can be arranged within an enclosure (e.g. building, etc.) and is shown by way of example to include a steam supply header 4650, steam supply branch lines 4652, planar heat exchangers 4680, condensate branch lines 4658, condensate header 4660, water spray lines 4664 having spray nozzles 4666, air exhaust fans 4670 disposed at an upper location on the enclosure, and air inlet dampers 4672 disposed at a lower location on the enclosure. Condensing system 4610 is intended to provide a modular and scalable condensing system whose condensing capacity may be expanded or contracted to suit the needs of a particular application by increasing or decreasing the number of heat exchangers. The enclosure (not shown for clarity) includes a floor area having a trough 4674, wall areas having the air inlet dampers 4672, and a ceiling area having the air exhaust fans 4670.

Referring further to FIG. 20, the steam discharged from the free heat recovery region (or directly from the steam energy and power conversion region) of any of the embodiments described herein can be routed to the steam supply header 4650, and then through individual steam supply branch lines 4652 to each of the heat exchangers 4680 at a relatively low pressure (e.g. within a range of approximately 1-7 psig, and more particularly within a range of approximately 3-5 psig). The water spray lines 4664 and nozzles 4666 operate to spray water onto the external surfaces of the planar heat exchangers 4680 to provide a source of cooling to condense the steam. The spray of cooling water can be collected in the trough 4674 for recirculation to the spray lines 4664 and nozzles 4666, or for other suitable disposal. The air exhaust fans 4670 draw outside ambient air through the air inlet vents 4672 and direct an airflow over/around/along the external surfaces of the planar heat exchanger 4680 as another source of cooling to condense the steam. The combined use of a water spray and air flow provides both conduction and convection cooling to the planar heat exchangers 4680, and can also provide cooling through the latent heat of vaporization of the water spray on the outside surface of the heat exchanger 4680.

Referring further to FIG. 20, the condensate is then discharged through condensate branch lines 4658 to a condensate header 4660 for evaluation and release in the reclaimed water retention and release region as previously described herein with reference to other embodiments of the water reclamation system and method. The planar heat exchanger 4680 has an interior which can include a suitable pattern of baffles 4682 (shown by way of example as a horizontal pattern of baffles, but the baffles may have any suitable pattern and orientation) for directing the steam in a desired flow path through the interior of the planar heat exchanger 4680, and the flow rate of the steam through the flow path can be adjusted (e.g. balanced, etc.—such as by valves 4656 on condensate branch lines 4658) to obtain complete condensation of the steam within the planar heat exchangers 4680.

The planar heat exchanger 4680 may also include other features, such as fins (not shown), on the inside and//or outside surface to enhance heat transfer. The modular nature of the planar heat exchangers 4680 is intended to permit the condensing capacity of the system 4610 to be readily scaled up or down, by adding or removing heat exchangers 4680 to the system 4610, or for an existing bank of heat exchangers, by placing more or less of the heat exchangers into or out of service (such as by opening or closing isolation valves 4654 on the steam supply branch lines 4652). The relatively flat and planar nature of the planar heat exchangers permits them to be oriented vertically and arranged in a "row" configuration with a narrow airflow gap 4684 disposed between each of the planar heat exchangers. This arrangement is intended to permit a relatively large number of the planar heat exchangers 4680 to be configured in a compact array within a relatively small enclosure. The airflow gap 4684 is sufficiently narrow to promote a relatively high airflow velocity along the exterior of the panels to enhance heat transfer. According to any embodiment, the planar heat exchangers generally include a peripheral frame and relatively thin side wall panels from a suitable material that has good heat conductivity and that resists rust and corrosion, such as (but not limited to) stainless steel, aluminum, etc.). According to one embodiment, the peripheral dimensions of the planar heat exchanger are approximately four (4) feet high, and ten (10) feet long (resulting in a total heat transfer surface area for both side walls of one heat exchanger of approximately 80 square feet), and several inches (e.g. 2-5 inches) wide, although any suitable dimensions may be used to provide the desired heat transfer capacity and characteristics for a particular application.

According to any exemplary embodiment, certain portions of the system for any desirable facility, operation, jobsite or farm may be "packaged" in a transportable manner for use in any of a wide variety of locations or process facility or operation sites (or the like) where water reclamation is desirable or mandatory. For example, the sites may include locations of spills or other accidents where clean-up including water reclamation is required. The sites may also include municipalities, farms, wineries, diaries or other agricultural areas, or oil-drilling operations where tailwaters require reclamation. According to one embodiment, the biofuel heat generator and the natural gas generator and the contaminant collection device and the filter station and the steam energy conversion device and electric generator and moisture-vapor separators may be mounted on a skid, or within a trailer that is readily transportable for rapid deployment to any of a wide variety of sites. The trailer would include all necessary interfaces and connections, such as a natural gas connection, electric service connection(s) for electric power generated, and connections to receive the contaminated water and to discharge exhaust steam to suitable condensing equipment (e.g., evaporation pond constructed on site, etc.). Accordingly, all such variations are intended to be within the scope of the disclosure.

According to another exemplary embodiment, the water reclamation system may be configured to remove salt as a contaminant from the water, in the manner previously described, wherein the contaminant collection device acts as a brine boiler to produce usable steam for the steam energy conversion device and the heat loads, and provides a concentrated brine stream. The supply of salt-contaminated water may come directly from a facility, operation or farm, or may be a supply of brine from a reverse osmosis system.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

Unless otherwise indicated, all numbers used in the specification and claims are to be understood as being modified in all instances by the term "about." Accordingly, unless indicated to the contrary, the numerical parameters set forth in the following specification and attached claims are approximations that may vary depending at least upon the specific analytical technique, the applicable embodiment, or other variation according to the particular configuration of the system.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed herein.

What is claimed is:

1. A system for processing wastewater, the system comprising:
   a wastewater source;
   a biomass burner configured to receive biomass from a biomass source, combust the biomass to produce heat and ash, receive a thermal transfer fluid, and heat the thermal transfer fluid using the heat produced from the combustion of the biomass; and
   a first heat exchanger configured to heat the wastewater to produce steam, the first heat exchanger comprising:
      a first inlet configured to receive the wastewater from the wastewater source;
      a second inlet configured to receive the thermal transfer fluid from the biomass burner;
      a first outlet configured to discharge the steam;
      a second outlet configured to discharge the thermal transfer fluid; and
      a third outlet configured to discharge blow-by water separated from the wastewater within the first heat exchanger;
   wherein the thermal transfer fluid does not contact any of the wastewater, the steam, and the blow-by water; and
   wherein a volume of the blow-by water discharged from the third outlet is less than 5% of a volume of the wastewater received by the first inlet, over a period of time.

2. The system of claim 1, further comprising a condenser configured to receive the steam from the first outlet and to condense the steam.

3. The system of claim 1, wherein the blow-by water includes a salt.

4. The system of claim 1, further comprising a second heat exchanger configured to receive the steam from the first heat exchanger and to use heat from the steam to pre-heat the wastewater prior to the wastewater entering the first heat exchanger.

5. The system of claim 1, wherein the wastewater comprises organic material and the biomass comprises dried organic material.

6. The system of claim 5, further comprising an evaporator that dries the organic material for use as the biomass.

7. The system of claim 1, wherein the volume of the blow-by water discharged from the third outlet is between 1% and 5%, inclusive of the volume of the wastewater received by the first inlet, over the period of time.

8. The system of claim 1, wherein the volume of the blow-by water discharged from the third outlet is between 1% and 3%, inclusive of the volume of the wastewater received by the first inlet, over the period of time.

9. The system of claim 1, wherein the volume of the blow-by water discharged from the third outlet is 1% of the volume of the wastewater received by the first inlet, over the period of time.

10. A system for processing wastewater, the system comprising:
    a wastewater source;
    a heat source configured to heat a thermal transfer fluid;
    a first heat exchanger configured to heat the wastewater to produce steam, the first heat exchanger comprising:
       a first inlet configured to receive the wastewater from the wastewater source;
       a second inlet configured to receive the thermal transfer fluid;
       a first outlet configured to discharge the steam;
       a second outlet configured to discharge the thermal transfer fluid; and
       a third outlet configured to discharge blow-by water separated from the wastewater within the first heat exchanger; and a second heat exchanger configured to receive the steam from the first heat exchanger and to use heat from the steam in a drying process or to generate electricity;

wherein a volume of the blow-by water discharged from the third outlet is less than 5% of a volume of the wastewater received by the first inlet, over a period of time.

11. The system of claim 10, further comprising a condenser configured to receive the steam from the first outlet and to condense the steam.

12. The system of claim 10, wherein the thermal transfer fluid does not contact any of the wastewater, the steam, and the blow-by water.

13. The system of claim 10, wherein the heat source comprises an ash removal system configured to deliver ash from the heat source.

14. The system of claim 10, wherein the wastewater comprises organic material and the blow-by water includes a salt.

15. The system of claim 10, wherein the volume of the blow-by water discharged from the third outlet is between 1% and 5%, inclusive of the volume of the wastewater received by the first inlet, over the period of time.

16. The system of claim 10, wherein the volume of the blow-by water discharged from the third outlet is between 1% and 3%, inclusive of the volume of the wastewater received by the first inlet, over the period of time.

17. The system of claim 10, wherein the volume of the blow-by water discharged from the third outlet is 1% of the volume of the wastewater received by the first inlet, over the period of time.

18. A system for processing wastewater, the system comprising:

a wastewater source;

a burner configured to produce heat, discharge exhaust gases, receive a thermal transfer fluid, and heat the thermal transfer fluid;

a first heat exchanger comprising:
   a first inlet configured to receive wastewater from the wastewater source;
   a second inlet configured to receive the thermal transfer fluid from the burner;
   a first outlet configured to discharge steam;
   a second outlet configured to discharge the thermal transfer fluid; and
   a third outlet configured to discharge blow-by water separated from the wastewater within the first heat exchanger; and a second heat exchanger configured to receive the steam from the first heat exchanger and to use heat from the steam in a drying process or to generate electricity;

wherein the thermal transfer fluid is contained within a pipe in the first heat exchanger; and wherein a volume of the blow-by water discharged from the third outlet is less than 5% of a volume of the wastewater received by the first inlet, over a period of time.

19. The system of claim 18, wherein the volume of the blow-by water discharged from the third outlet is between 1% and 5%, inclusive of the volume of the wastewater received by the first inlet, over the period of time.

20. The system of claim 18, wherein the volume of the blow-by water discharged from the third outlet is between 1% and 3%, inclusive of the volume of the wastewater received by the first inlet, over the period of time.

21. The system of claim 18, wherein the volume of the blow-by water discharged from the third outlet is 1% of the volume of the wastewater received by the first inlet, over the period of time.

* * * * *